(12) United States Patent
Takeuchi et al.

(10) Patent No.: US 6,724,973 B1
(45) Date of Patent: Apr. 20, 2004

(54) DISPLAY AND ITS MANUFACTURING METHOD

(75) Inventors: Yukihisa Takeuchi, Aichi-Pref. (JP);
Tsutomu Nanataki, Toyoake (JP);
Natsumi Shimogawa, Nagoya (JP);
Takayoshi Akao, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/341,151

(22) PCT Filed: Nov. 6, 1998

(86) PCT No.: PCT/JP98/05009

§ 371 (c)(1),
(2), (4) Date: Jul. 1, 1999

(87) PCT Pub. No.: WO99/24859

PCT Pub. Date: May 20, 1999

(30) Foreign Application Priority Data

Nov. 6, 1997  (JP) .............................................. 9-304625
Aug. 18, 1998 (JP) ........................................... 10-232123

(51) Int. Cl.⁷ ................................................ G02B 6/00
(52) U.S. Cl. ..................... 385/901; 385/147; 385/19; 385/31
(58) Field of Search .................... 385/31, 25, 37, 385/16, 18, 26, 41–42, 48, 146, 147, 901, 129, 8, 14, 19, 131; 345/108, 30, 48, 85, 84; 359/196, 222–224, 290–297; 310/324, 327, 328, 330, 331, 348, 358

(56) References Cited

U.S. PATENT DOCUMENTS

| | | |
|---|---|---|
| 2,565,514 A | 8/1951 | Pajes |
| 2,997,922 A | 8/1961 | Kaprelian |
| 3,376,092 A | 4/1968 | Kushner et al. |
| 3,698,793 A | 10/1972 | Tellerman |
| 4,113,360 A | 9/1978 | Bauer et al. |
| 5,210,455 A | 5/1993 | Takeuchi et al. |
| 5,319,491 A | 6/1994 | Selbrede |
| 5,600,197 A | 2/1997 | Takeuchi et al. |
| 5,636,072 A | 6/1997 | Shibata et al. |
| 5,771,321 A * | 6/1998 | Stern ............................ 385/31 |
| 5,774,257 A | 6/1998 | Shibata et al. |
| 5,862,275 A | 1/1999 | Takeuchi et al. |
| 5,953,469 A * | 9/1999 | Zhou ............................ 385/22 |
| 6,028,978 A | 2/2000 | Takeuchi et al. |

(List continued on next page.)

FOREIGN PATENT DOCUMENTS

| | | |
|---|---|---|
| EP | 0 675 477 A1 | 10/1995 |
| EP | 0 408 305 B1 | 3/1996 |
| JP | 54-142089 | 11/1979 |
| JP | 7-287176 | 10/1995 |
| JP | 10-78549 | 3/1998 |

OTHER PUBLICATIONS

U.S. patent application Ser. No. 10/230,869, Takeuchi et al., filed Aug. 29, 2002.

(List continued on next page.)

Primary Examiner—Frank G. Font
Assistant Examiner—Michael P. Mooney
(74) Attorney, Agent, or Firm—Burr & Brown

(57) ABSTRACT

Disclosed is a display device comprising an optical waveguide plate 12 for introducing light 10 thereinto; an actuator substrate 18 provided opposingly to one plate surface of the optical waveguide plate 12 and arranged with actuator elements 14 of a number corresponding to a large number of pixels; a pixel structure 102 formed on each of the actuator elements 14 of the actuator substrate 18; and a crosspiece 70 formed at a portion other than the pixel structure 102 between the optical waveguide plate 12 and the actuator substrate 18. Accordingly, it is easy to form a gap between the optical waveguide plate and the pixel structure. Further, the gap can be formed uniformly for all of the pixels.

40 Claims, 60 Drawing Sheets

U.S. PATENT DOCUMENTS

| | | | |
|---|---|---|---|
| 6,108,479 | A | 8/2000 | Takeuchi et al. |
| 6,211,853 | B1 * | 4/2001 | Takeuchi et al. ............ 345/108 |
| 6,281,868 | B1 | 8/2001 | Takeuchi et al. |
| 6,323,833 | B1 * | 11/2001 | Takeuchi et al. .............. 345/84 |
| 6,470,115 | B1 * | 10/2002 | Yonekubo .................... 385/32 |

OTHER PUBLICATIONS

U.S. patent application Ser. No. 10/167,841, Takeuchi et al., filed Jun. 12, 2002.

U.S. patent application Ser. No. 09/749,252, Takeuchi et al., filed Dec. 27, 2000.

U.S. patent application Ser. No. 09/749,244, Takeuchi et al., filed Dec. 27, 2000.

U.S. patent application Ser. No. 09/749,265, Takeuchi et al., filed Dec. 27, 2000.

International Publication No. WO 98/19201, published May 7, 1998, Xeotron Corporation.

* cited by examiner

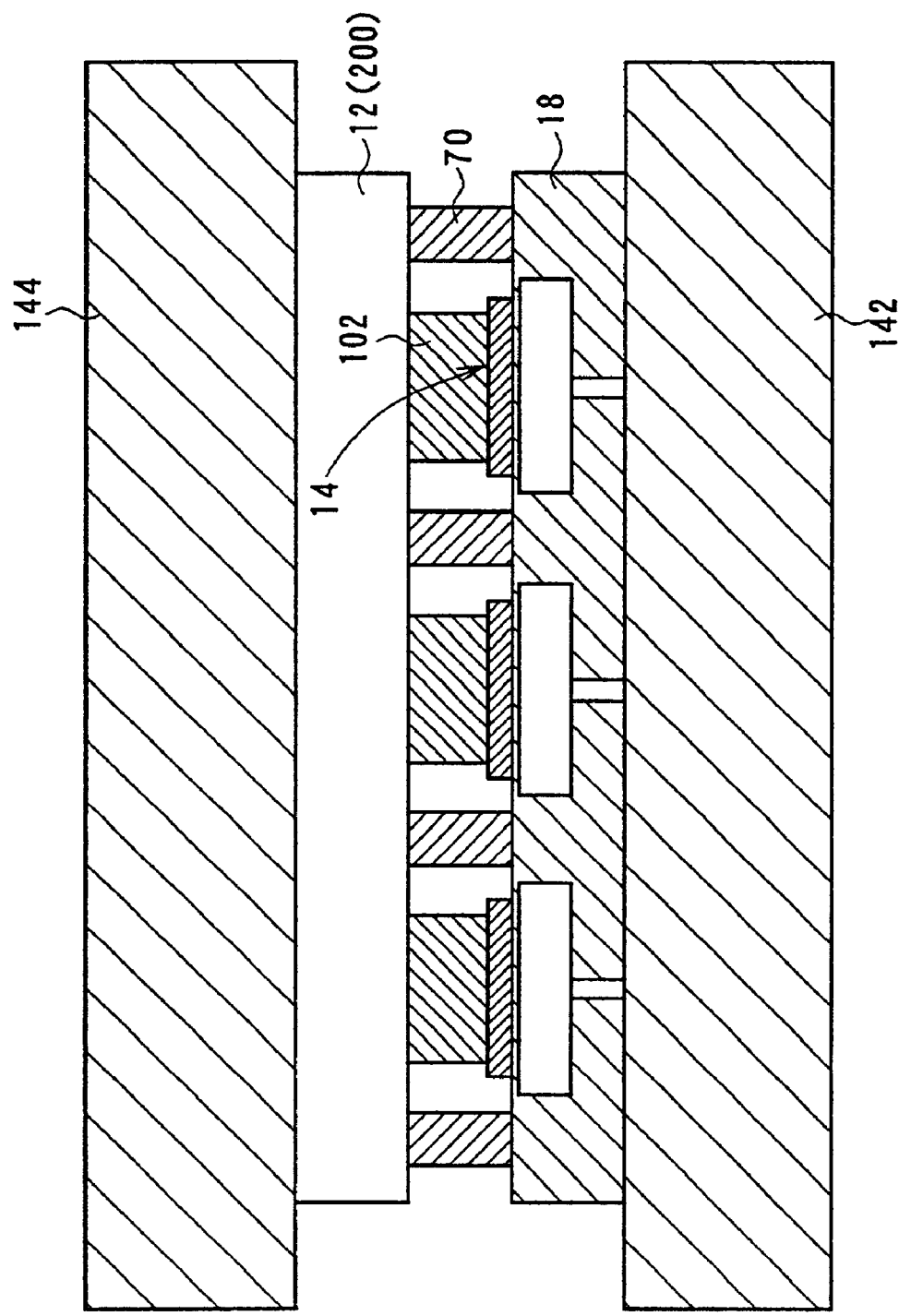

DISPLAY AND ITS MANUFACTURING METHOD

TECHNICAL FIELD

The present invention relates to a display device which consumes less electric power, and which has large screen brightness. In particular, the present invention relates to improvement in the display device for displaying a picture image corresponding to an image signal on an optical waveguide plate by controlling leakage light at a predetermined position on the optical waveguide plate by controlling the displacement action of an actuator element in a direction to make contact or separation with respect to the optical waveguide plate in accordance with the attribute of the image signal to be inputted. The present invention also relates to a method for producing the display device.

BACKGROUND ART

Those hitherto known as the display device include, for example, cathode ray tubes (CRT) and liquid crystal display devices.

Those known as the cathode ray tube include, for example, ordinary television receivers and monitor units for computers. Although the cathode ray tube has a bright screen, it consumes a large amount of electric power.

Further, the cathode ray tube involves a problem that the depth of the entire display device is large as compared with the size of the screen.

On the other hand, the liquid crystal display device is advantageous in that the entire device can be miniaturized, and the display device consumes a small amount of electric power. However, the liquid crystal display device involves problems that it is inferior in brightness of the screen, and the field angle of the screen is narrow.

In the case of the cathode ray tube and the liquid crystal display device, it is necessary for a color screen to use a number of pixels which is three times a number of pixels used in a black-and-white screen. For this reason, other problems occur in that the device itself is complicated, a great deal of electric power is consumed, and it is inevitable to cause the increase in cost.

In order to solve the problems described above, the present applicant has suggested a novel display device (see, for example, Japanese Laid-Open Patent Publication No. 7-287176). As shown in FIG. 63, this display device includes actuator elements 400 arranged for respective pixels. Each of the actuator elements 400 comprises a main actuator element 408 including a piezoelectric/electrostrictive layer 402 and an upper electrode 404 and a lower electrode 406 formed on upper and lower surfaces of the piezoelectric/electrostrictive layer 402 respectively, and an actuator substrate 414 including a vibrating section 410 and a fixed section 412 disposed under the main actuator element 408. The lower electrode 406 of the main actuator element 408 contacts with the vibrating section 410. The main actuator element 408 is supported by the vibrating section 410.

The actuator substrate 414 is composed of ceramics in which the vibrating section 410 and the fixed section 412 are integrated into one unit. A recess 416 is formed in the actuator substrate 414 so that the vibrating section 410 is thin-walled.

A displacement-transmitting section 420 for obtaining a predetermined size of contact area with respect to an optical waveguide plate 418 is connected to the upper electrode 404 of the main actuator element 408. In the illustrative display device shown in FIG. 63, the displacement-transmitting section 420 is arranged such that it is located closely near to the optical waveguide plate 418 in the OFF selection state or the NO selection state in which the actuator element 400 stands still, while it contacts with the optical waveguide plate 418 in the ON selection state at a distance of not more than the wavelength of the light.

The light 422 is introduced, for example, from a lateral end of the optical waveguide plate 418. In this arrangement, all of the light 422 is totally reflected at the inside of the optical waveguide plate 418 without being transmitted through front and back surfaces thereof by controlling the magnitude of the refractive index of the optical waveguide plate 418. In this state, a voltage signal corresponding to an attribute of an image signal is selectively applied to the actuator element 400 by the aid of the upper electrode 404 and the lower electrode 406 so that the actuator element 400 is allowed to make a variety of displacement actions in conformity with the ON selection, the OFF selection, and the NO selection. Thus, the displacement-transmitting section 420 is controlled for its contact and separation with respect to the optical waveguide plate 418. Accordingly, the scattered light (leakage light) 424 is controlled at a predetermined portion of the optical waveguide plate 418, and a picture image corresponding to the image signal is displayed on the optical waveguide plate 418.

When a color picture is displayed by using the display device, the following operation is performed. That is, for example, light sources for three primary colors are switched to control the light emission time for three primary colors while synchronizing the contact time between the optical waveguide plate and the displacement-transmitting plate with the period of color development. Alternatively, the contact time between the optical waveguide plate and the displacement-transmitting plate is controlled, while synchronizing the light emission time for three primary colors with the color development period.

Therefore, the illustrative display device suggested by the present applicant is advantageous in that it is unnecessary to increase the number of pixels as compared with the black-and-white screen, even when the display device is applied to the color display system.

An object of the present invention is to provide a display device and a method for producing the same to exhibit the following effects, by improving the arrangement of the illustrative display device suggested by the present applicant.

(1) The clearance (gap) can be easily formed between the optical waveguide plate and the pixel structure, and the gap can be formed uniformly for all of the pixels.

(2) The size of the gap can be easily controlled.

(3) The adhesion of the pixel structure to the optical waveguide plate can be avoided, and it is possible to effectively realize a high response speed.

(4) The contact surface of the pixel structure (contact surface with respect to the optical waveguide plate) can be formed to be smooth so that the light is efficiently introduced into the pixel structure when the predetermined pixel structure makes contact with the optical waveguide plate.

(5) It is possible to ensure the response speed of the pixel.

(6) It is possible to obtain the uniform brightness for all of the pixels.

(7) It is possible to improve the brightness of the pixel.

DISCLOSURE OF THE INVENTION

According to the present invention, there is provided a display device comprising an optical waveguide plate for introducing light thereinto; an actuator substrate provided opposingly to one plate surface of the optical waveguide plate and arranged with actuator elements of a number corresponding to a large number of pixels; a pixel structure formed on each of the actuator elements of the actuator substrate; and a crosspiece formed at a portion other than the pixel structure between the optical waveguide plate and the actuator substrate (invention as defined in claim 1).

According to the present invention, all of the light, which is introduced, for example, from a lateral end of the optical waveguide plate, is totally reflected at the inside of the optical waveguide plate without being transmitted through front and back surfaces thereof by controlling the magnitude of the refractive index of the optical waveguide plate. In this state, when the displacement-transmitting section approaches the optical waveguide plate in accordance with the displacement action of the actuator section, the light, which has been subjected to total reflection, is reflected by the pixel structure, and it behaves as scattered light. A part of the scattered light is reflected again in the optical waveguide plate. However, almost all of the scattered light is transmitted through the front surface of the optical waveguide plate without being reflected by the optical waveguide plate.

The arrangement described above is illustrative of the case in which the pixel structure is displaced in the direction to make approach to the optical waveguide plate in accordance with the displacement action of the actuator element. Alternatively, the present invention is also applicable to the case in which the pixel structure is displaced in the direction to make separation from the optical waveguide plate in accordance with the displacement action of the actuator element.

As described above, the presence or absence of light emission (leakage light) at the front surface of the optical waveguide plate can be controlled in accordance with the approach and separation of the pixel structure disposed at the back of the optical waveguide plate, with respect to the optical waveguide plate. In this arrangement, for example, one unit for allowing the pixel structure to make displacement action in the direction to make the approach or separation with respect to the optical waveguide plate may be regarded as one pixel. A picture image (for example, characters and graphics) corresponding to the image signal can be displayed on the front surface of the optical waveguide plate in the same manner as in the cathode ray tube and the liquid crystal display device, by arranging a large number of the pixels in a matrix form, and controlling the displacement action of each of the pixels in accordance with the attribute of the inputted image signal.

When the display device of the present invention is applied to the color display system, the following arrangement may be adopted, for example, in relation to the color scheme of the color layers (for example, three primary color filters, complementary color filters, or color scattering elements) disposed for the pixel structures. That is, for example, one pixel may be constructed by three pixel structures adjacent to one another (RGB arrangement) or by four pixel structures adjacent to one another (for example, checked arrangement).

It is noted that the display device according to the present invention comprises the crosspiece formed at the portions other than the pixel structures between the optical waveguide plate and the actuator substrate.

If the optical waveguide plate and the actuator substrate are fixed by using only the circumferential edge of the screen without providing any crosspiece, the vibration occurs in the actuator substrate due to the movement of the actuator element. Every time when the vibration occurs, the displacement standard is changed. As a result, the ON/OFF operation of the pixel does not correspond to the displacement of the actuator element in some cases.

However, in the present invention, the crosspiece is provided as described above. Therefore, even when a certain actuator element makes displacement action, the vibration thereof is absorbed by the crosspiece. Accordingly, no inconvenience occurs, which would otherwise occur such that the displacement standard is changed.

The support effected for the optical waveguide plate by the plurality of crosspieces formed around the pixel structure makes it easy to obtain a uniform gap between the pixel structure and the optical waveguide plate for all of the pixels. Further, the size of the gap can be easily controlled by arbitrarily changing the height of the crosspiece. As a result, it is possible to obtain a uniform brightness for all of the pixels.

In the arrangement described above, it is also preferable that the actuator element includes a shape-retaining layer, an operating section having at least a pair of electrodes formed on the shape-retaining layer a vibrating section for supporting the operating section and a fixed section for supporting the vibrating section in a vibrating manner (invention as defined in claim 2).

In the display device constructed as described above, the term "actuator section including the shape-retaining layer" refers to an actuator element which has at least two or more displacement states at an identical voltage level.

The actuator element having the shape-retaining layer has the following features.

(1) The threshold characteristic concerning the change from the OFF state to the ON state is steep as compared with the case in which no shape-retaining layer exists. Accordingly, it is possible to narrow the deflection width of the voltage, and it is possible to mitigate the load on the circuit.

(2) The difference between the ON state and the OFF state is distinct, resulting in improvement in contrast.

(3) The dispersion of threshold value is decreased, and an enough margin is provided for the voltage setting range. It is desirable to use, as the actuator element, an actuator element which makes, for example, upward displacement (giving the separated state upon no voltage load and giving the contact state upon voltage application) because of easiness of control. Especially, it is desirable to use an actuator element having a structure including a pair of electrodes on its surface.

(4) It is preferable to use, for example, a piezoelectric/electrostrictive layer and an anti-ferroelectric layer as the shape-retaining layer.

In the display device constructed as described above, it is also preferable that the crosspiece is secured to the optical waveguide plate (invention as defined in claim 3).

Alternatively, it is also preferable that a gap-forming layer is provided between the optical waveguide plate and the crosspiece (invention as defined in claim 4). When the gap-forming layer is provided, it is easier to obtain a uniform gap between the pixel structure and the optical waveguide plate for all of the pixels. The size of the gap can be easily controlled as well.

The constitutive material for the gap-forming layer includes, for example, metal films, films containing carbon black, black pigment, or black dye, and transparent films having low light-scattering property. Accordingly, the gap-forming layer is allowed to simultaneously have the function of black matrix. Especially, when a metal film composed of, for example, Cr, Al, Ni, or Ag is used as the gap-forming layer, the attenuation and the scattering of the light transmitted through the optical waveguide plate can be suppressed, because a small amount of light is absorbed thereby. Therefore, such a metal film is used especially preferably.

When a film containing carbon black, black pigment, or black dye is used as the gap-forming layer, then the light-absorbing performance is excellent, and it is possible to improve the contrast. When a transparent film having a poor light-scattering property is used as the gap-forming layer, then the light scattering can be suppressed, and the contrast can be enhanced by combining the film with an adhesive having an excellent light-absorbing property (or an adhesive having a light-absorbing property enhanced by adding black dye or black pigment).

The size of the gap-forming layer is set as follows, for example, as exemplified by the case in which the actuator element is displaced to be convex toward the optical waveguide plate. That is, the small limit (minimum value) of the gap amount is set to be such a degree that the leakage of light caused by the evanescent effect upon the OFF state of the pixel can be neglected. The large limit (maximum value) of the gap amount is set to be within a range in which the pixel structure can make contact with the optical waveguide plate in accordance with the displacement of the actuator element. Therefore, the thickness of the gap-forming layer is adjusted so that the gap amount is set to be within the range described above. However, the difference in height between the pixel structure and the crosspiece is controllable depending on various embodiments of the display device. The thickness of the gap-forming layer may be optimized in accordance therewith.

In the display device constructed as described above, it is also preferable that the crosspiece is formed at portions around four corners of each of the pixel structure (invention as defined in claim 5). The term "portions around the four corners of the pixel structure" includes, for example, positions corresponding to the respective corners when the pixel structure has, for example, a rectangular or elliptic planar configuration. The term refers to a form in which one crosspiece is sheared by the adjoining pixel structure. In this arrangement, four crosspieces are formed for one unit of the pixel structure. Accordingly, the vibration, which is caused by the displacement action of a certain actuator element, is effectively absorbed. As a result, the displacement action of the other actuator elements is scarcely and hardly affected thereby. As a result, the correspondence is well improved between the displacement and the ON operation/OFF operation for all of the pixels. It is possible to faithfully display a picture image corresponding to the inputted image signal. Further, the actuator substrate and the optical waveguide plate are tightly secured to one another.

It is also preferable that the crosspiece is formed to have a window for surrounding at least one pixel structure (invention as defined in claim 6). A representative example is constructed, for example, such that the crosspiece itself is formed to have a plate-shaped configuration, and the window (opening) is formed at a position corresponding to the pixel structure. Accordingly, an arrangement is achieved, in which all side surfaces of the pixel structure are surrounded by the crosspiece. The actuator substrate and the optical waveguide plate are secured to one another more tightly. Further, the vibration caused by the displacement action of a certain actuator element does not affect the displacement action of the other actuator elements at all.

It is also preferable that the crosspiece is constructed such that it includes a stripe-shaped opening which extends along a direction of an array of the pixel structures and which surrounds the array of the pixel structures (invention as defined in claim 7). Alternatively, it is also preferable that the crosspiece is formed to have a line-shaped configuration which extends along a direction of an array of the pixel structures (invention as defined in claim 8).

It is also preferable that the crosspiece is formed integrally with the actuator substrate (invention as defined in claim 9). In this arrangement, it is possible to improve the mechanical strength of the portion at which the crosspiece is formed. Accordingly, the rigidity of the actuator substrate is increased. As a result, the actuator element, which is formed on the actuator substrate, can be protected with the crosspiece, for example, when the actuator substrate is carried or stored. The step of hardening the crosspiece can be omitted, as compared with the case in which the crosspiece is formed separately. Thus, it is possible to reduce the number of production steps.

It is also preferable that the crosspiece is constructed by a wire member which extends along a direction of an array of the pixel structures (invention as defined in claim 10).

In the display device constructed as described above, it is also preferable that a recess is formed on a surface of the pixel structure (invention as defined in claim 11).

In this arrangement, the number of recesses to be formed or the size of the recess is defined depending on the area of the pixel structure opposing to the optical waveguide plate. By doing so, it is possible to provide a substantially identical contact area with respect to the optical waveguide plate concerning the respective pixel structures. Thus, it is possible to obtain a uniform brightness for all of the pixels. The presence of the recess mitigate the tight contact between the pixel structure and the optical waveguide plate. Thus, the pixel structure is smoothly separated from the optical waveguide plate. As a result, the pixel-structure can be prevented from adhesion to the optical waveguide plate. Thus, it is possible to effectively realize a high response speed.

In the display device constructed as described above, it is also preferable that a step is formed on a surface of the pixel structure (invention as defined in claim 12). In this arrangement, the provision of the step on the pixel structure makes it possible to obtain a constant area of the portion of the pixel structure to make contact with the optical waveguide plate for all of the pixels. It is possible to obtain a uniform brightness for all of the pixels. The presence of the step mitigate the tight contact between the pixel structure and the optical waveguide plate. Accordingly, the pixel structure can be prevented from adhesion to the optical waveguide plate, and thus it is possible to effectively realize a high response speed.

In the display device constructed as described above, it is also, preferable that a surface of the pixel structure has a concave configuration (invention as defined in claim 13). When the actuator element makes displacement, the central portion of the pixel structure tends to have the largest displacement amount. Therefore, when the surface of the pixel structure is allowed to have the concave configuration so that the central portion of the pixel structure is concave, the surface of the pixel structure is approximately flat when the actuator element makes displacement to allow the pixel structure to make contact with the optical waveguide plate. Accordingly, it is possible to increase the contact area of the pixel structure with respect to the optical waveguide plate.

When the depth of the concave curve is increased, a state is given, in which the central portion of the pixel structure does not arrive at the optical waveguide plate when the pixel structure makes contact with the optical waveguide plate, giving a state in which a recess is formed on the surface of the pixel structure in a simulated manner. Accordingly, the tight contact between the pixel structure and the optical waveguide plate is mitigated. Thus, the pixel structure is smoothly separated from the optical waveguide plate. As a result, the pixel structure can be prevented from adhesion to the optical waveguide plate, and it is possible to effectively realize a high response speed.

The arrangement in which the recess is formed on the surface of the pixel structure, the arrangement in which the step is formed on the surface of the pixel structure, and the arrangement in which the surface of the pixel structure has the concave configuration may be realized singly respectively, or they may be arbitrarily combined with each other. The combination of them makes it possible to obtain the synergistic effect on the basis of the respective arrangements.

According to another aspect of the present invention, there is provided a method for producing a display device, comprising a crosspiece-forming step of forming a plurality of crosspieces at portions other than actuator elements, of an actuator substrate arranged with the actuator elements corresponding to a large number of pixels; a pixel-forming step of forming pixel structures on the respective actuator elements on the actuator substrate; and a pressurizing step of laminating and pressurizing an optical waveguide plate in a state in which at least the pixel structures are not hardened, and then hardening at least the pixel structures (invention as defined in claim 14).

It is noted that the state in which the pixel structures are not hardened includes a state in which all of stacked films are not hardened, and a state in which a part of films are not hardened, when the pixel structure is constructed by a plurality of stacked films (multiple layered structure).

In this aspect, it is possible to obtain the precise positional alignment for the pixel structure and the crosspiece with respect to the actuator substrate, as well as it is possible to obtain the strong adhesive force. Further, the cleanness of the optical waveguide plate can be highly maintained, because the optical waveguide plate is finally laminated.

According to still another aspect of the present invention, there is provided a method for producing a display device, comprising a crosspiece-forming step of forming a plurality of crosspieces at portions other than portions corresponding to a large number of actuator elements, of an optical waveguide plate; a pixel-forming step of forming pixel structures at portions corresponding to the large number of pixels, of the optical waveguide plate; and a pressurizing step of laminating an actuator substrate arranged with actuator elements of a number corresponding to the large number of pixels, on the crosspieces and the pixel structures, and pressurizing the optical waveguide plate and the actuator substrate in directions to make approach to one another (invention as defined in claim 15).

In this method, the pixel structures and the crosspieces are formed on the optical waveguide plate, and the actuator substrate is laminated thereon. This method is advantageous in that the area of the pixel (contact area with respect to the optical waveguide plate) is easily defined, because the pixel structures are directly formed on the optical waveguide plate. Further, it is easy, to obtain a uniform brightness for all of the pixels.

According to still another aspect of the present invention, there is provided a method for producing a display device, comprising a crosspiece-forming step of forming a plurality of crosspieces at portions other than actuator elements, of an actuator substrate arranged with the actuator elements corresponding to a large number of pixels; a pixel-forming step of forming pixel structures at portions corresponding to the large number of pixels, of an optical waveguide plate; and a pressurizing step of laminating a surface of the actuator substrate formed with the crosspieces and a surface of the optical waveguide plate formed with the pixel structures with each other, and pressuring the optical waveguide plate and the actuator substrate in directions to make approach to one another (invention as defined in claim 16).

In this method, the pixel structures are formed on the optical waveguide plate, and the crosspieces are formed on the actuator substrate. After that, the optical waveguide plate and the actuator substrate are laminated with each other.

In this aspect, the formation of the pixel structures and the formation of the crosspieces can be performed in the steps which are independent from each other. Accordingly, the range of material selection is widened concerning the pixel structure and the crosspiece. Thus, it is possible to reduce the production cost and the number of production steps. Further, the size of the pixel structure can be made uniform, because the pixel structures are formed on the optical waveguide plate which has high flatness.

According to still another aspect of the present invention, there is provided a method for producing a display device, comprising a crosspiece-forming step of forming a plurality of crosspieces at portions other than portions corresponding to a large number of actuator elements, of an optical waveguide plate; a pixel-forming step of forming pixel structures on respective actuator elements of an actuator substrate arranged with the actuator elements of a number corresponding to the large number of pixels; and a pressurizing step of laminating a surface of the actuator substrate formed with the pixel structures and a surface of the optical waveguide plate formed with the crosspieces with each other, and pressuring the optical waveguide plate and the actuator substrate in directions to make approach to one another (invention as defined in claim 17).

In this method, the crosspieces are formed on the optical waveguide plate, and the pixel structures are formed on the actuator substrate. After that, the optical waveguide plate and the actuator substrate are laminated with each other.

Also in this aspect, the formation of the pixel structures and the formation of the crosspieces can be performed in the steps which are independent from each other. Accordingly, the range of material selection is widened concerning the pixel structure and the crosspiece. Thus, it is possible to reduce the production cost and the number of production steps. Further, the height of the crosspiece can be made strictly uniform, because the crosspieces are formed on the optical waveguide plate which has high flatness. Furthermore, for example, no obstacle (for example, the crosspiece) exists upon the formation of the pixel structure. Therefore, it is possible to accurately, form the pixel structure.

According to still another aspect of the present invention, there is provided a method for producing a display device, comprising a pixel-forming step of forming pixel structures on respective actuator elements of an actuator substrate arranged with the actuator elements of a number corresponding to a large number of pixels and integrally having a plurality of crosspieces at portions other than the actuator elements; and a pressurizing step of laminating and pressurizing an optical waveguide plate in a state in which at least the pixel structures are not hardened, and then hardening at least the pixel structures (invention as defined in claim 18).

In this method, the pixel structures are formed on the actuator substrate which is previously provided with the crosspieces in the integrated manner. After that, the optical waveguide plate is laminated and pressurized.

In this aspect, the actuator substrate, which previously has the crosspieces in the integrated manner, it used as the actuator substrate. Therefore, the portion of the crosspiece has high mechanical strength. Accordingly, the rigidity of the actuator substrate is increased. As a result, for example, when the actuator substrate is carried or stored, the crosspieces can be used to protect the actuator elements formed on the actuator substrate. The step of hardening the crosspieces can be omitted, as compared with the case in which the crosspieces are separately formed. Thus, it is possible to reduce the number of production steps.

In the production methods described above, the optical waveguide plate is laminated and pressurized in the state in which at least the pixel structures are not hardened. Accordingly, the optical waveguide plate presses the crosspieces and the pixel structures toward the actuator substrate during the pressurizing process. Thus, a substantially identical surface is formed by the upper surface of the pixel structure and the upper surface of the crosspiece when at least the pixel structure is hardened.

In this aspect, a material, with which the pixel structure is contracted upon the hardening of the pixel structure, is used as the constitutive material for the pixel structure. By doing so, it is possible to form a gap between the optical waveguide plate and the pixel structure during the hardening process for the crosspiece and the pixel structure.

Other methods are available to form the gap. That is, for example, when the optical waveguide plate is laminated and pressurized, the pixel structure is heated and expanded, or the actuator element is displaced to allow the pixel structure to make contact with the optical waveguide plate. It is also possible to adopt a combination of the methods as described above. After that, when the crosspiece and the pixel structure are hardened, a constant gap is formed between the pixel structure and the optical waveguide plate in accordance with the contraction of the pixel structure or the displacement reset (restoration) of the actuator element.

Another arrangement is available, in which the pixel structure contacts with the optical waveguide plate in the natural state. This arrangement is applicable to a case in which the displacement action of the actuator element resides in the displacement of the pixel structure in a direction to make separation from the optical waveguide plate.

In the production methods described above, it is preferable that the crosspiece is hardened, or the crosspiece is partially hardened when the optical waveguide plate is laminated. In this arrangement, the crosspiece acts as a spacer to define the distance between the actuator substrate and the optical waveguide plate.

According to still another aspect of the present invention, there is provided a method for producing a display device, comprising a crosspiece-forming step of forming a plurality of crosspieces at portions other than actuator elements, of an actuator substrate arranged with the actuator elements of a number corresponding to a large number of pixels; a pixel-forming step of forming pixel structures on the respective actuator elements of the actuator substrate; a first laminating step of laminating a plate member in a state in which at least the pixel structures are not hardened; a pressurizing step of pressurizing the actuator substrate and the plate member in directions to make approach to one another, and then hardening at least the pixel structures; and a second laminating step of removing the plate member, and then laminating an optical waveguide plate at least on the crosspieces (invention as defined in claim 19).

In this method, the plate member is once laminated on the actuator substrate which is formed with the pixel structures and the crosspieces to give a substantially identical surface for the respective upper surfaces of the pixel structures and the crosspieces. After that, the plate member is removed, and the optical waveguide plate is laminated.

In this aspect, it is possible to obtain the precise positional alignment and the strong adhesive force for the pixel structure and the crosspiece with respect to the actuator substrate.

The crosspieces, which have been formed on the actuator substrate, serve as the spacer when the plate member is laminated and pressurized on the actuator substrate. Thus, the distance is defined between the actuator substrate and the plate member. If the crosspieces are hardened, or if the crosspieces are partially hardened when the optical waveguide plate is laminated, the distance defined as described above corresponds to the distance between the actuator substrate and the optical waveguide plate.

When a smooth plate member is used as the plate member, a smooth surface equivalent to the surface of the plate member is formed on the surface of the pixel structure. The excellent smoothness is useful to improve the brightness when the pixels cause light emission. It is preferable that a releasing agent is applied to the plate member.

In the method described above, it is also preferable that only the crosspieces are subjected to figuring (crosspiece formation→figuring hardening) after the formation of the crosspieces on the actuator substrate. When the plate member is laminated, it is possible to compensate the portion at which the crosspiece does not abut against the plate member, and it is possible to define the height of the crosspiece while absorbing the waviness of the actuator substrate. Further, when the pixel structure is formed, the pixel structure is simultaneously formed on the crosspiece as well to perform the figuring. Also in this arrangement, it is possible to define the height of the crosspiece while absorbing the waviness of the actuator substrate.

According to still another aspect of the present invention, there is provided a method for producing a display device, comprising crosspiece-forming step of forming a plurality of crosspieces at portions other than portions corresponding to a large number of pixels, of a plate member; a pixel-forming step of forming pixel structures at the portions corresponding to the large number of pixels, of the plate member; a first laminating step of laminating an actuator substrate arranged with actuator elements of a number corresponding to the large number of pixels on the crosspieces and the pixel structures; a pressurizing step of pressurizing the plate member and the actuator substrate in directions to make approach, to one another; and a second laminating step of removing the plate member to transfer the crosspieces and the pixel structures to the actuator substrate, and then laminating an optical waveguide plate on at least the crosspieces (invention as defined in claim 20).

In this method, the pixel structures and the crosspieces are formed on the plate member. After hardening them respectively, or without hardening them, the actuator substrate is laminated. Subsequently, the plate member is removed, and the optical waveguide plate is laminated.

In this aspect, for example, it is preferable that a releasing agent is applied to the plate member before the crosspieces and the pixel structures are formed on the plate member. By doing so, it is possible to smoothly transfer the pixel structures and the crosspieces to the actuator substrate.

In the present invention, when the actuator substrate is laminated and pressurized on the plate member formed with the crosspieces and the pixel structures, the crosspieces, which have been formed on the plate member, serve as the spacer to define the distance between the actuator substrate and the plate member. When the crosspieces are hardened or partially hardened upon the formation of the crosspieces on the plate member, the defined distance corresponds to the distance between the actuator substrate and the optical, waveguide plate.

According to still another aspect of the present invention, there is provided a method for producing a display device, comprising a crosspiece-forming step of forming a plurality of crosspieces at portions other than actuator elements, of an actuator substrate arranged with the actuator elements of a number corresponding to a large number of pixels; a pixel-forming step of forming pixel structures at portions corresponding to the large number of pixels, of a plate member; a first laminating step of laminating a surface of the actuator substrate formed with the crosspieces and a surface of the plate member formed with the pixel structures with each other; a pressurizing step of pressurizing the plate member and the actuator substrate in directions to make approach to one another; and a second laminating step of removing the plate member to transfer the pixel structures to the actuator substrate, and then laminating an optical waveguide plate on at least the crosspieces (invention as defined in claim 21).

In this method, the crosspieces are formed on the actuator substrate, and the pixel structures are formed on the plate member. The actuator substrate and the plate member are laminated with each other. After that, the plate member is removed, and the optical waveguide plate is laminated.

In this aspect, the formation of the pixel structures and the formation of the crosspieces can be performed in the independent steps respectively. Accordingly, the range of material selection is widened concerning the pixel structure and the crosspiece. Thus, it is possible to reduce the production cost and the number of production steps. Further, the size of the pixel structure can be made uniform, because the pixel structures are formed on the plate member which has high flatness.

According to still another aspect of the present invention, there is provided a method for producing a display device, comprising a pixel-forming step of forming pixel structures on respective actuator elements of an actuator substrate arranged with the actuator elements of a number corresponding to a large number of pixels; a crosspiece-forming step of forming a plurality of crosspieces at portions other than portions corresponding to the large number of pixels, of a plate member; a first laminating step of laminating a surface of the actuator substrate formed with the pixel structures and a surface of the plate member formed with the crosspieces with each other; a pressurizing step of pressurizing the plate member and the actuator substrate in directions to make approach to one another; and a second laminating step of removing the plate member to transfer the crosspieces to the actuator substrate, and then laminating an optical waveguide plate on at least the crosspieces (invention as defined in claim 22).

In this method, the pixel structures are formed on the actuator substrate, and the crosspieces are formed on the plate member. The actuator substrate and the plate member are laminated with each other. After that, the plate member is removed, and the optical waveguide plate is laminated.

Also in this aspect, the formation of the pixel structures and the formation of the crosspieces can be performed in the independent steps respectively. Accordingly, the range of material selection is widened concerning the pixel structure and the crosspiece. Thus, it is possible to reduce the production cost and the number of production steps. Further, the height of the crosspiece can be made strictly uniform, because the crosspieces are formed on the plate member which has high flatness. Furthermore, no obstacle (for example, the crosspiece) exists upon the formation of the pixel structure. Therefore, it is possible to accurately form the pixel structure.

According to still another aspect of the present invention, there is provided a method for producing a display device, comprising a pixel-forming step of forming pixel structures on respective actuator elements of an actuator substrate arranged with the actuator elements of a number corresponding to a large number of pixels and integrally having a plurality of crosspieces at portions other than the actuator elements; a first laminating step of laminating a plate member in a state in which at least the pixel structures are not hardened; a pressurizing step of pressurizing the actuator substrate and the plate member in directions to make approach to one another, and then hardening at least the pixel structures; and a second laminating step of removing the plate member, and then laminating an optical waveguide plate on at least the crosspieces (invention as defined in claim 23).

In this method, the pixel structures are formed on the actuator substrate which integrally has the crosspieces. Subsequently, the plate member is laminated on the actuator substrate. After that, the plate member is removed, and the optical waveguide plate is laminated.

In this aspect, the mechanical strength of the portion of the crosspiece is high, because the actuator substrate previously having the crosspieces in the integrated manner is used as the actuator substrate. Accordingly, the rigidity of the actuator substrate is increased. As a result, the actuator element, which is formed on the actuator substrate, can be protected with the crosspiece, for example, when the actuator substrate is carried or stored. The step of hardening the crosspiece can be omitted, as compared with the case in which the crosspiece is separately formed. Thus, it is possible to reduce the number of production steps.

According to still another aspect of the present invention, there is provided a method for producing a display device, comprising a pixel-forming step of forming pixel structures on respective actuator elements of an actuator substrate arranged with the actuator elements of a number corresponding to a large number of pixels; a first laminating step of using a jig including, on one surface of a plate member, a large number of size-defining members formed to have substantially the same height as, that of crosspieces to be formed on the actuator substrate to laminate a surface of the jig formed with the size-defining members and a surface of the actuator substrate formed with the pixel structures with each other; a pressurizing step of pressurizing the jig and the actuator substrate in directions to make approach to one another; a crosspiece-forming step of removing the jig, and then forming the plurality of crosspieces at portions other than the actuator sections, of the actuator substrate; and a second laminating step of laminating an optical waveguide plate on at least the crosspieces on the actuator substrate (invention as defined in claim 24).

In this method, the pixel structures are formed on the actuator substrate. Subsequently, the jig including the large number of size-defining members formed on the plate member and the actuator substrate are laminated and pressurized, and thus the size of the pixel structures is defined. After that, the jig is removed, the crosspieces are formed on the actuator substrate, and then the optical waveguide plate is laminated.

In this aspect, for example, when the jig is constructed by a member having rigidity such as metal, the waviness of the actuator substrate formed with the pixel structures can be reduced by laminating and pressurizing the jig and the actuator substrate. The crosspieces can be formed highly accurately in the crosspiece-forming step performed thereafter.

According to still another aspect of the present invention, there is provided a method for producing a display device, comprising a pixel-forming step of forming pixel structures on respective actuator elements of an actuator substrate arranged with the actuator elements of a number corresponding to a large number of pixels: a first laminating step of using a jig including, on one surface of a plate member, a large number of size-defining members formed to have substantially the same height as that of crosspieces to be formed on the actuator substrate to laminate a surface of the jig formed with the size-defining members and a surface of the actuator substrate formed with the pixel structures with each other; a pressurizing step of pressurizing the jig and the actuator substrate in directions to make approach to one another; a crosspiece-forming forming step of removing the jig, and then forming the plurality of crosspieces at portions other than portions corresponding to the large number of pixels, of an optical waveguide plate; and a second laminating step of laminating a surface of the actuator substrate formed with the pixel structures and a surface of the optical waveguide plate formed with the crosspieces with each other (invention as defined in claim 25).

In this method, the pixel structures are formed on the actuator substrate. Subsequently, the jig including the plate member provided with the large number of size-defining members and the actuator substrate are laminated with each other to pressurize them. Thus, the size of the pixel structures is defined. After the jig is removed, the crosspieces are formed on the optical waveguide plate, and the optical waveguide plate and the actuator substrate are laminated with each other.

Also in this aspect, for example, when the jig is constructed by a member having rigidity such as metal, the waviness of the actuator substrate formed with the pixel structures can be reduced by laminating and pressurizing the jig and the actuator substrate. The optical waveguide plate can be laminated highly accurately thereafter. Further, the height of the crosspiece can be made strictly uniform, because the crosspieces are formed on the optical waveguide plate which has high flatness.

According to still another aspect of the present invention, there is provided a method for producing a display device, comprising a pixel-forming step of forming pixel structures on respective actuator elements of an actuator substrate arranged with the actuator elements of a number corresponding to a large number of pixels; a crosspiece-forming step of using a jig including, on one surface of a plate member, a large number of size-defining members formed to have substantially the same height as that of crosspieces to be formed on the actuator substrate to form the plurality of crosspieces at portions formed with no size-defining member, of a surface of the jig formed with the size-defining members, the portions being other than portions corresponding to the large number of pixels; a first laminating step of laminating the surface of the jig formed with the size-defining members and the crosspieces and a surface of the actuator substrate formed with the pixel structures with each other; a pressurizing step of pressurizing the jig and the actuator substrate in directions to make approach to one another; and a second laminating step of removing the jig to transfer the crosspieces to the actuator substrate, and then laminating an optical waveguide plate on at least the crosspieces on the actuator substrate (invention as defined in claim 26).

In this method, the pixel structures are formed on the actuator substrate, and the crosspieces are formed on the jig including the plate member provided with the large number of size-defining members. The actuator substrate and the jig are laminated with each other to pressurize them. Thus, the size of the pixel structures is defined. After that, the jig is removed, the crosspieces are transferred to the actuator substrate, and the optical waveguide plate is laminated.

Also in this aspect, for example, when the jig is constructed by a member having rigidity such as metal, the waviness of the actuator substrate formed with the pixel structures can be reduced by laminating and pressurizing the jig and the actuator substrate. The crosspieces and the pixel structures can be formed highly accurately.

According to still another aspect of the present invention, there is provided a method for producing a display device, comprising a crosspiece-forming step of forming a plurality of crosspieces at portions other than actuator elements, of an actuator substrate arranged with the actuator elements of a number corresponding to a large number of pixels; a pixel-forming step of forming pixel structures on the respective actuator elements of the actuator substrate; a first laminating step of using a jig including, on one surface of a plate member, a large number of size-defining members formed to have substantially the same height as that of the crosspieces to be formed on the actuator substrate to laminate a surface of the jig formed with the size-defining members and a surface of the actuator substrate formed with the crosspieces and the pixel structures with each other; a pressurizing step of pressurizing the jig and the actuator substrate in directions to make approach to one another; and a second laminating step of removing the jig, and then laminating an optical waveguide plate on at least the crosspieces on the actuator substrate (invention as defined in claim 27).

In this method, the pixel structures and crosspieces are formed on the actuator substrate. The actuator substrate and the jig including the plate member provided with the large number of size-defining members are laminated with each other to pressurize them. Thus, the size of the crosspieces and the pixel structures is defined. After that, the jig is removed, and the optical waveguide plate is laminated.

Also in this aspect, for example, when the jig is constructed by a member having rigidity such as metal, the waviness of the actuator substrate formed with the pixel structures and the crosspieces can be reduced by laminating and pressurizing the jig and the actuator substrate. The crosspieces and the pixel structures can be formed highly accurately.

According to still another aspect of the present invention, there is provided a method for producing a display device, comprising a crosspiece-forming step of forming a plurality of crosspieces at portions other than actuator elements, of an actuator substrate arranged with the actuator elements of a number corresponding to a large number of pixels; a pixel-forming step of using a jig including, on one surface of a plate member, a large number of size-defining members formed to have substantially the same height as that of the crosspieces to be formed on the actuator substrate to form pixel structures at portions corresponding to the large number of pixels, the portions being formed with no size-defining member, of a surface of the jig formed with the size-defining members; a first laminating step of laminating the surface of the jig formed with the size-defining members and the pixel structures and a surface of the actuator substrate formed with the crosspieces with each other; a pressurizing step of pressurizing the jig and the actuator substrate in directions to make approach to one another; and a second laminating step of removing the jig to transfer the pixel structures to the actuator substrate, and then laminating an optical waveguide plate on at least the crosspieces on the actuator substrate (invention as defined in claim 28).

In this method, the crosspieces are formed on the actuator substrate. The pixel structures are formed on the jig including the plate member provided with the large number of size-defining members. The actuator substrate and the jig are laminated with each other to pressurize them. Thus, the size of the crosspieces and the pixel structures is defined. After that, the jig is removed, the pixel structures are transferred to the actuator substrate, and then the optical waveguide plate is laminated.

Also in this aspect, for example, when the jig is constructed by a member having rigidity such as metal, the waviness of the actuator substrate formed with the pixel structures can be reduced by laminating and pressurizing the jig and the actuator substrate. The crosspieces and the pixel structures can be formed highly accurately.

According to still another aspect of the present invention, there is provided a method for producing a display device, comprising a crosspiece-forming step of using a jig including, on one surface of a plate member, a large number of size-defining members formed to have substantially the same height as that of crosspieces to be formed on an actuator substrate to form the plurality of crosspieces at portions formed with no size-defining member, of a surface of the jig formed with the size-defining members, the portions being other than portions corresponding to a large number of pixels; a pixel-forming step of forming pixel structures at portions corresponding to the large number of pixels, the portions being formed with no size-defining member, of the surface of the jig formed with the size-defining members; a first laminating step of laminating the actuator substrate arranged with actuator elements of a number corresponding to the large number of pixels on the crosspieces and the pixel structures on the jig; a pressurizing step of pressurizing the jig and the actuator substrate in directions to make approach to one another; and a second laminating step of removing the jig to transfer the crosspieces and the pixel structures to the actuator substrate, and then laminating an optical waveguide plate on at least the crosspieces (invention as defined in claim 29).

In this method, the crosspieces and the pixel structures are formed on the jig including the plate member formed with the large number of size-defining members. The jig and the actuator substrate are laminated with each other to pressurize them. Thus, the size of the crosspieces and the pixel structures is defined. After that, the jig is removed, the crosspieces and the pixel structures are transferred to the actuator substrate, and the optical waveguide plate is laminated.

Also in this aspect, for example, when the jig is constructed by a member having rigidity such as metal, the waviness of the actuator substrate can be reduced by laminating and pressurizing the jig and the actuator substrate. The crosspieces and the pixel structures can be transferred to the actuator substrate highly accurately.

In the production methods in which the crosspieces are formed on the plate member or the jig, of the production methods described above, it is also preferable that the members for constructing the crosspieces are laminated on the plate member or the jig by utilizing surface tension of liquid (invention as defined in claim 30). In this arrangement, the plate member or the jig can be easily removed thereafter.

In the production methods in which the crosspieces are formed on the plate member or the jig, of the production methods described above, it is also preferable that the crosspieces are formed at the concerning portions of the plate member or the jig, and then the crosspieces are hardened (invention as defined in claim 31).

It is also preferable that in the pressurizing step of the production methods described above, at least the pixel structures are hardened while pressurizing the actuator substrate and the member to be pressurized together with the actuator substrate (invention as defined in claim 32). It is also preferable that the optical waveguide plate includes a gap-forming layer at a portion corresponding to the crosspiece (invention as defined in claim 33).

In the methods described above, it is also preferable that a gap-forming layer is previously formed on the crosspiece before laminating the optical waveguide plate (invention as defined in claim 34). In this arrangement, the presence of the gap-forming layer makes it easier to obtain a uniform gap between the pixel structure and the optical waveguide plate for all of the pixels. The size of the gap can be easily controlled as well.

When the optical waveguide plate, the plate member, or the jig is laminated and pressurized in the state in which at least the pixel structures are not hardened upon the lamination of the plate member or the jig and the actuator substrate or upon the lamination of the optical waveguide plate and the actuator substrate, the optical waveguide plate, the plate member, or the jig presses the crosspieces and the pixel structures toward the actuator substrate during the pressurizing process. The upper surface of the crosspiece and the upper surface of the pixel structure form a substantially identical surface at least when the pixel structures are hardened.

In this arrangement, a material, with which the pixel structure is contracted upon the hardening of the pixel structure, is used as the constitutive material for the pixel structure. By doing so, it is possible to form a gap between the pixel structure and the optical waveguide plate during the hardening of the crosspiece and the pixel structure.

Other methods are available to form the gap. That is, for example, when the optical waveguide plate is laminated and pressurized, the pixel structure is heated and expanded, or the actuator element is displaced to allow the pixel structure to make contact with the optical waveguide plate. It is also possible to adopt a combination of the methods as described above. After that, when the crosspiece and the pixel structure are hardened, a constant gap is formed between the pixel structure and the optical waveguide plate in accordance with the contraction of the pixel structure or the displacement reset (restoration) of the actuator element.

Another arrangement is available, in which the pixel structure contacts with the optical waveguide plate in the natural state. This arrangement is applicable to a case in which the displacement action of the actuator element resides in displacement in a direction in which the pixel structure is separated from the optical waveguide plate.

In the production methods described above, it is preferable that the crosspiece is hardened, or the crosspiece is partially hardened when the plate member or the optical waveguide plate is laminated on the actuator substrate. In this arrangement, the crosspiece acts as a spacer to define the distance between the actuator substrate and the plate member or the optical waveguide plate.

It is also preferable that when the actuator substrate and the member (the optical waveguide plate, the plate member, or the jig) to be pressurized together with, the actuator substrate are pressurized, a preliminary treatment is performed for gap formation, and a predetermined gap is formed between the pixel structure and the optical waveguide plate during the hardening of at least the pixel structures performed thereafter (invention as defined in claim 35).

This arrangement resides in the method having been already explained. That is, when the optical waveguide plate, the plate member, or the jig is laminated and pressurized, the pixel structure is heated and expanded, or the actuator element s, displaced to allow the pixel structure to make contact with the optical waveguide plate, the plate member, or the jig. When this method is adopted, it is easy to form a constant gap between the pixel structures and the optical waveguide plate. It is possible to obtain a uniform brightness for all of the pixels.

Especially, it is preferable that a vacuum packaging method is used to pressurize the actuator substrate and the member (the optical waveguide plate, the plate member, or the jig) to be pressurized together with the actuator substrate (invention as defined in claim 36). That is, for example, even when the actuator substrate involves warpage and waviness, it is possible to uniformly pressurize the actuator substrate and the optical waveguide plate, the plate member, or the jig. Accordingly, the optical waveguide plate, the plate member, or the jig and the actuator substrate are adopted to one another. Therefore, when the optical waveguide plate is laminated, a constant gap can be finally formed between all of the pixel structures and the optical waveguide plate.

If the thickness is dispersed among the pixel structures, the displacement (displacement amount) of the actuator element after the formation of the pixel is greatly dispersed. However, according to this method, the thickness is uniformly formed for all of the pixel structures. Therefore, it is possible to suppress such dispersion in displacement (displacement amount) of the actuator element.

Owing to the fact that the dispersion scarcely occurs in the thickness of the pixel structure, there is no dispersion in deformation of the pixel structure caused by thermal expansion or contraction. It is advantageous that the dispersion hardly appears in gap amount even when any heat is exerted.

It is also preferable that a low pressure press method is used to pressurize the actuator substrate and the member (the optical waveguide plate, the plate member, or the jig) to be pressurized together with the actuator substrate (invention as defined in claim 37). In this arrangement, it is possible to decrease the stress applied to the actuator substrate. Therefore, it is possible to avoid any damage or the like of the actuator element. Further, little deformation occurs in the actuator substrate and the optical waveguide plate due to the lamination, and the residual stress is small. Accordingly, it is possible to improve the stability and the durability of the gap.

In the methods described above, it is also preferable that the member (the plate member or the jig), which is used to be laminated on the actuator substrate in the first laminating step, has a projection at a portion corresponding to each of the pixel structures, and a recess corresponding to the projection is formed on the surface of the pixel structure when the plate member or the jig and the actuator substrate are pressurized (invention as defined in claim 38).

In the methods described above, it is also preferable that the member (the plate member or the jig), which is used to be laminated on the actuator substrate in the first laminating step, has a projection at a portion corresponding to each of the pixel structures, and a step corresponding to the projection is formed on the surface of the pixel structure when the plate member or the jig and the actuator substrate are pressurized (invention as defined in claim 39).

In the methods described above, it is also preferable that the member (the plate member or the jig), which is used to be laminated on the actuator substrate in the first laminating step, has a convex configuration formed at a portion corresponding to each of the pixel structures.,and a concave configuration corresponding to the convex configuration is formed on the surface of the pixel structure when the plate member or the jig and the actuator substrate are pressurized (invention as defined in claim 40).

The crosspiece and the pixel structure may be formed by using the film formation method and the ceramic sintering method. The film formation method includes the thick film formation method such as the screen printing, the photolithography method, the film lamination method, the spray dipping, the application, and the stamping (the method for placing a liquid material as if a stamp is put); and the thin film formation method such as the ion beam, the sputtering, the vacuum evaporation, the ion plating, CVD, and the plating.

The plate member having the projection on the surface is used in the method for forming the recess and the step on the surface of the pixel structure. For this purpose, it is preferable to use a method in which a metal film or a resist film is formed by the general thin film formation method on a plate member composed of glass. This method is advantageous in that the pattern and the height of the projection can be arbitrarily changed. It is preferable that the height of the projection is about 0.1 to 2 $\mu$m.

Other methods are available to form the recess or the step on the surface of the pixel structure. It is possible to use the plane polishing and the laser beam-based surface processing for the surface of the pixel structure. The laser processing is not directed to the formation of the recess, but it also has an effect of surface improvement by means of heating. Further, it is possible to arbitrarily design the processing pattern. Therefore, the laser processing is used especially preferably.

The method for forming the concave configuration of the surface of the pixel structure includes a method of heating and a method in which a voltage is applied to the actuator element during the hardening of the pixel structure. There are a method in which heating is effected during the figuring hardening with the plate member, and a method in which heating is effected after removing the plate member. It is possible to select the method depending on the material quality of the pixel structure. The usable heating temperature is 15° C. to 150° C. Especially, a temperature of 20° C. to 80° C. is preferably used.

BRIEF DESCRIPTION OF THE DRAWINGS

FIG. 31 illustrates a low pressure press method;

BEST MODE FOR CARRYING OUT THE INVENTION

Several illustrative embodiments of the display device and the method for producing the display device according to the present invention will be explained below with reference to FIGS. 1 to 62B.

Figure 1:
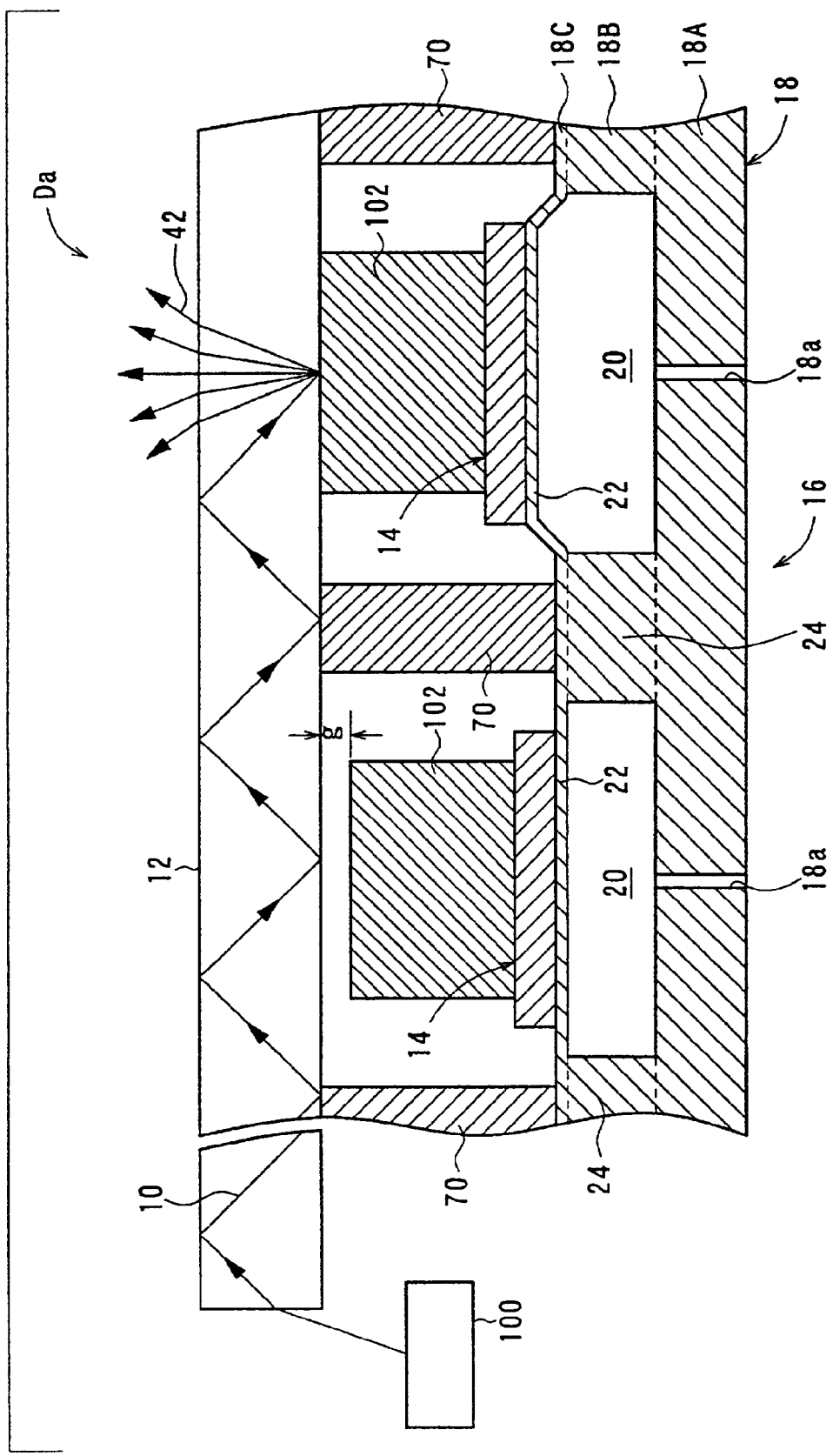
FIG. 1 shows an arrangement illustrating a display device according to a first embodiment.

As shown in FIG. 1, a display device Da according to the first embodiment comprises an optical waveguide plate 12 for introducing light 10 from a light source 100 thereinto, and a driving section 16 provided opposingly to the back surface of the optical waveguide plate 12 and including a large number of actuator elements 14 which are arranged corresponding to pixels in a matrix configuration or in a zigzag configuration.

A pixel structure 102 is stacked on each of the actuator elements 14. The pixel structure 102 functions to increase the contact area with respect to the optical waveguide plate 12 so that the area corresponding to the pixel is obtained.

The driving section 16 includes an actuator substrate 18 composed of, for example, ceramics. The actuator elements 14 are arranged at positions corresponding to the respective pixels on the actuator substrate 18. The actuator substrate 18 has its first principal surface which is arranged to oppose to the back surface of the optical waveguide plate 12. The first principal surface is a continuous surface (flushed surface). Hollow spaces 20 for forming respective vibrating sections as described later on are provided at positions corresponding to the respective pixels at the inside of the actuator substrate 18. The respective hollow spaces 20 communicate with the outside via through-holes 18a each having a small diameter and provided at a second principal surface of the actuator substrate 18.

The portion of the actuator substrate 18, at which the hollow space 20 is formed, is thin-walled. The other portion of the actuator substrate 18 is thick-walled. The thin-walled portion has a structure which tends to undergo vibration in response to external stress, and it functions as a vibrating section 22. The portion other than the hollow space 20 is thick-walled, and it functions as a fixed section 24 for supporting the vibrating section 22.

That is, the actuator substrate 18 has a stacked structure comprising a substrate layer 18A as a lowermost layer, a spacer layer 18B as an intermediate layer, and a thin plate layer 18C as an uppermost layer. The actuator substrate 18 can be recognized as an integrated structure including the hollow spaces 20 formed at the positions in the spacer layer 18B corresponding to the pixels. The substrate layer 18A functions as a substrate for reinforcement, as well as it functions as a substrate for wiring. The actuator substrate 18 may be sintered in an integrated manner, or it may be additionally attached.

Specified embodiments of the actuator element 14 and the pixel structure 102 will now be explained with reference to FIGS. 2 to 10. The embodiments shown In FIGS. 2 to 10 are illustrative of the structure in which the gap-forming layer 50 is formed between the crosspieces 70 and the optical waveguide plate 12 as described later on.

Figure 2:
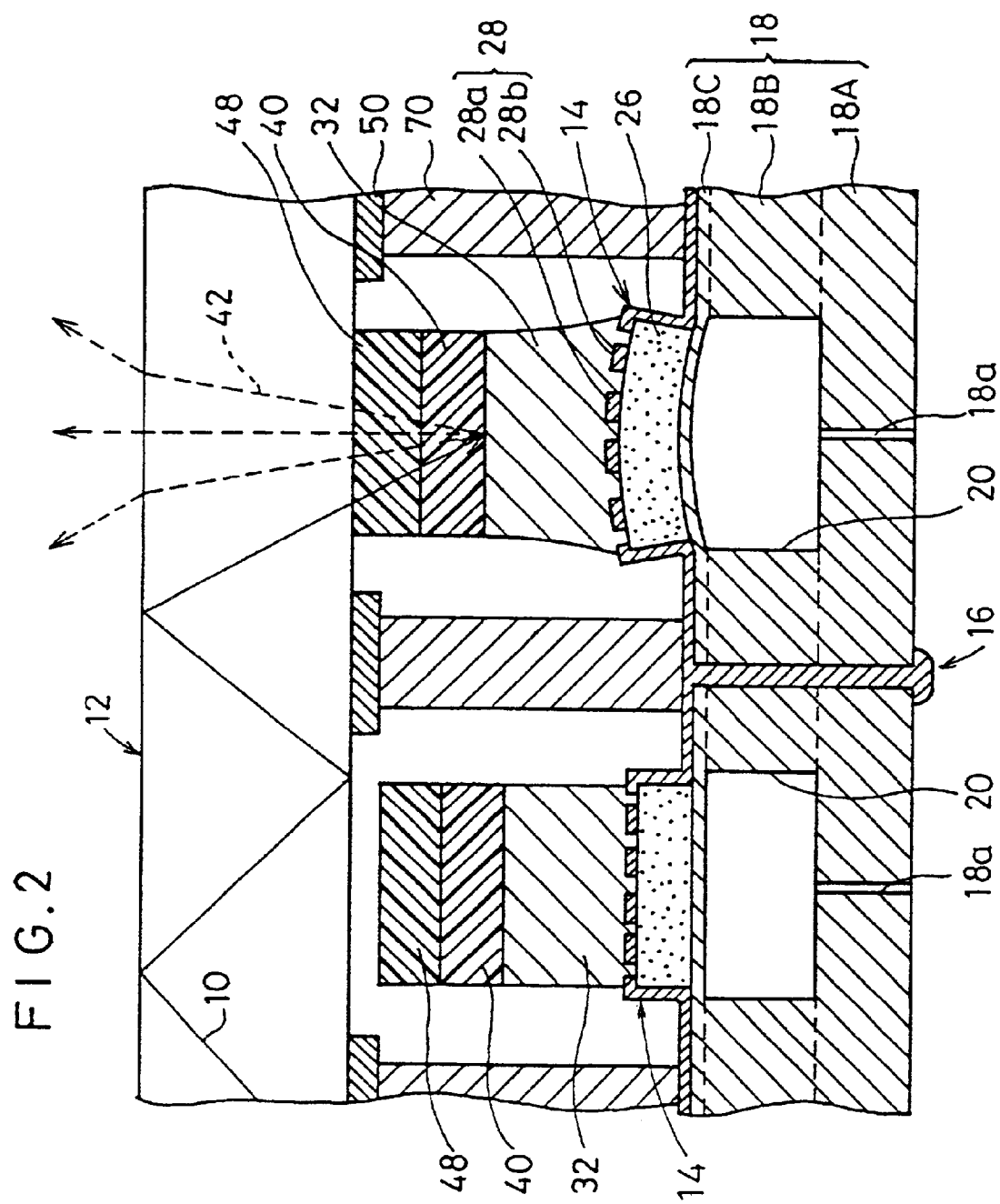
FIG. 2 shows a first illustrative arrangement of the actuator element and the pixel structure.

At first, as shown in FIG. 2, each of the actuator elements 14 comprises the vibrating section 22 and the fixed section 24 described above, as well as a shape-retaining layer 26 composed of, for example, a piezoelectric/electrostrictive layer or an anti-ferroelectric layer directly formed on the vibrating section 22, and a pair of electrodes 28 (a row electrode 28a and a column electrode 28b) formed on an upper surface of the shape-retaining layer 26.

The pair of electrodes 28 may have a structure in which they are formed on upper and lower sides of the shape-retaining layer 26, or they are formed on only one side of the shape-retaining layer 26. However, in order to advantageously joint the actuator substrate 18 and the shape-retaining layer 26, it is preferable that the pair of electrodes 28 are formed only on the upper side (the side opposite to the actuator substrate 18) of the shape-retaining layer 26 so that the actuator substrate 18 directly contacts with the shape-retaining layer 26 without any difference in height, as in this embodiment.

Figure 3:
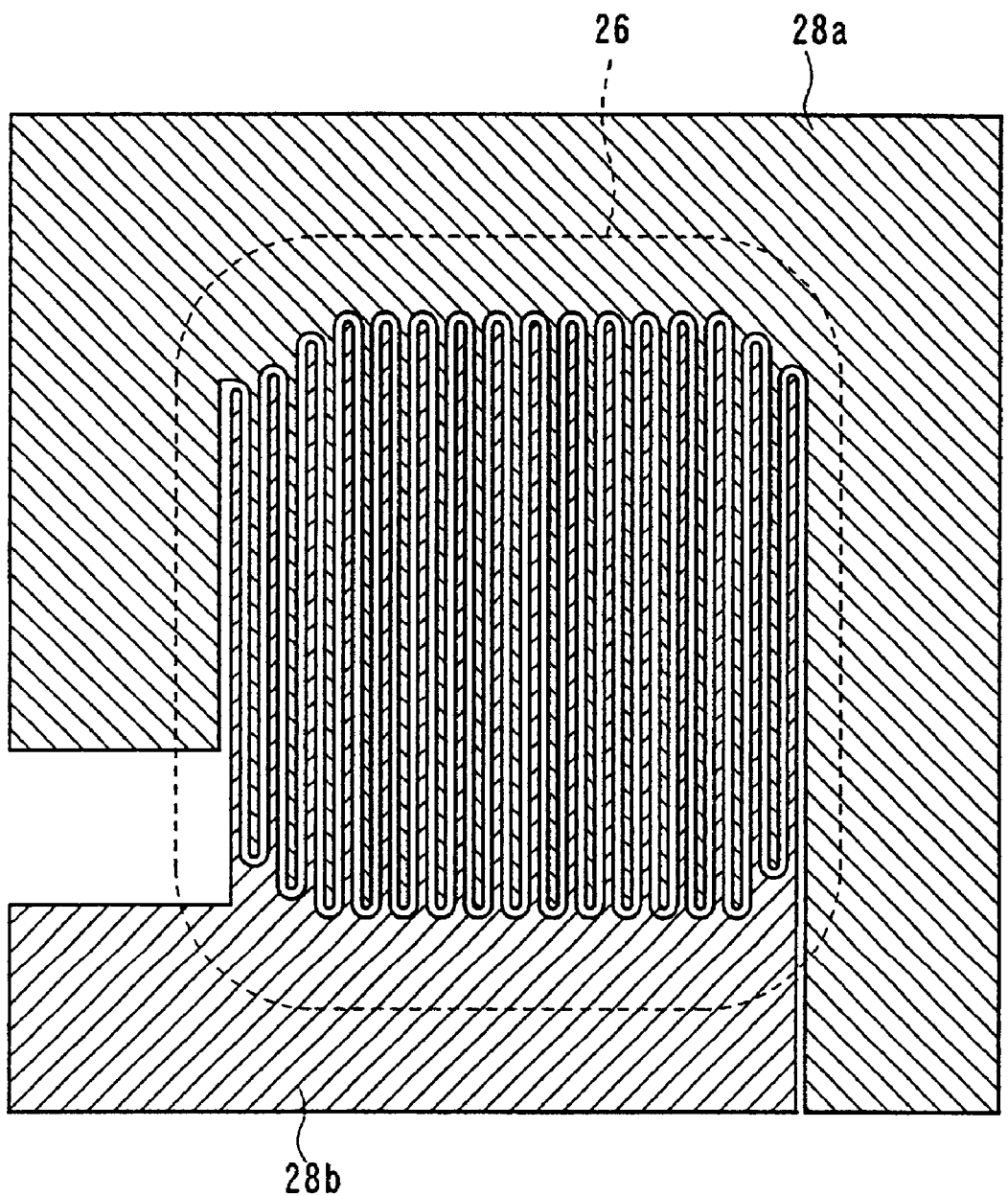
FIG. 3 shows an example of the planar configuration of a pair of electrodes formed on the actuator element.

The planar configuration of the pair of electrodes 28 may be a shape in which a large number of comb teeth are opposed to one another in a complementary manner as shown in FIG. 3. Alternatively, it is possible to adopt, for example, the spiral configuration and the branched configuration as disclosed in Japanese Laid-Open Patent Publication No. 10-78549 as well.

Figure 4A:
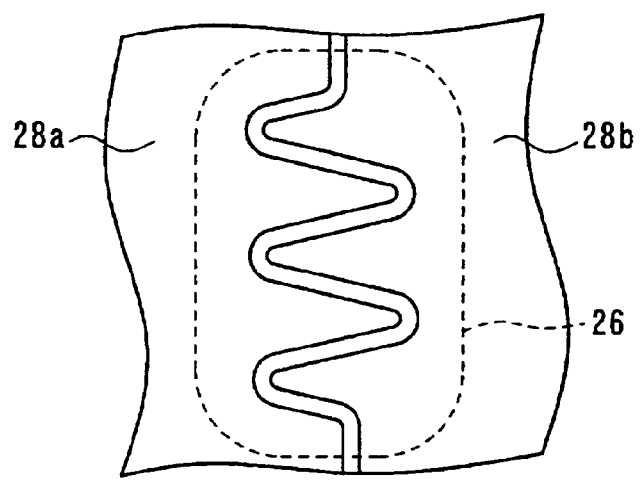
FIG. 4A illustrates an example in which comb teeth of the pair of electrodes are arranged along the major axis of the shape-retaining layer.
Figure 4B:
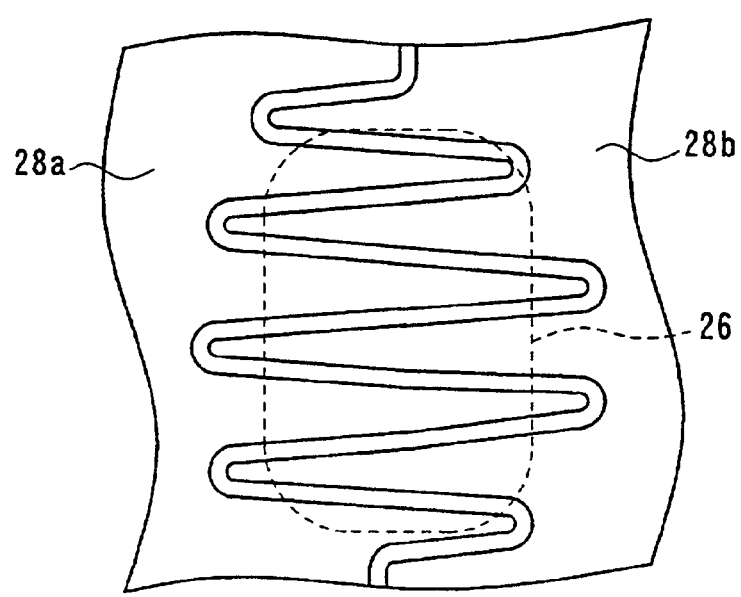
FIG. 4B illustrates another example.
Figure 5A:
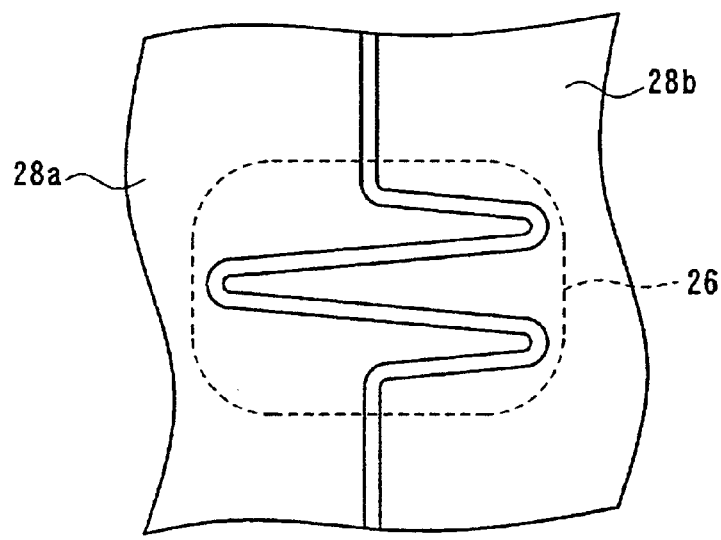
FIG. 5A illustrates an example in which comb teeth of the pair of electrodes are arranged along the minor axis of the shape-retaining layer.
Figure 5B:
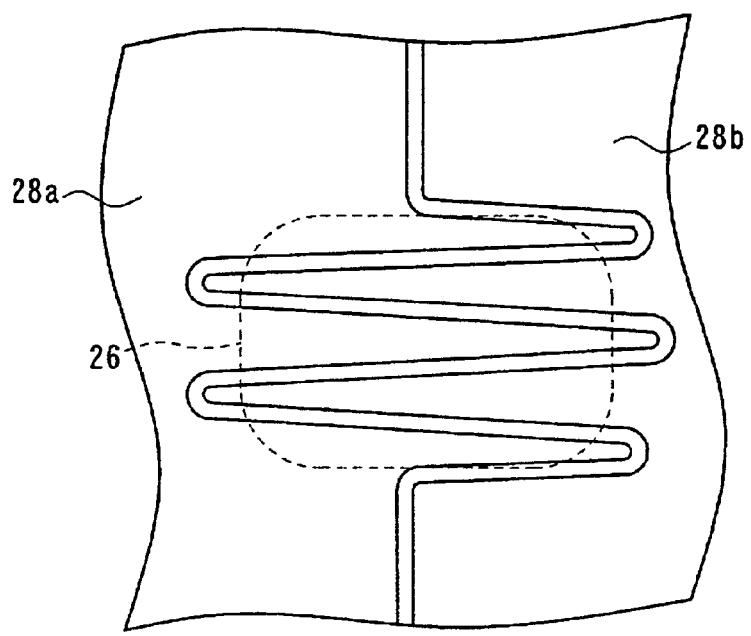
FIG. 5B illustrates another example.

When the planar configuration of the shape-retaining layer 26 is, for example, an elliptic configuration, and the pair of electrodes 28 are formed to have a comb teeth-shaped configuration, then it is possible to use, for example, a form in which the comb teeth of the pair of electrodes 28 are arranged along the major axis of the shape-retaining layer 26 as shown in FIGS. 4A and 4B, and a form in which the comb teeth of the pair of electrodes 28 are arranged along the minor axis of the shape-retaining layer 26 as shown in FIGS. 5A and 5B.

It is possible to use, for example, the form in which the comb teeth of the pair of electrodes 28 are included in the planar configuration of the shape-retaining layer 26 as shown in FIGS. 4A and 5A, and the form in which the comb teeth of the pair of electrodes 28 protrude from the planar configuration of the shape-retaining layer 26 as shown in FIGS. 4B and 5B. The form shown in FIGS. 4B and 5B are more advantageous to effect the bending displacement of the actuator element 14.

Figure 6:
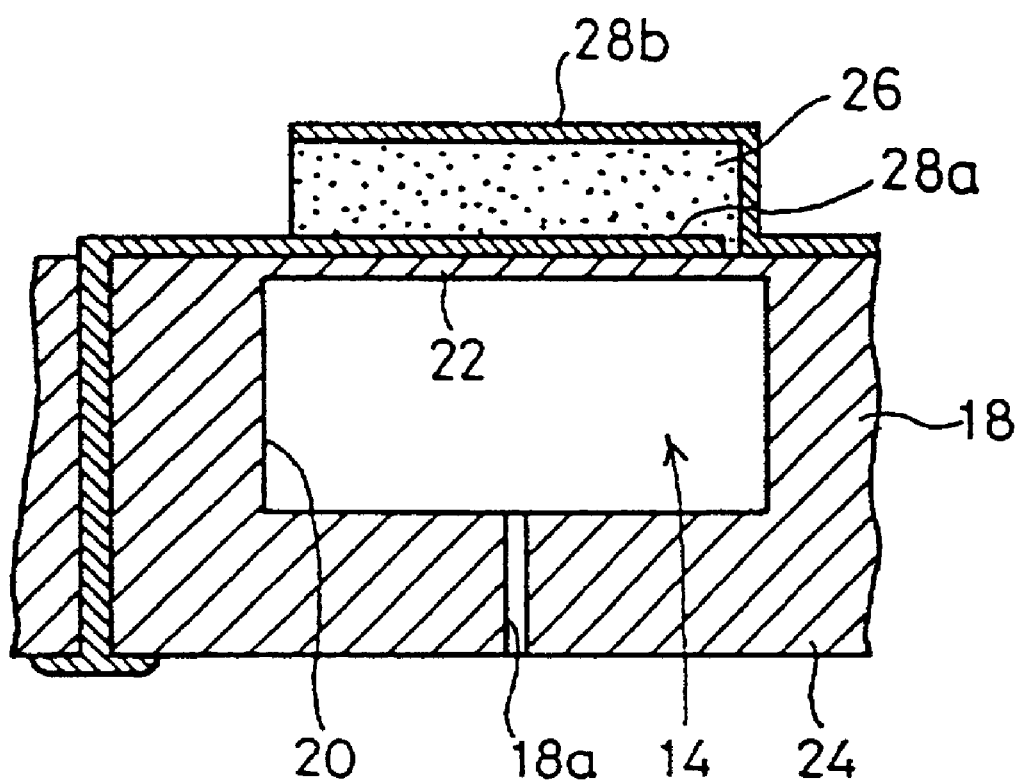
FIG. 6 shows an arrangement illustrating another example of the pair of electrodes formed on the actuator element.

The pair of electrodes 28 are arranged, for example, as follows as shown in FIG. 6. That is, the row electrode 28a is formed on the lower surface of the shape-retaining layer 26, and the column electrode 28b is formed on the upper surface of the shape-retaining layer 26.

Figure 7:
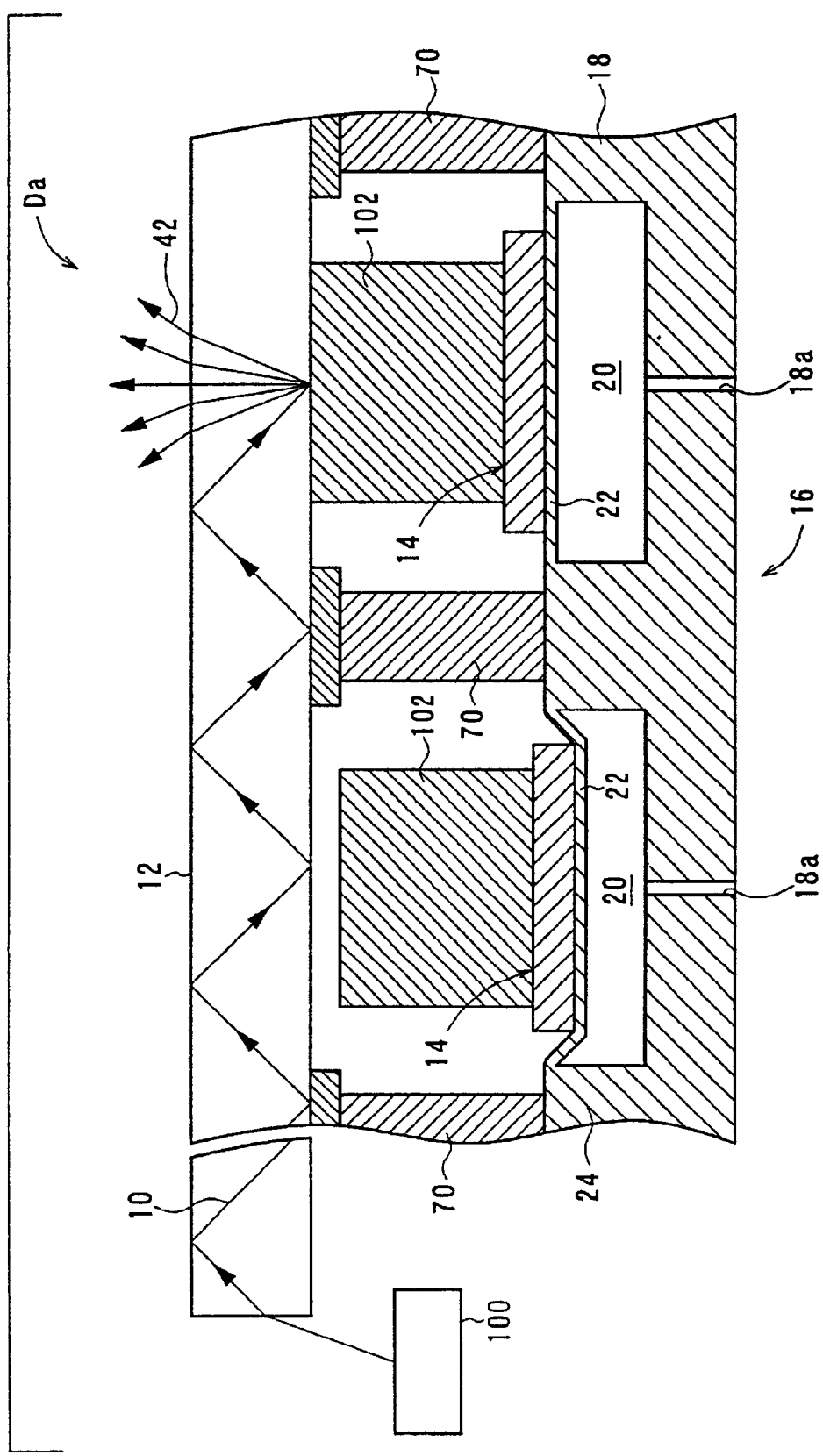
FIG. 7 shows an arrangement illustrating the display device when the actuator element is subjected to the bending displacement in the second direction to be convex toward the hollow space.

In this embodiment, as shown in FIG. 1, the actuator element 14 can be allowed to make bending displacement in the first direction so that it is convex toward the optical waveguide plate 12. Alternatively, as shown in FIG. 7, the actuator element 14 can be allowed to make bending displacement in the second direction so that it is convex toward the hollow space 20.

On the other hand, as shown in FIG. 2, for example, the pixel structure 102 can be constructed as a stacked structure comprising a transparent layer 48, a color filter 40, and a white scattering element 32 to serve as a displacement transmitting section formed on the actuator element 14.

Figure 8:
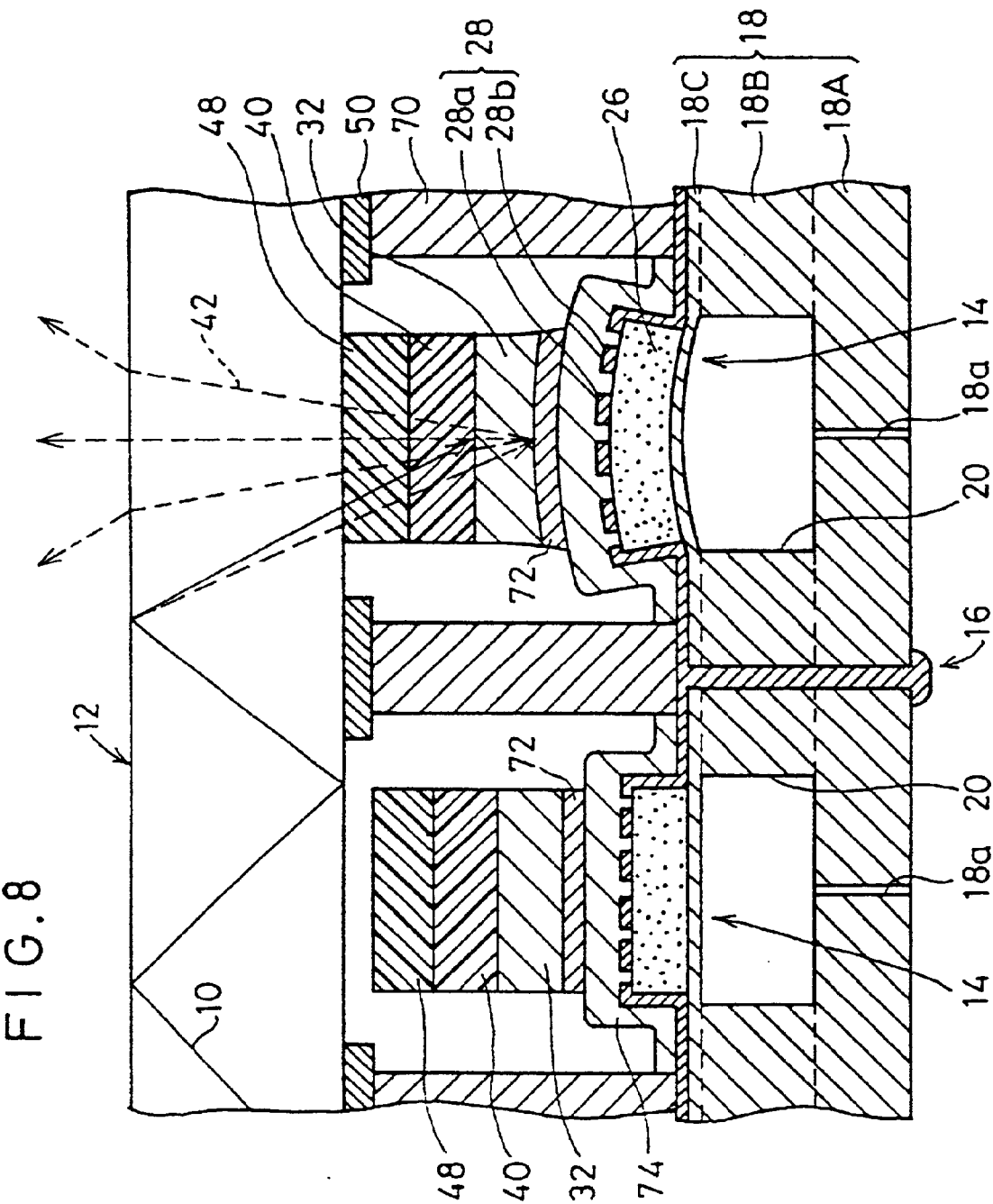
FIG. 8 shows a second illustrative arrangement of the actuator element and the pixel structure.

Further, as shown in FIG. 8, a light-reflective layer 72 may be allowed to intervene as a layer disposed under the white scattering element 32. In this arrangement, when the light-reflective layer 72 is composed of a conductive layer such as those made of metal, it is feared that a short circuit may be formed between the pair of electrodes 28a, 28b of the actuator element 14. Therefore, it is desirable that an insulative layer 74 is formed between the light-reflective layer 72 and the actuator element 14.

Figure 9:
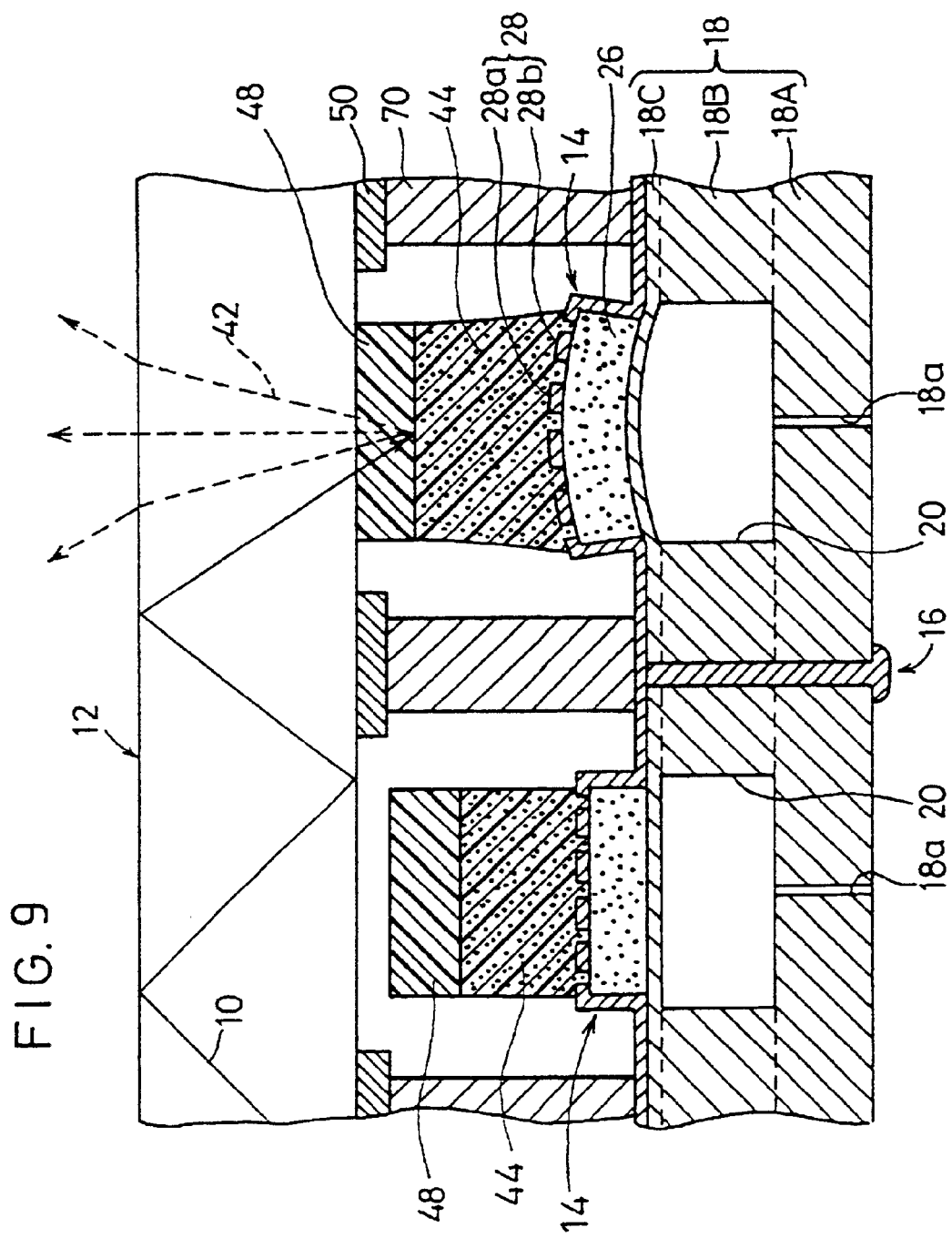
FIG. 9 shows a third illustrative arrangement of the actuator element and the pixel structure.
Figure 10:
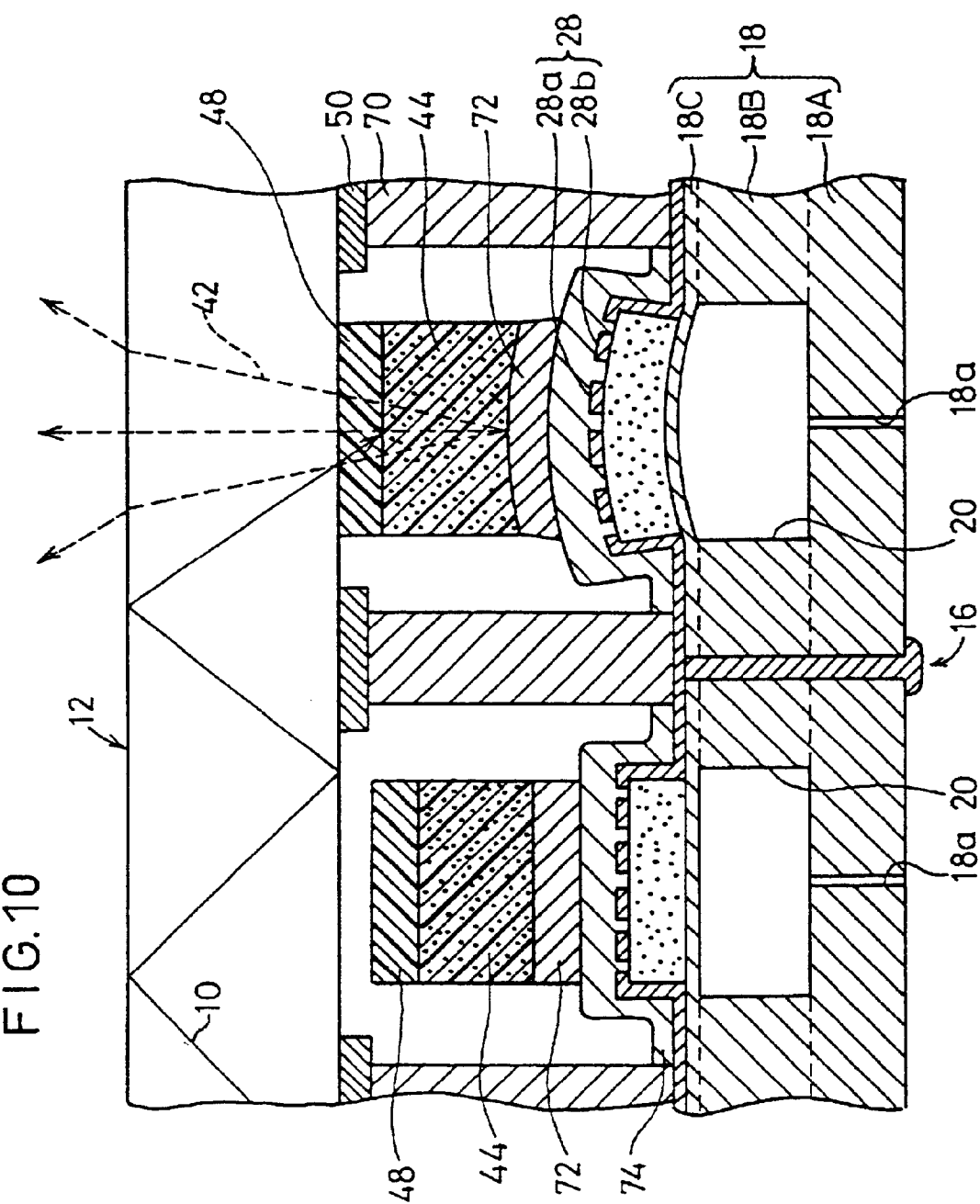
FIG. 10 shows a fourth illustrative arrangement of the actuator element and the pixel structure.

Another example of the pixel structure 102 is shown, for example, in FIG. 9. That is, the pixel structure 102 can be also constructed by a stacked structure comprising a as transparent layer 48 and a color scattering element 44 also used as the displacement-transmitting section formed on the actuator element 14. Also in this case, as shown in FIG. 10, a light-reflective layer 72 and an insulative layer 74 may be allowed to intervene between the actuator element 14 and the color scattering element 44.

As shown in FIG. 1, the display device Da according to the first embodiment comprises the crosspiece 70 formed at the portion other than the pixel structure 102 between the optical waveguide plate 12 and the actuator substrate 18. The embodiment shown in FIG. 1 is illustrative of the case in which the optical waveguide plate 12 is directly secured to the upper surface of the crosspiece 70. It is preferable that the material for the crosspiece 70 is not deformable against the heat and the pressure.

Figure 11:
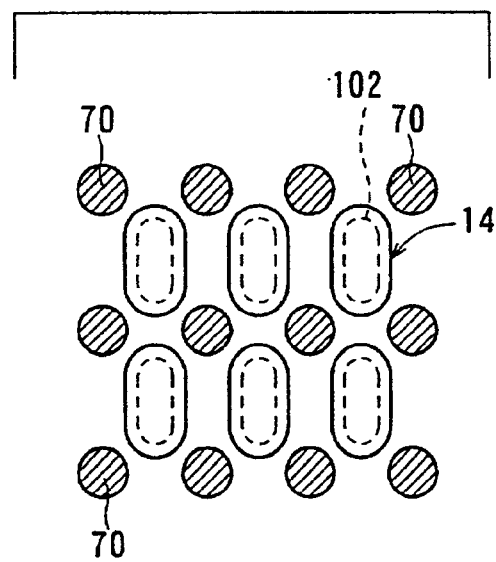
FIG. 11 illustrates an arrangement in which the crosspieces are formed at portions around four corners of the pixel structures respectively.

The crosspieces 70 can be formed, for example, at portions around four corners of the pixel structures 102. As shown in FIG. 11, the portions around four corners of the pixel structure 102 are exemplified by positions corresponding to the respective corners, for example, when the pixel structure 102 has a rectangular or elliptic planar configuration. The portions refer to a form in which one crosspiece 70 is shared by the adjoining pixel structure 102.

Next, several modified embodiments of the arrangement of the crosspiece 70 will be explained with reference to FIGS. 12 to 16.

Figure 12:
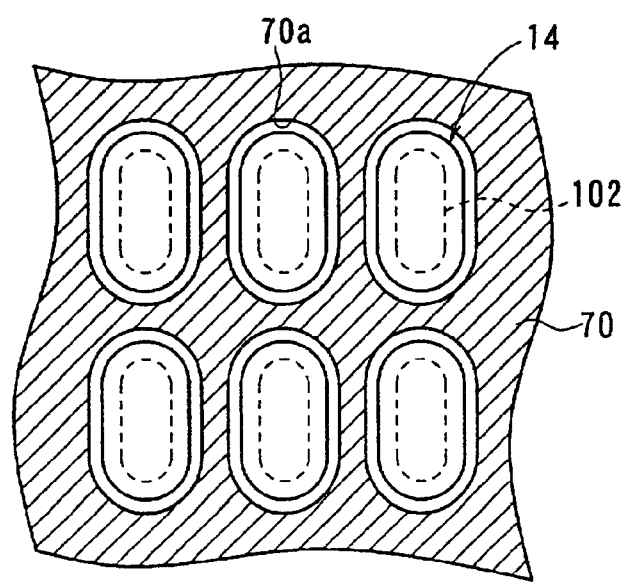
FIG. 12 illustrates an arrangement of the crosspiece concerning a first modified embodiment.

At first, the crosspiece according to the first modified embodiment is shown in FIG. 12. The crosspiece 70 includes windows 70a for surrounding at least one pixel structure 102. The representative illustrative arrangement is as follows. That is, for example, the crosspiece 70 itself is formed to have a plate-shaped configuration, and the windows (openings) 70a each having a shape similar to the outer contour of the pixel structure 102 are formed at the positions corresponding to the pixel structures 102. Accordingly, an arrangement is given, in which all of the side surfaces of the pixel structures 102 are surrounded by the crosspiece 70. Thus, the actuator substrate 18 and the optical waveguide plate 12 are secured to one another more tightly.

Figure 13:
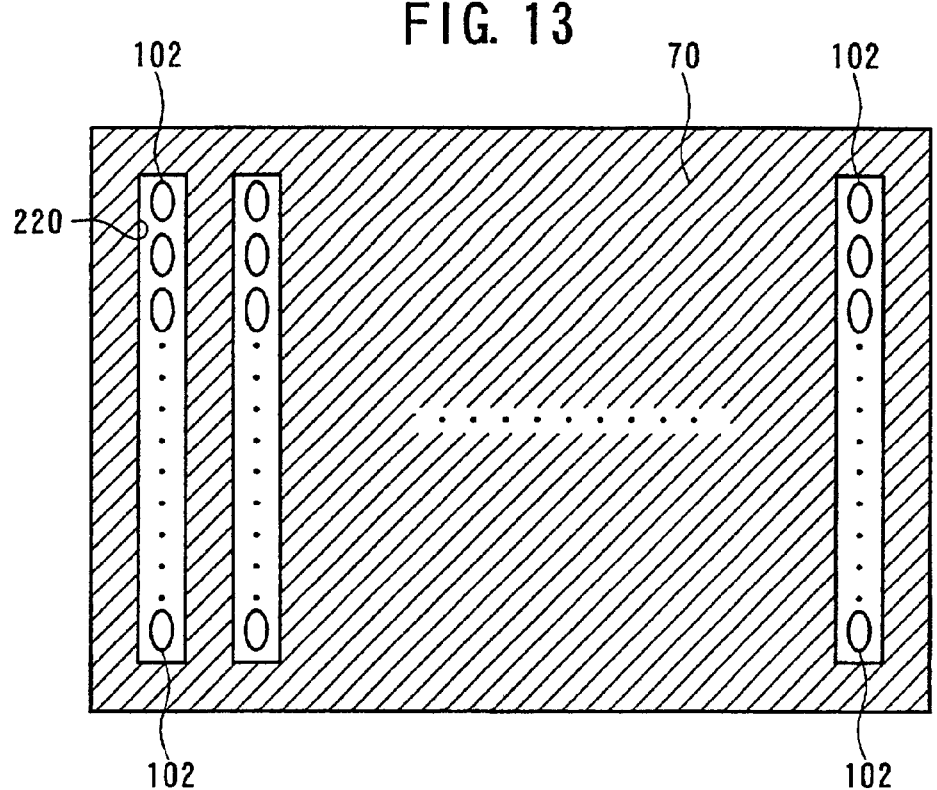
FIG. 13 illustrates an arrangement of the crosspiece concerning a second modified embodiment.

As shown in FIG. 13, the crosspiece according to the second modified embodiment includes stripe-shaped openings 220 each of which extends in the direction of the array of the pixel structures and each of which surrounds the array of the pixel structures. Each of the openings 220 has an opening width which is enough to include one or more arrays. This embodiment is illustrative of a case in which the opening 220 has an opening width which includes one array of the group of pixel structures 102.

Figure 14:
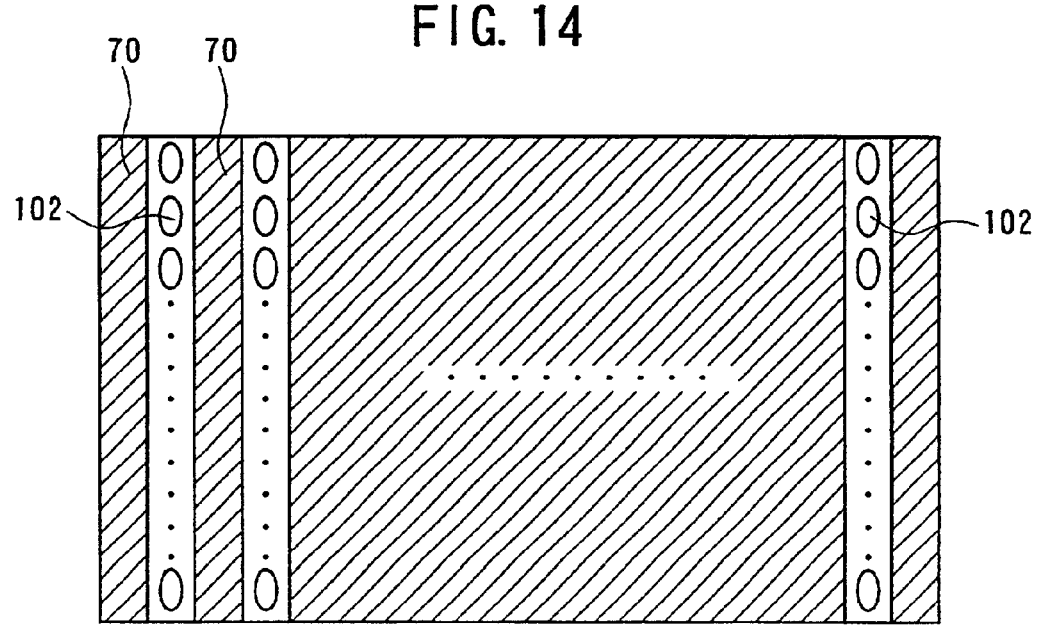
FIG. 14 illustrates an arrangement of the crosspiece concerning a third modified embodiment.
Figure 15:
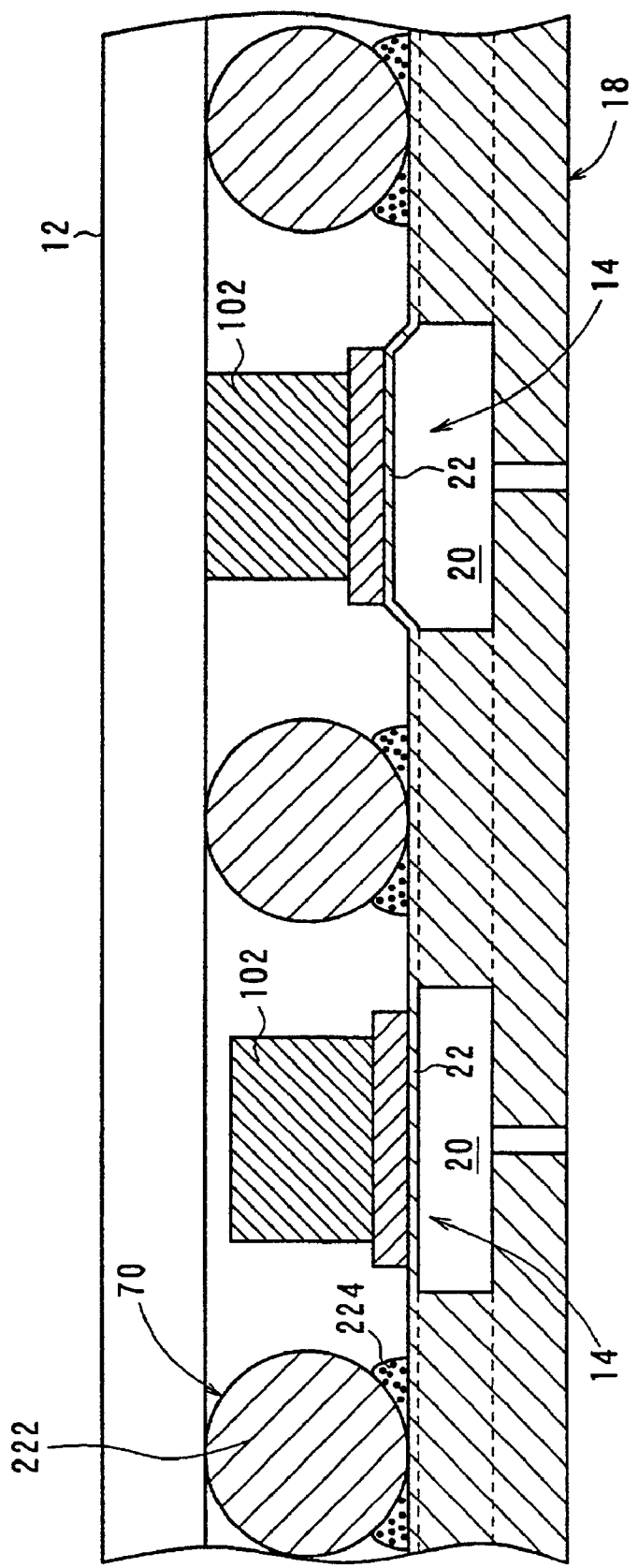
FIG. 15 illustrates an arrangement of the crosspiece concerning a fourth modified embodiment.

As shown in FIG. 14, the crosspiece 70 according to the third modified embodiment has a shape extending linearly along the direction of the array of the pixel structures 102. In this arrangement, as in a crosspiece 70 according to a fourth modified embodiment shown in FIG. 15, for example, it is also preferable to use a wire member 222 having a substantially circular cross section. The embodiment shown in FIG. 15 is illustrative of the case in which the wire member 222 for constructing the crosspiece 70 is secured to the actuator substrate 18 by using an adhesive 224. The cross-sectional configuration of the wire member 222 include, for example, the circular configuration as described above as well as elliptic configurations and polygonal configurations such as hexagon and octagon.

Figure 16:
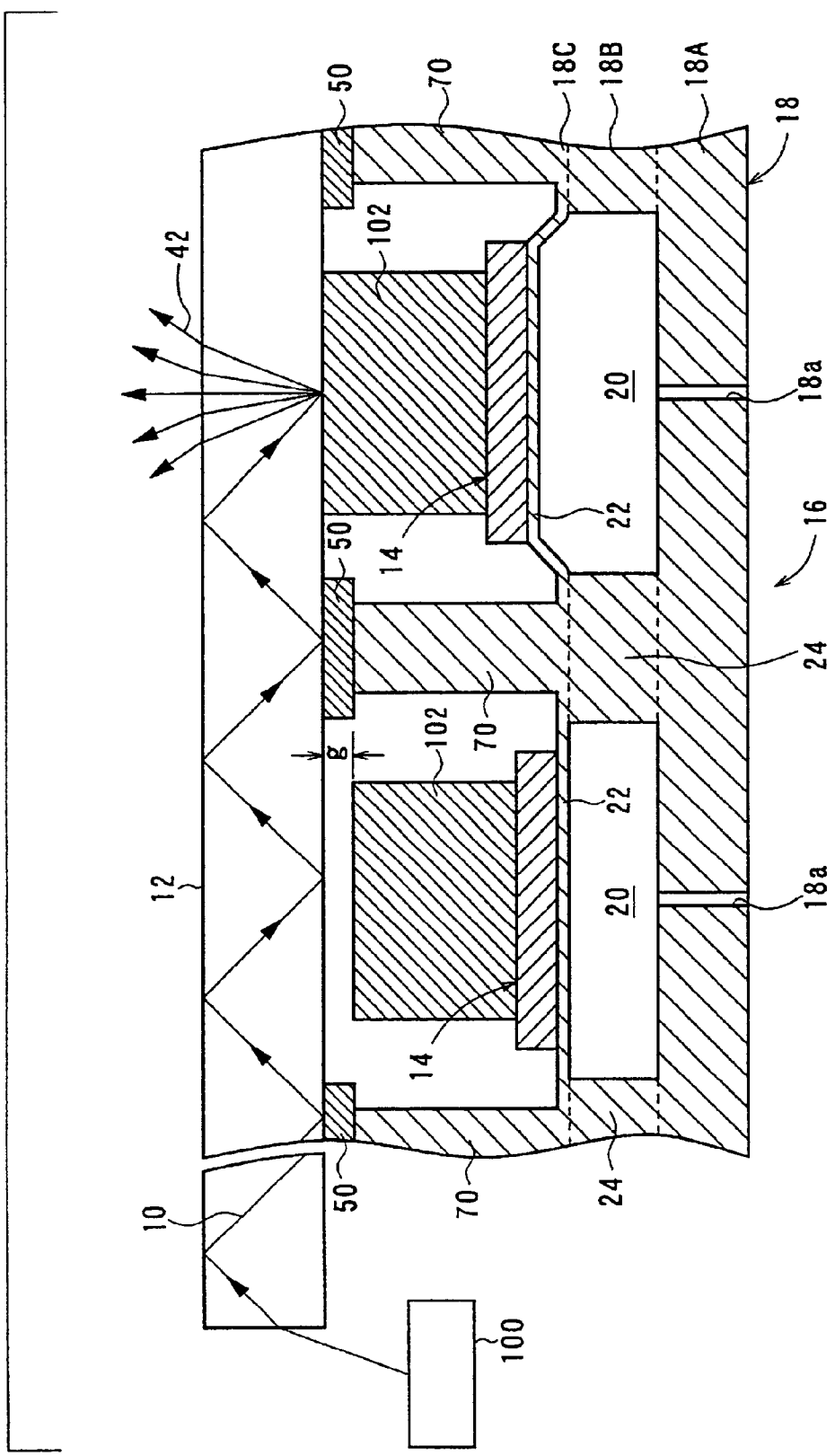
FIG. 16 illustrates an arrangement of the crosspiece concerning a fifth modified embodiment.

As shown in FIG. 16, the crosspiece 70 according to the fifth modified embodiment is arranged and formed with ceramics integrally with the actuator substrate 18 at portions other than the pixel structures 102, of the actuator substrate 18.

In this embodiment, it is possible to improve the mechanical strength of the portion at which the crosspiece 70 is formed on the actuator substrate 18. Accordingly, the rigidity of the actuator substrate 18 is enhanced. As a result, for example, the crosspiece 70 can be used to protect the actuator element 14, especially the vibrating section 22 thereof formed on the actuator substrate 18 when the actuator substrate 18 is carried and stored.

Explanation will now be made for the respective constitutive components of the display device Da, especially, for example, for selection of materials for the respective constitutive components.

The light 10 to be introduced into the optical waveguide plate 12 may be any one of those of ultraviolet, visible, and infrared regions. Those usable as the light source 100 include, for example, incandescent lamp, deuterium discharge lamp, fluorescent lamp, mercury lamp, metal halide lamp, halogen lamp, xenon lamp, tritium lamp, light emitting diode, laser, plasma light source, hot cathode tube, and cold cathode tube.

It is preferable that the vibrating section 22 is composed of a highly heat-resistant material, because of the following reason. That is, when the actuator element 14 has the structure in which the vibrating section 22 is directly supported by the fixed section 24 without using any material such as an organic adhesive which is inferior in heat resistance, the vibrating section 22 is preferably composed of a highly heat-resistant material so that the vibrating section 22 is not deteriorated in quality at least during the formation of the shape-retaining layer 26.

It is preferable that the vibrating section 22 is composed of an electrically insulative material in order to electrically separate the wiring (for example, row selection line) connected to the row electrode 28a of the pair of electrodes 28 formed on the actuator substrate 18, from the wiring (for example, signal line) connected to the column electrode 28b.

Therefore, the vibrating section 22 may be composed of a material such as a highly heat-resistant metal and a porcelain enamel produced by coating a surface of such a metal with a ceramic material such as glass. However, the vibrating section 22 is optimally composed of ceramics.

Those usable as the ceramics for constructing the vibrating section 22 include, for example, stabilized zirconium oxide, aluminum oxide, magnesium oxide, titanium oxide, spinel, mullite, aluminum nitride, silicon nitride, glass, and mixtures thereof. Stabilized zirconium oxide is especially preferred because of, for example, high mechanical strength obtained even when the thickness of the vibrating section 22 is thin, high toughness, and small chemical reactivity with the shape-retaining layer 26 and the pair of electrodes 28. The term "stabilized zirconium oxide" includes stabilized zirconium oxide and partially stabilized zirconium oxide. Stabilized zirconium oxide has a crystal structure such as cubic crystal, and hence it does not cause phase transition.

On the other hand, zirconium oxide causes phase transition between monoclinic crystal and tetragonal crystal at about 1000° C. Cracks appear during the phase transition in some cases. Stabilized zirconium oxide contains 1 to 30 mole % of a stabilizer such as calcium oxide, magnesium oxide, yttrium oxide, scandium oxide, ytterbium oxide, cerium oxide, and oxides of rare earth metals. In order to enhance the mechanical strength of the vibrating section 22, the stabilizer preferably comprises yttrium oxide. In this composition, yttrium oxide is contained preferably in an amount of 1.5 to 6 mole %, and more preferably 2 to 4 mole %. It is preferable that aluminum oxide is further contained in an amount of 0.1 to 5 mole %.

The crystal phase may be, for example, a mixed phase of cubic crystal+monoclinic crystal, a mixed phase of tetragonal crystal+monoclinic crystal, and a mixed phase of cubic crystal+tetragonal crystal+monoclinic crystal. However, among them, most preferred are those having a principal crystal phase composed of tetragonal crystal or a mixed phase of tetragonal crystal+cubic crystal, from viewpoints of strength, toughness, and durability.

When the vibrating section 22 is composed of ceramics, a large number of crystal grains construct the vibrating section 22. In order to increase the mechanical strength of the vibrating section 22, the crystal grains preferably have an average grain diameter of 0.05 to 2 $\mu$m, and more preferably 0.1 to 1 $\mu$m.

The fixed section 24 preferably composed of ceramics. The fixed section 24 may be composed of the same ceramic material as that used for the vibrating section 22, or the fixed section 24 may be composed of a ceramic material different from that used for the vibrating section 22. Those usable as the ceramic material for constructing the fixed section 24 include, for example, stabilized zirconium oxide, aluminum oxide, magnesium oxide, titanium oxide, spinel, mullite, aluminum nitride, silicon nitride, glass, and mixtures thereof, in the same manner as the material for the vibrating section 22.

Especially, those preferably adopted for the actuator substrate 18 used in the display device Da according to the first embodiment include, for example, materials containing a major component of zirconium oxide, materials containing a major component of aluminum oxide, and materials containing a major component of a mixture thereof. Among them, those containing a major component of zirconium oxide are more preferable.

Clay or the like is added as a sintering aid in some cases. However, it is necessary to control components of the sintering aid in order not to contain an excessive amount of those liable to form glass, such as silicon oxide and boron oxide because of the following reason. That is, although the materials which are liable to form glass are advantageous to join the actuator substrate 18 to the shape-retaining layer 26, the materials facilitate the reaction between the actuator substrate 18 and the shape-retaining layer 26, making it difficult to maintain a predetermined composition of the shape-retaining layer 26. As a result, the materials make a cause to deteriorate the element characteristics.

That is, it is preferable that silicon oxide or the like in the actuator substrate 18 is restricted to have a weight ratio of not more than 3%, and more preferably not more than 1%. The term "major component" herein refers to a component which exists in a proportion of not less than is 50% in weight ratio.

As described above, those usable as the shape-retaining layer 26 include piezoelectric/electrostrictive layers and anti-ferroelectric layers. However, when the piezoelectric/electrostrictive layer is used as the shape-retaining layer 26, those usable as the piezoelectric/electrostrictive layer include ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, or any combination of them.

It is needless to say that the major component contains the compound as described above in an amount of not less than 50% by weight. Among the ceramics described above, the ceramics containing lead zirconate is most frequently used as the constitutive material for the piezoelectric/electrostrictive layer for constructing the shape-retaining layer 26.

When the piezoelectric/electrostrictive layer is composed of ceramics, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof. For example, it is preferable to use ceramics containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 26, it is desirable to use, as the anti-ferroelectric layer, a compound containing a major component composed of lead zirconate, a compound containing a major component composed of lead zirconate and lead stannate, a compound obtained by adding lanthanum to lead zirconate, and a compound obtained by adding lead zirconate and lead niobate to a component composed of lead zirconate and lead stannate.

Especially, when an anti-ferroelectric film, which contains lead zirconate and lead stannate as represented by the following composition, is applied as a film-type element such as the actuator element 14, it is possible to perform driving at a relatively low voltage. Therefore, application of such an anti-ferroelectric film is especially preferred.

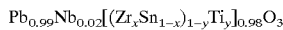
wherein, 0.5<x<0.6, 0.05<y<0.063, 0.01<Nb<0.03.

The anti-ferroelectric film may be porous. When the anti-ferroelectric film is porous, it is desirable that the porosity is not more than 30%.

It is preferable that the thickness of the vibrating section 22 of the actuator substrate 18 have a dimension identical to that of the thickness of the shape-retaining layer 26 formed on the vibrating section 22, because of the following reason. That is, if the thickness of the vibrating section 22 is extremely thicker than the thickness of the shape-retaining layer 26 (if the former is different from the latter by not less than one figure), when the shape-retaining layer 26 makes shrinkage upon sintering, the vibrating section 22 behaves to inhibit the shrinkage. For this reason, the stress at the boundary surface between the shape-retaining layer 26 and the actuator substrate 18 is increased, and consequently they are easily peeled off from each other. On the contrary, when the dimension of the thickness is in an identical degree between the both, it is easy for the actuator substrate 18 (vibrating section 22) to follow the shrinkage of the shape-retaining layer 26 upon sintering. Accordingly, such dimension of the thickness is preferred to achieve integration. Specifically, the vibrating section 22 preferably has a thickness of 1 to 100 $\mu$m, more preferably 3 to 50 $\mu$m, and much more preferably 5 to 20 $\mu$m. On the other hand, the shape-retaining layer 26 preferably has a thickness of 5 to 100 $\mu$m, more preferably 5 to 50 $\mu$m, and much more preferably 5 to 30 $\mu$m.

The pair of electrodes 28 formed on the shape-retaining layer 26 are allowed to have an appropriate thickness depending on the use or application. However, the thickness is preferably 0.01 to 50 $\mu$m, and more preferably 0.1 to 5 $\mu$m. The pair of electrodes 28 are preferably composed of a conductive metal which is solid at room temperature. The metal includes, for example, metal simple substances or alloys containing, for example, aluminum, titanium, chromium, iron, cobalt, nickel, copper, zinc, niobium, molybdenum, ruthenium, rhodium, silver, stannum, tantalum, tungsten, iridium, platinum, gold, and lead. It is needless to say that these elements may be contained in an arbitrary combination.

The optical waveguide plate 12 has an optical refractive index with which the light 10 introduced into the inside thereof is totally reflected by the front and back surfaces without being transmitted to the outside of the optical waveguide plate 12. It is necessary for the optical waveguide plate 12 to use those having a large and uniform light transmittance in the wavelength region of the light to be introduced. The material for the optical waveguide plate 12 is not specifically limited provided that it satisfies the foregoing characteristic. However, specifically, those generally used for the optical waveguide plate 12 include, for example, glass, quartz, light-transmissive plastics such as acrylic plastics, light-transmissive ceramics, structural materials comprising a plurality of layers composed of materials having different refractive indexes, and those having a surface coating layer.

The color layer such as the color filter 40 and the color scattering element included, in the pixel structure 102 is the layer which is used to extract only the light in a specified wavelength region, and it includes, for example, those which develops the color by absorbing, transmitting, reflecting, or scattering the light at a specified wavelength, and those which convert incident light into light having a different wavelength. The transparent member, the semitransparent member, and the opaque member can be used singly or in combination.

The color layer is constructed, for example, as follows. That is, the color layer includes, for example, those obtained by dispersing or dissolving a dyestuff or a fluorescent material such as dye, pigment, and ion in rubber, organic resin, light-transmissive ceramics, glass, liquid or the like, those obtained by applying the dyestuff or the fluorescent material on the surface of the foregoing material, those obtained by sintering, for example, the powder of the dyestuff or the fluorescent material, and those obtained by pressing and solidifying the powder of the dyestuff or the fluorescent material. As for the material quality and the structure, the materials may be used singly, or the materials may be used in combination.

The difference between the color filter 40 and the color scattering element 44 lies in whether or not the brightness value of leakage light obtained by reflection and scattering effected by only the color layer is not less than 0.5-fold the brightness value of leakage light obtained by reflection and scattering effected by the entire structure including the pixel structure 102 and the actuator element 14, when the light emission state is given by allowing the pixel structure 102 to make contact with the optical waveguide plate 12 into which the light 10 is introduced. If the former brightness value is not less than 0.5-fold the latter brightness value, the color layer is defined to be the color scattering element 44. If the former brightness value is less than 0.5-fold the latter brightness value, the color layer is defined to be the color filter 40.

The measuring method is specifically exemplified as follows. That is, it is assumed that when the color layer is singly allowed to make contact with the back surface of the optical waveguide plate 12 into which the light 10 is introduced, A(nt) represents the front brightness of the light which passes from the color layer through the optical waveguide plate 12 and which leaks to the front surface. Further, it is assumed that when the pixel structure 102 is allowed to make contact with the surface of the color layer on the side opposite to the side to make contact with the optical waveguide plate 12, B(nt) represents the front brightness of the light which leaks to the front surface. If A$\geq$0.5×B is satisfied, the color layer is the color scattering element 44. If A<0.5×B is satisfied, the color layer is the color filter 40.

The front brightness is the brightness measured by arranging a luminance meter so that the line to connect the color layer to the luminance meter for measuring the brightness is perpendicular to the surface of the optical waveguide plate 12 to make contact with the color layer (the detection surface of the luminance meter is parallel to the plate surface of the optical waveguide plate).

The color scattering element 44 is advantageous in that the color tone and the brightness are scarcely changed depending on the thickness of the layer. Accordingly, those applicable as the method for forming the layer includes various methods such as the screen printing which requires inexpensive cost although it is difficult to strictly control the layer thickness.

Owing to the arrangement in which the color scattering element 44 also serves as the displacement-transmitting section, it is possible to simplify the process for forming the layer. Further, it is possible to obtain a thin entire layer thickness. Therefore, the thickness of the entire display device can be made thin. Further, it is possible to avoid the decrease in displacement amount of the actuator element 14, and improve the response speed.

The color filter 40 has the following advantages. That is, when the layer is formed on the side of the optical waveguide plate 12, the layer can be easily formed, because the optical waveguide plate 12 is flat, and it has high surface smoothness. Thus, the range of process selection is widened, and the cost becomes inexpensive. Further, it is easy to control the layer thickness which may affect the color tone and the brightness.

The method for forming the film of the color layer such as the color filter 40 and the color scattering element 44 is not specifically limited, to which it is possible to apply a variety of known film formation methods. Those usable include, for example, a film lamination method in which the color layer in a chip form or in a film form is directly stuck on the surface of the optical waveguide plate 12 or the actuator element 14, as well as a method for forming the color layer in which, for example, powder, paste, liquid, gas, or ion to serve as a raw material for the color layer is formed into a film in accordance with the thick film formation method such as the screen printing, the photolithography method, the spray dipping, and the application, or in accordance with the thin film formation method such as the ion beam, the sputtering, the vacuum evaporation, the ion plating, CVD, and the plating.

Next, the operation of the display device Da according to the first embodiment will be briefly described with reference to FIG. 1. At first, the light 10 is introduced, for example, from the end portion of the optical waveguide plate 12. In this embodiment, all of the light 10 is totally reflected at the inside of the optical waveguide plate 12 without being transmitted through the front and back surfaces thereof by controlling the magnitude of the refractive index of the optical waveguide plate 12. In this embodiment, the optical waveguide plate 12 desirably has a reflection factor n of 1.3 to 1.8, and more desirably 1.4 to 1.7.

In this state, when a certain actuator element 14 is in the selected state, the actuator element 14 makes bending displacement so that it is convex toward the optical waveguide plate 12, i.e., the actuator element 14 makes bending displacement in the first direction, and the end surface of the pixel structure 102 contacts, at a distance of not more than the wavelength of light 10, with the optical waveguide plate 12, then the light 10, which has been subjected to total reflection, is reflected by the surface of the pixel structure 102, and it behaves as scattered light 42. A part of the scattered light 42 is reflected again in the optical waveguide plate 12. However, almost all of the scattered light 42 is not reflected by the optical waveguide plate 12, and it is transmitted through the front surface (face) of the optical waveguide plate 12. Accordingly, the pixel corresponding to the actuator element 14 is in the ON state, and the ON state is expressed in a form of light emission. Further, the color of the light emission corresponds to the color of the color filter 40 or the color scattering element 44 included in the pixel structure 102.

That is, in the display device Da, the presence or absence of light emission (leakage light) at the front surface of the optical waveguide plate 12 can be controlled depending on the presence or absence of the contact of the pixel structure 102 with the optical waveguide plate 12. Especially, in the display device Da according to the first embodiment, one unit for making the displacement action of the pixel structure 102 in the direction to make contact or separation with respect to the optical waveguide plate 12 may be recognized, for example, as one pixel. A large number of the pixels are arranged in a matrix configuration or in a zigzag configuration concerning the respective rows. Therefore, it is possible to display a picture image (characters and graphics) corresponding to the image signal on the front surface of the optical waveguide plate 12, i.e., on the display surface, in the same manner as in the cathode ray tube, the liquid crystal display device, and the plasma display, by controlling the displacement action in each of the pixels in accordance with the attribute of the inputted image signal.

Figure 17:
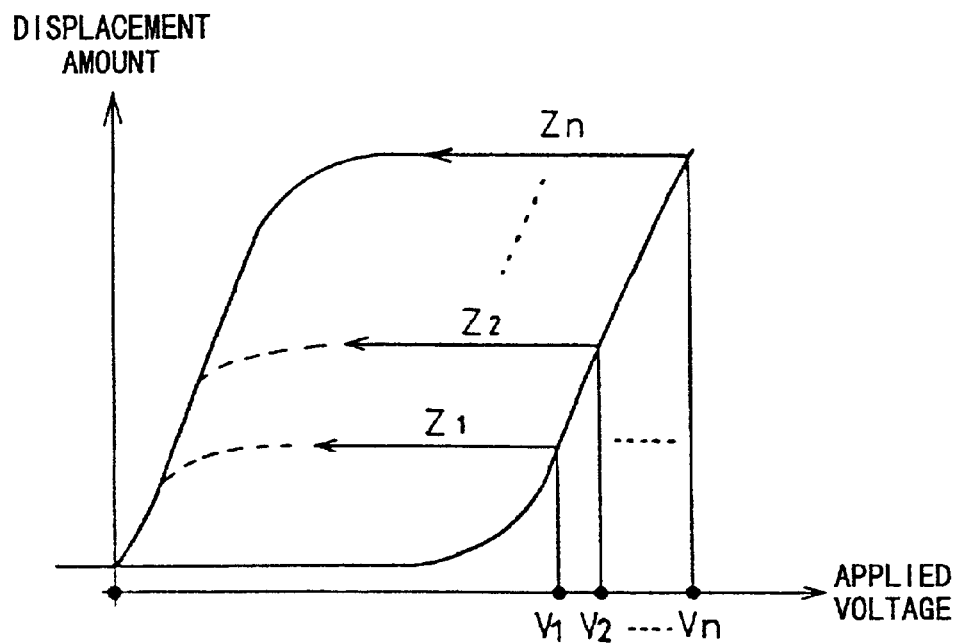
FIG. 17 shows the displacement characteristic of the actuator element to explain the gradation control based on the voltage modulation system.

In the gradation control over the display, for example, it is possible to adopt the voltage modulation system and the time modulation system. For example, in the voltage modulation system, when one row is selected, for example, voltages corresponding to the gradation of the respective actuator elements 14 are applied to a large number of the actuator elements 14 arranged on the selected row. The respective actuator elements 14 are displaced in the first direction in accordance with the level of the applied voltages. In the case of an example shown in FIG. 17, the displacement is made linearly to give displacement amounts of $Z_1, Z_2, \ldots Z_n$ for voltages $V_1, V_2, \ldots V_n$ respectively.

Figure 18:
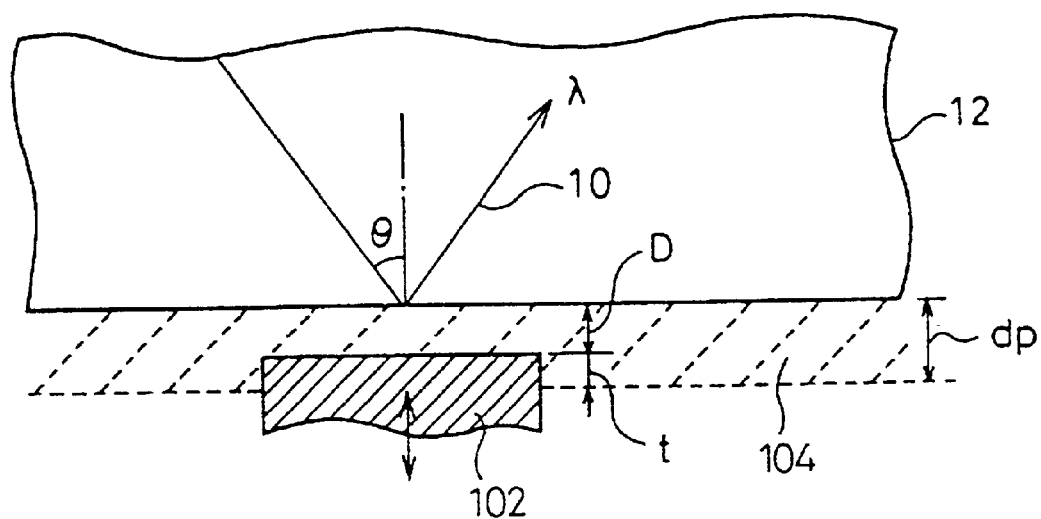
FIG. 18 illustrate the dot area and the contact state of the pixel and the principle of the gradation control based on the evanescent effect.

For example, as shown in FIG. 18, at a point of time at which the actuator element 14 is displaced in a displacement amount of $Z_1$, the distance D between the first principal surface of the pixel structure 102 and the back surface of the optical waveguide plate 12 becomes a distance corresponding to the wavelength $\lambda$ of the light 10 (the light 10 introduced into the optical waveguide plate 12). For example, at a point of time at which the actuator element 14 is displaced in a displacement amount of $Z_n$, ideally the first principal surface of the pixel structure completely contacts with the back surface of the optical waveguide plate 12.

When the pixel structure 102 approaches the bank surface of the optical waveguide plate 12, and the distance between the first principal surface of the pixel structure 102 and the back surface of the optical waveguide plate 12 is not more than the wavelength $\lambda$ of the light 10, then the amount of the scattered light radiated from the surface of the optical waveguide plate 12 is increased in accordance with the decrease in the distance, and the brightness level of the pixel corresponding to the actuator element 14 is increased.

This phenomenon can be explained as follows in accordance with the evanescent effect. In general, as shown in FIG. 18, a region (evanescent region) 104, which is brought about on account of discharge of light (evanescent wave), exists, for example, around the back surface of the optical waveguide plate 12. The depth dp of the evanescent region 104 represents a depth at which the energy value of the evanescent wave is 1/e at the boundary between the optical waveguide plate 12 and the external space (the back surface of the optical waveguide plate 12 in this embodiment). The depth dp is given by the following expression (1). The energy E of the evanescent wave is given by the following expression (2).

$$dp = \lambda / [2\pi n_1 \sqrt{\{\sin^2\theta(n/n_2)^2\}}] \qquad (1)$$

$$E = \exp\{-(D/dp)\} \qquad (2)$$

In the expression, $\lambda$ represents the wavelength of the light 10, and $\theta$ represents the angle (angle of incidence) at which the light 10 comes from the optical waveguide plate 12 into the external space as shown in FIG. 18. Further, $n_1$ represents the optical refractive index of the optical waveguide plate 12, and $n_2$ represents the optical refractive index of the external space.

According to the expression (1), it can be postulated that the depth dp is increased as the wavelength $\lambda$ of the light 10 is increased, and the depth dp is increased as the angle of incidence $\theta$ approaches the critical angle. On the other hand, as shown in the expression (2), the energy E of the evanescent wave is increased as the object approaches the back surface of the optical waveguide plate 12, and the energy E is attenuated exponentially as the object is separated from the back surface of the optical waveguide plate 12. The amount of light (scattered light 42) reflected by the surface of the pixel structure 102 is proportional to the energy E of the evanescent wave. Accordingly, the amount of scattered light 42 is increased as the pixel structure 102 approaches the back surface of the optical waveguide plate 12, and the amount of light 42 is decreased exponentially as the pixel structure 102 is separated from the back surface of the optical waveguide plate 12.

In this process, the actuator element 14 continues to retain the displacement amount determined upon the selection owing to the shape-retaining effect exerted by the shape-retaining layer 26 of the actuator section 14. Accordingly, the light emission state of the pixel is maintained for a certain period of time.

When the display device is applied to the color display system, for example, it is preferable to construct one pixel by using three pixel structures adjacent to one another (RGB arrangement) or four pixel structures adjacent to one another (checked arrangement or the like), for example, depending on the color scheme of the color filter 40 (for example, three primary color filters and complementary color filters) included in the pixel structure 102.

As described above, the display device Da according to the first embodiment comprises the crosspiece 70 at the portions other than the pixel structure 102 between the optical waveguide plate 12 and the actuator substrate 18.

If the optical waveguide plate 12 and the actuator substrate 18 are fixed at only the circumferential edge of the screen without providing the crosspiece 70, then the displacement standard is changed every time when the vibration occurs in the actuator substrate 18 due to the movement of the actuator element 14, and the ON/OFF operation of the pixel does not correspond to the displacement of the actuator element 14 in some cases.

However, in the display device Da according to the first embodiment, the crosspiece 70 is provided as described above. Therefore, even when a certain actuator element 14 makes the displacement action, the vibration is absorbed by the crosspiece 70. Thus, the inconvenience such as the change in displacement standard does not take place.

The support for the optical waveguide plate 12, which is effected by the crosspiece 70 formed around the pixel structure 102, makes it possible to easily obtain the uniform gap "g" between the pixel structure 102 and the optical waveguide plate 12 for all of the pixels. Further, the size of the gap "g" can be easily controlled by arbitrarily changing the height of the crosspiece 70. As a result, it is possible to obtain the uniform brightness for all of the pixels.

Especially, as shown in FIG. 11, when the crosspieces 70 are formed at the portions around the four corners of the pixel structure 102, the arrangement is given, in which the four crosspieces 70 are formed for the unit of the pixel structure 102. Accordingly, the vibration, which is caused by the displacement action of a certain actuator element 14 is effectively absorbed. Little influence is exerted on the displacement action of the other actuator elements 14. As a result, it is possible to obtain good correspondence between the ON operation/OFF operation and the displacement for all of the pixels. It is possible to faithfully display the picture image corresponding to the inputted image signal.

Further, the actuator substrate 18 and the optical waveguide plate 12 are tightly secured to one another. As shown in FIG. 12, when the crosspiece 70 has the windows 70a for surrounding at least one pixel structure 102, the arrangement is given, in which all of the side surfaces of the pixel structure 102 is surrounded by the crosspiece 70. The actuator substrate 18 and the optical waveguide plate 12 are secured to one another more tightly.

Further, the vibration, which is caused by the displacement action of a certain actuator element 14, does not affect the displacement action of the other actuator elements 14 at all.

Next, a display device Db according to the second embodiment will be explained with reference to FIG. 19. Components or parts corresponding to those shown in FIG. 1 are designated by the same reference numerals, duplicate explanation of which will be omitted.

Figure 19:
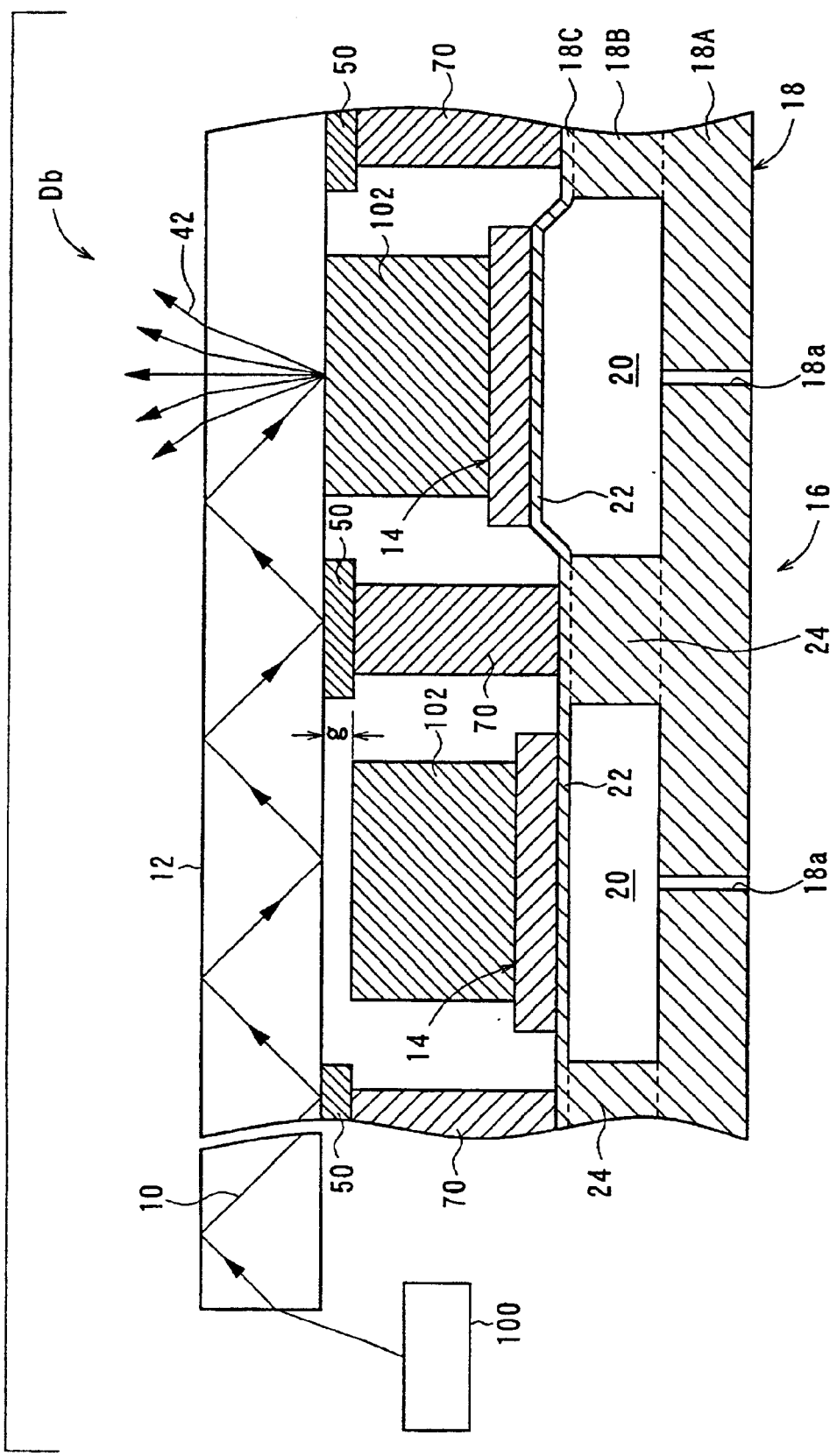
FIG. 19 shows an arrangement illustrating a display device according to a second embodiment.

As shown in FIG. 19, the display device Db according to the second embodiment is constructed in approximately the same manner as the display device Da according to the first embodiment (see FIG. 1). However, the former is different from the latter in that a gap-forming layer 50 is provided between the forward end of the crosspiece 70 and the optical waveguide plate 12.

Owing to the presence of the gap-forming layer 50, the gap-forming layer 50 can be used to adjust the gap "g" between the pixel structure 102 and the optical waveguide plate 12. Accordingly, an effect is obtained in that the gap "g" can be made uniform for all of the pixels. This embodiment is advantageous in that the gap "g" can be easily adjusted when the position of the upper surface of the pixel structure 102 is aligned with the position of the upper surface of the crosspiece 70 (surface to make contact with the gap-forming layer 50).

The method to realize this arrangement includes, for example, a method in which a flat glass surface is used to simultaneously form the pixel structure 102 and the crosspiece 70, and a method in which the pixel structure 102 and the crosspiece 70 are formed, followed by polishing to perform figuring.

The constitutive material for the gap-forming layer 50 includes, for example, metal films, films containing carbon black, black pigment, or black dye, and transparent films having low light-scattering property. Accordingly, the gap-forming layer 50 can be allowed to simultaneously have the function of a black matrix.

Especially, when a metal film composed of, for example, Cr, Al, Ni, or Ag is used as the gap-forming layer 50, the attenuation and the scattering of the light transmitted through the optical waveguide plate can be suppressed, because of a small amount of light is absorbed thereby. Therefore, such a metal film is used especially preferably.

When a film containing carbon black, black pigment, or black dye is used as the gap-forming layer 50, then the light-absorbing performance is excellent, and it is possible to improve the contrast. When a transparent film having a poor light-scattering property is used as the gap-forming layer 50, then the light scattering can be suppressed, and the contrast can be enhanced by combining the film-with an adhesive having an excellent light-absorbing property (or an adhesive having a light-absorbing property enhanced by adding black dye or blackpigment).

The size of the gap-forming layer 50 is set as follows, for example, as exemplified by the case in which the actuator element 14 is displaced to be convex toward the optical waveguide plate 12. That is, the small limit (minimum value) of the gap amount "g" is set to be such a degree that the leakage of light caused by the evanescent effect upon the OFF operation of the pixel structure 102 can be neglected. The large limit (maximum value) of the gap amount "g" is set to be within a range in which the pixel structure 102 can make contact with the optical waveguide plate 12 in accordance with the displacement of the actuator element 14. Therefore, the thickness of the gap-forming layer 50 is adjusted so that the gap amount "g" is within the range described above. Especially preferably, the thickness is about 1 to 5 μm. However, the difference in height between the pixel structure 102 and the crosspiece 70 is controllable depending on various embodiments of the display device. The thickness of the gap-forming layer 50 may be optimized in accordance therewith.

Figure 20:
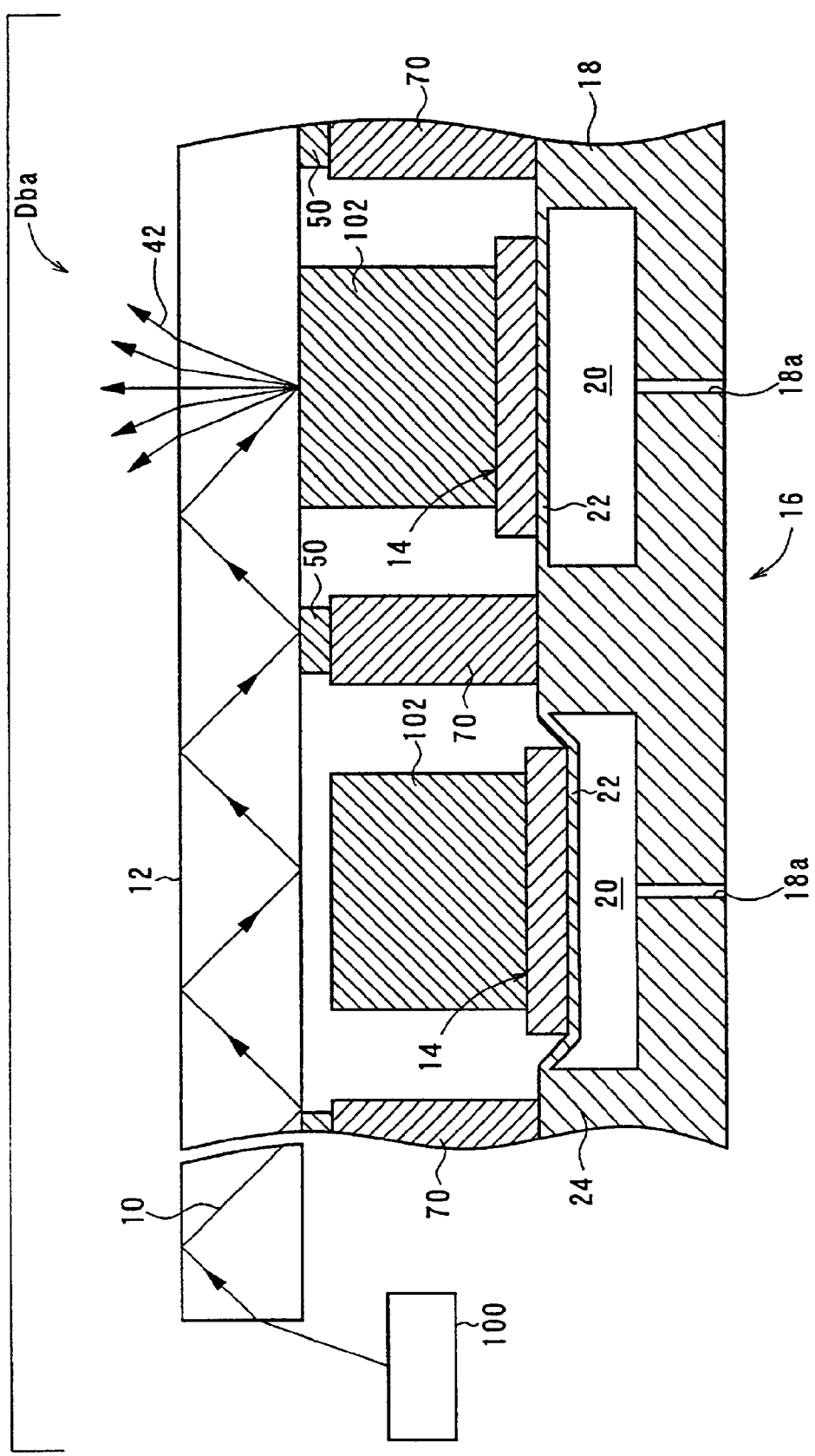
FIG. 20 shows an arrangement illustrating a modified embodiment of the display device according to a second embodiment.

The display device Db according to the second embodiment shown in FIG. 19 is illustrative of the case in which the width of the gap-forming layer 50 is larger than the width of the crosspiece 70. Alternatively, as in a display device Dba according to a modified embodiment shown in FIG. 20, the width of the gap-forming layer 50 may be made smaller than the width of the crosspiece 70. In this embodiment, the contact area of the gap-forming layer 50 with respect to the optical waveguide plate 12 is decreased. Therefore, it is possible to reduce unnecessary scattered light. This embodiment is advantageous to improve the contrast.

Next, a display device Dc according to the third embodiment will be explained with reference to FIG. 21. Components or parts corresponding to those shown in FIG. 19 are designated by the same reference numerals, duplicate explanation of which will be omitted.

Figure 21:
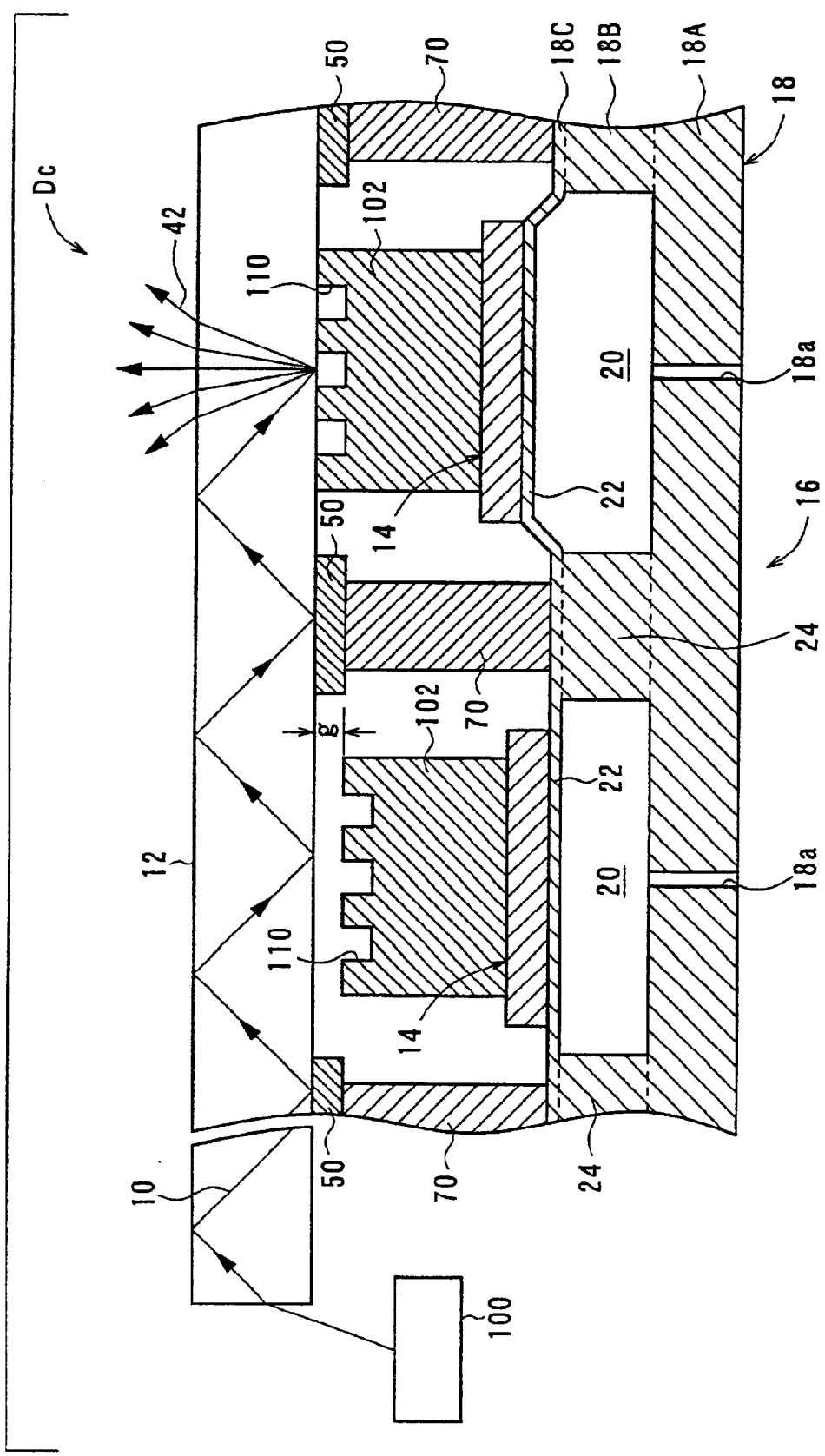
FIG. 21 shows an arrangement illustrating a display device according to a third embodiment.

As shown in FIG. 21, the display device Dc according to the third embodiment is constructed in approximately the same manner as the display device Db according to the second embodiment (see FIG. 19). However, the former is different from the latter in that a plurality of recesses 110 are formed on the surface of the pixel structure 102. The recesses may be formed as a continuous groove.

According to the display device Dc concerning the third embodiment, an approximately identical contact area with respect to the optical waveguide plate 12 can be realized for the respective pixel structures 102 by defining the size or the number of formed recesses 110 in conformity with the area of the pixel structure 102 opposing to the optical waveguide plate 12. Thus, it is possible to obtain a uniform brightness for all of the pixels.

The presence of the recess 110 mitigates the tight adherence between the pixel structure 102 and the optical waveguide plate 12. The pixel structure 102 is smoothly separated from the optical waveguide plate 12. As a result, the pixel structure 102 can be prevented from adhesion to the optical waveguide plate 12. Accordingly, it is possible to effectively realize a high response speed.

Next, a display device Dd according to the fourth embodiment will be explained with reference to FIG. 22. Components or parts corresponding to those shown in FIG. 19 are designated by the same reference numerals, duplicate explanation of which will be omitted.

Figure 22:
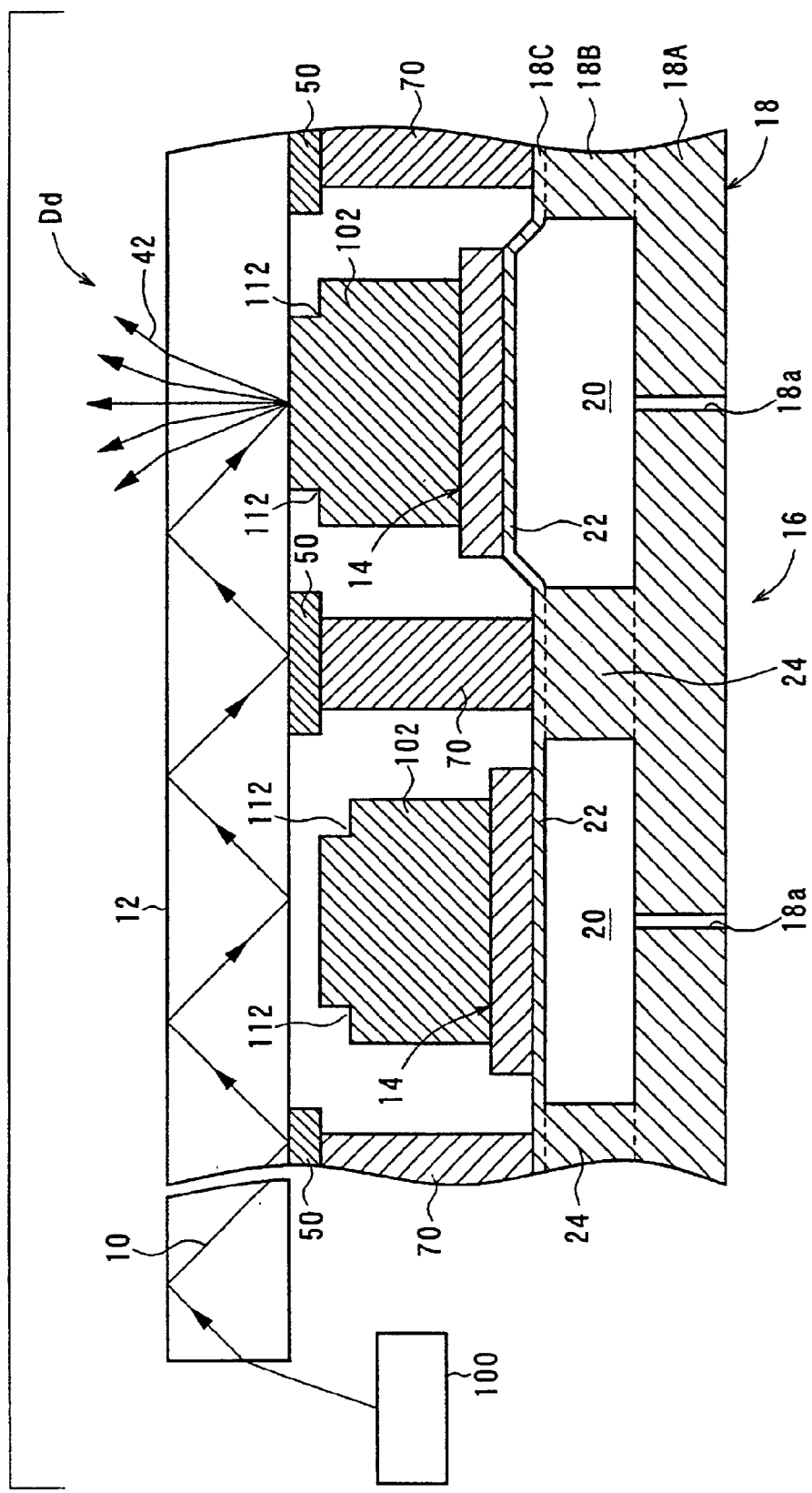
FIG. 22 shows an arrangement illustrating a display device according to a fourth embodiment.

As shown in FIG. 22, the display device Dd according to the fourth embodiment is constructed in approximately the same manner as the display device Db according to the second embodiment. However, the former is different from the latter in that a step 112 is formed at the circumferential edge of the pixel structure 102.

According to the display device Dd concerning the fourth embodiment, the provision of the step 112 at the circumferential edge of the pixel structure 102 makes it possible to obtain a constant area of the portion of the pixel structure 102 to make contact with the optical waveguide plate 12 for all of the pixels. It is possible to obtain a uniform brightness for all of the pixels. Further, the presence of the step 112 mitigates the tight adherence between the pixel structure 102 and the optical waveguide plate 12. Therefore, the pixel structure 102 can be prevented from adhesion to the optical waveguide plate 12. Accordingly, it is possible to effectively realize a high response speed.

Next, a display device De according to the fifth embodiment will be explained with reference to FIG. 23. Components or parts corresponding to those shown in FIG. 19 are designated by the same reference numerals, duplicate explanation of which will be omitted.

Figure 23:
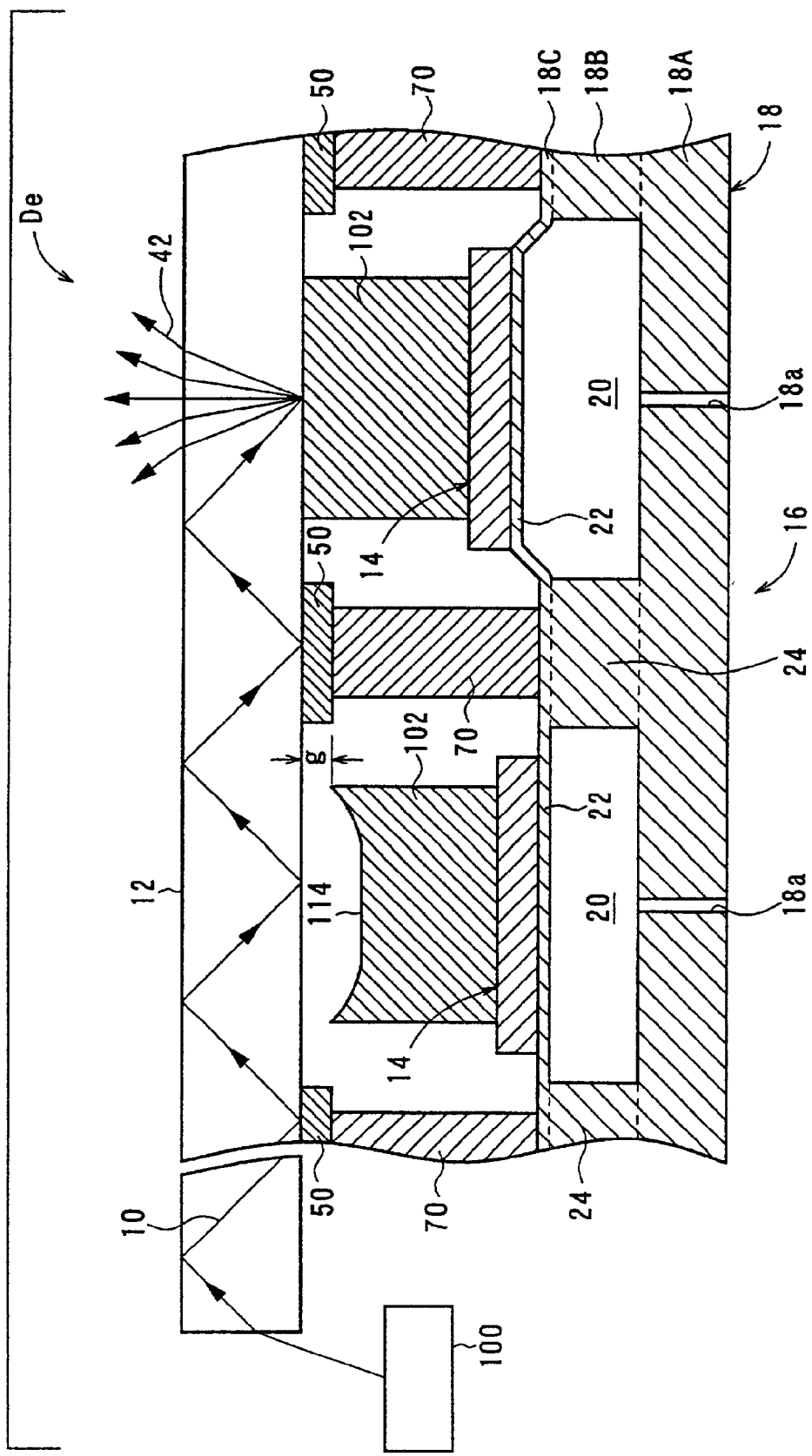
FIG. 23 shows an arrangement illustrating a display device according to a fifth embodiment.

As shown in FIG. 23, the display device De according to the fifth embodiment is constructed in approximately the same manner as the display device Db according to the second embodiment. However, the former is different from the latter in that the surface of the pixel structure 102 is formed to have a concave configuration 114.

When the actuator element 14 makes displacement, the central portion of the pixel structure 102 tends to have the largest displacement amount. Therefore, the surface of the pixel structure 102 has the concave configuration 114 so that the central portion of the pixel structure 102 is made concave to give the depth, for example, corresponding to the displacement amount described above. By doing so, the surface of the pixel structure 102 is approximately flat when the actuator element 14 makes displacement to allow the pixel structure 102 to make contact with the optical waveguide plate 12. Thus, it is possible to increase the contact area of the pixel structure 102 with respect to the optical waveguide plate 12.

In this embodiment, when the depth of the concave curve of the concave configuration 114 is increased, a state is given, in which the central portion of the pixel structure 102 does not arrive at the optical waveguide plate 12 when the pixel structure 102 makes contact with the optical waveguide plate 12, giving a state in which a recess is formed on the surface of the pixel structure 102 in a simulated manner. Accordingly, the tight adherence between the pixel structure 102 and the optical waveguide plate 12 is mitigated. Thus, the pixel structure 102 is smoothly separated from the optical waveguide plate 12. As a result, the pixel structure 102 can be prevented from adhesion to the optical waveguide plate 12, and it is possible to effectively realize a high response speed.

Figure 24:
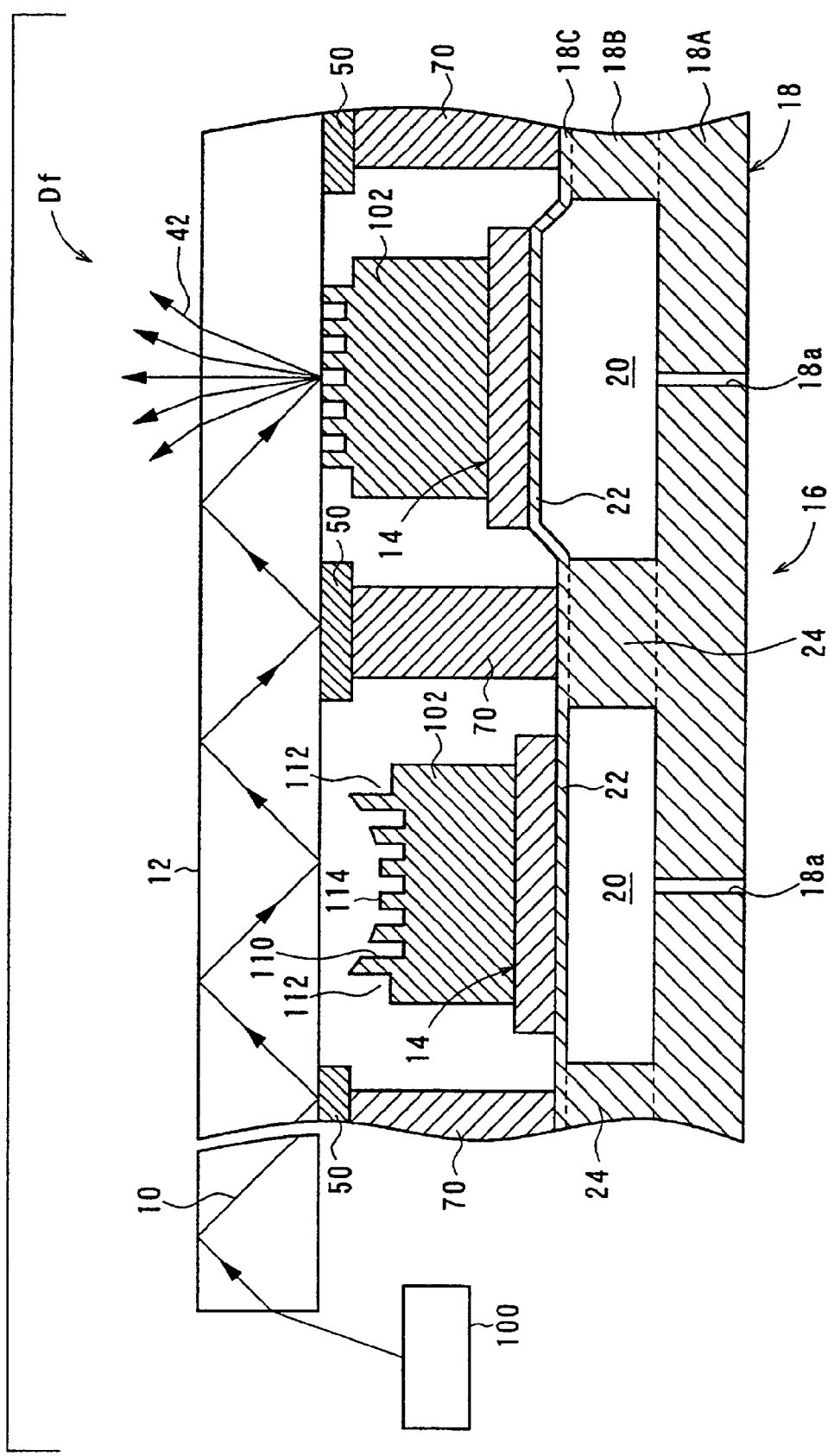
FIG. 24 shows an arrangement illustrating a display device according to a sixth embodiment.

The arrangement of the display device Dc according to the third embodiment (the recess 110 is formed on the surface of the pixel structure 102), the arrangement of the display device Dd according to the fourth embodiment (the step 112 is formed on the surface of the pixel structure 102), and the arrangement of the display device De according to the fifth embodiment (the surface of the pixel structure 102 has the concave configuration 114) may be realized singly respectively, or they may be arbitrarily combined with each other. The combination of them makes it possible to obtain the synergistic effect based on the respective arrangements. FIG. 24 is illustrative of a display device Df according to the sixth embodiment in which all of the arrangements of the display devices Dc to De according to the third to fifth embodiments are combined with each other.

Figure 25:
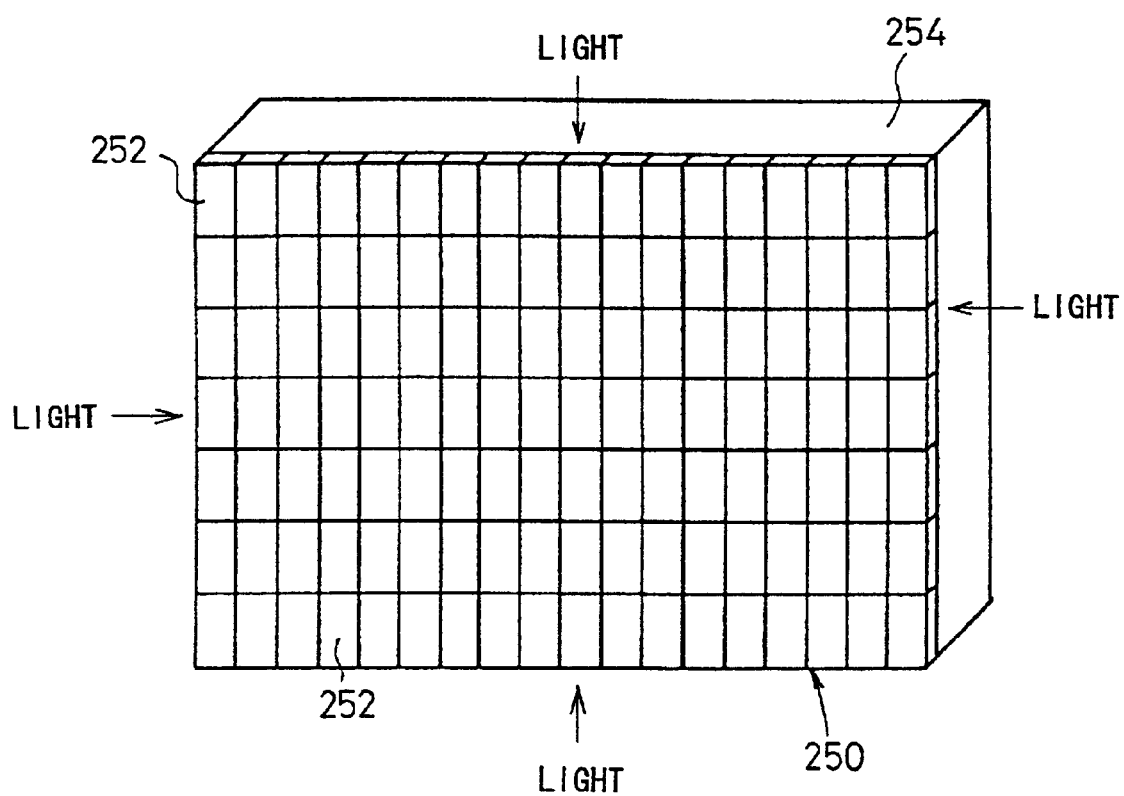
FIG. 25 shows a perspective view illustrating a large screen display apparatus based on the display device according to the first to sixth embodiments, as viewed from the back side.

The display devices Da to Df according to the first to sixth embodiments can be used singly. Besides, the display devices Da to Df according to these embodiments may be used as one display element 252 included in a large screen display apparatus 250 as shown in FIG. 25. FIG. 25 shows an illustrative arrangement in which seven display elements 252 are arranged in the vertical direction, and eighteen display elements 252 are arranged in the lateral direction on a back surface of a light-introducing plate 254 having a display area for a large screen. In this arrangement, those which have a large and uniform light transmittance in the visible light region, such as glass plates and acrylic plates are used for the light-introducing plate 254. The respective display elements 252 are connected to one another by means of, for example, wire bonding, soldering, face connector, and back connector so that signals may be mutually supplied.

The large screen display apparatus 250 shown in FIG. 25 uses the display devices Da to Df according to the first to sixth embodiments, as the display devices applied to the respective display elements 252. In each of the display elements 252, the arrangement of the pixels comprises 32 individuals in the horizontal direction and 32 individuals in the vertical direction. In the display devices Da to Df according to these embodiments, when the pixels concerning the respective rows are arranged in the zigzag form, it is possible to provide an extremely small arrangement pitch of the pixels in the horizontal direction. When the number of arranged pixels in the horizontal direction is the same as that in the vertical direction, the entire planar configuration has a vertical length which is longer than a horizontal length.

The large screen display apparatus 250 shown in FIG. 25 represents the illustrative arrangement in which the display elements 252 including the optical waveguide plates 12 are arranged in the matrix form on the plate surface of the large light-introducing plate 254. Alternatively, the large light-introducing plate 252 may be omitted so that the large screen display apparatus 250 is constructed by arranging, in a matrix form, the display elements 252 including the optical waveguide plates 12. In such an arrangement, the large number of optical waveguide plates 12 arranged in the matrix form also serve as the large light-introducing plate 254. Besides the foregoing arrangements, it is also allowable that the large screen display apparatus 250 is constructed by arranging, in a matrix form, display elements 252 without including any optical waveguide plate 12 on the plate surface of the large light-introducing plate 254.

It is preferable that the light-introducing plate 254 has a refractive index which is similar to that of the optical waveguide plate 12. When the light-introducing plate 254 and the optical waveguide plates 12 are stuck to one another, a transparent adhesive may be used. The adhesive preferably has a uniform and high transmittance in the visible light region, in the same manner as the optical waveguide plate 12 and the light-introducing plate 254. It is desirable for the adhesive to set its refractive index which is near to those of the light-introducing plate 254 and the optical waveguide plate 12 in order to ensure brightness of the screen.

Next, methods for producing the display devices Da to Df according to the first to sixth embodiments will be explained with reference to FIGS. 26A to 62B.

Figure 26A:
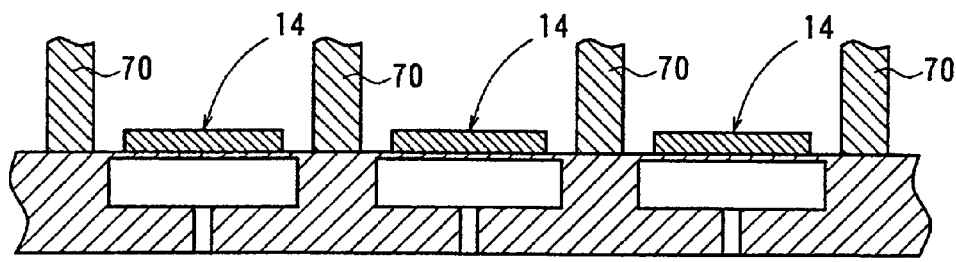
FIGS. 26A to 26C show production steps illustrating a first production method.

At first, in the first production method, as shown in FIG. 26A, the crosspiece 70 is formed, for example, by means of the film formation method at the portions on which the actuator element 14 is not formed, of the first principal surface of the actuator substrate 18. The material quality of the crosspiece 70 is not specifically limited. However, it is preferable to use those having a hard hardness after the hardening. In the case of a resin, for example, it is preferable to use a thermosetting resin (for example, one-component or two-component epoxy resin). The thickness of the crosspiece is about 50 to 100 μm.

The film formation method includes, for example, the screen printing method, the photolithography method, and the film lamination method.

Figure 27A:
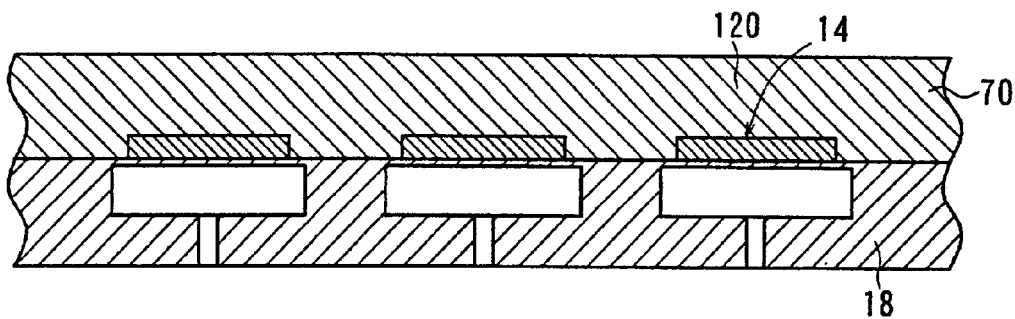
FIGS. 27A to 27C show production steps illustrating a first method of photolithography.
Figure 27B:
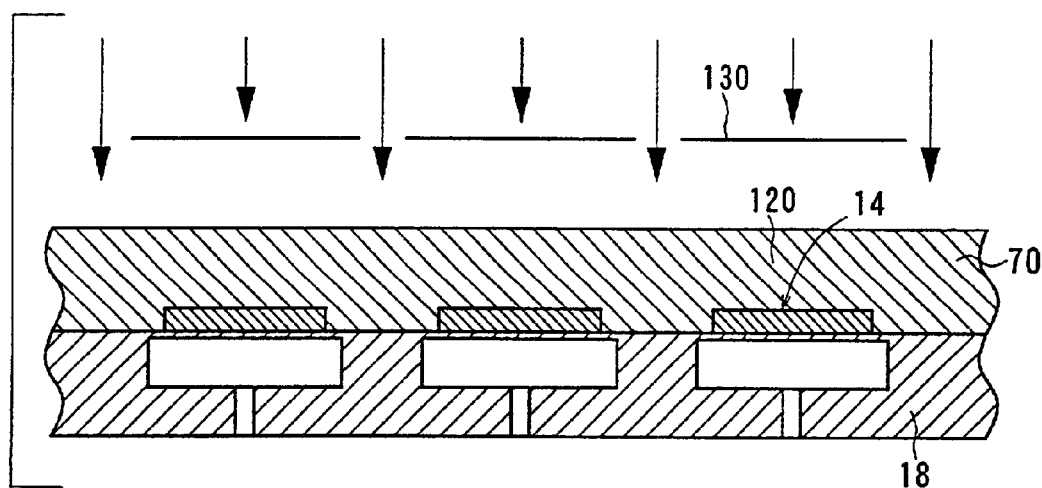
Figure 27C:
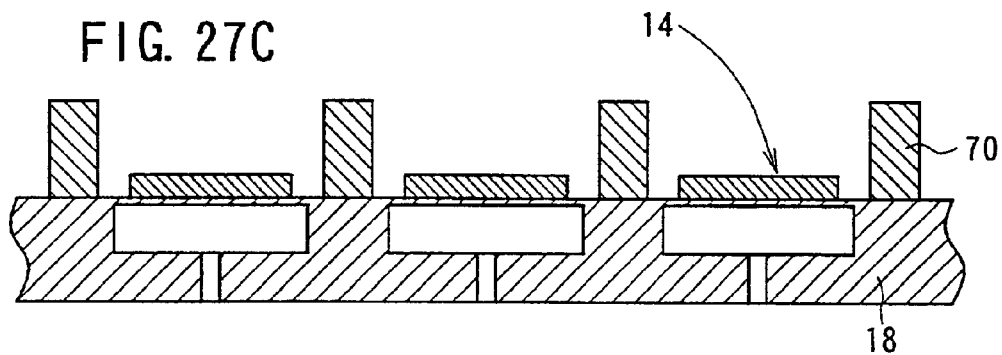
Figure 28A:
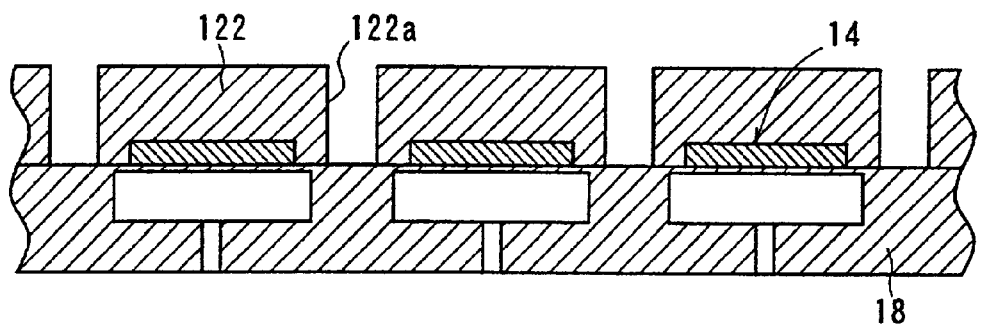
FIGS. 28A to 28C show production steps illustrating a second method of photolithography.
Figure 28B:
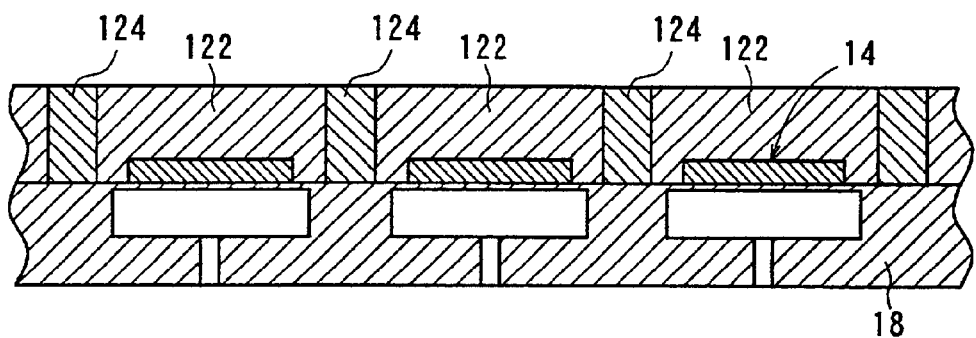
Figure 28C:
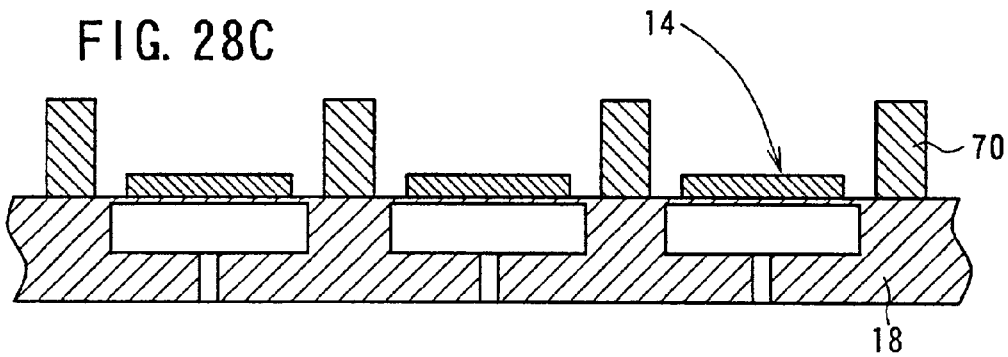

The photolithography method includes, for example, a first method in which a film 120 to form the crosspiece 70 is exposed and developed so that the crosspiece 70 is formed as shown in FIGS. 27A to 27C, and a second method in which a material 124 to form the crosspiece 70 is embedded in an opening 122a of a mask 122 so that the crosspiece 70 is formed as shown in FIGS. 28A to 28C.

The first method is carried out, for example, in accordance with the following procedure. At first, as shown in FIG. 27A, the film 120 to form the crosspiece 70 is uniformly applied to the entire surface of the actuator substrate 18. Subsequently, as shown in FIG. 27B, the film 120 to form the crosspiece 70 is selectively exposed through a mask 130 having an opening at the portion for forming the crosspiece 70. After that, as shown in FIG. 27C, the film 120 to form the crosspiece 70 is subjected to development. When the development is performed, then the exposed portion of the film 120 to form the crosspiece 70 remains as the crosspiece 70, and the non-exposed portion is melted and removed.

Those usable as the method for applying the film for constructing the crosspiece 70 includes, for example, application by printing, application by spinner, DIP (immersing method), roll coater, and glass press. It is also possible to apply a photosensitive film having the same function as that of the photoresist.

On the other hand, the second method is carried out in accordance with the following procedure. At first, as shown in FIG. 28A, a photoresist material is applied, followed by execution of exposure and development to form a mask 122 based on the photoresist on the actuator substrate 18. The mask 122 has an opening 122a at the portion for forming the crosspiece 70.

Subsequently, as shown in FIG. 28B, a material 124 to form the crosspiece 70 is embedded in the opening 122a of the mask 112. After that, as shown in FIG. 28C, the mask 122 is removed. Thus, the crosspiece 70 is formed on the actuator substrate 18.

In the first method (application method), the selectivity is low for the material for the film 120 for constructing the crosspiece 70, because of the condition of the exposure. However, in the second method (embedding method), it is unnecessary to consider the exposure or the photosensitive property. Therefore, the degree of freedom is improved for the selectivity for the material of the film 120 for constructing the crosspiece 70.

Figure 29:
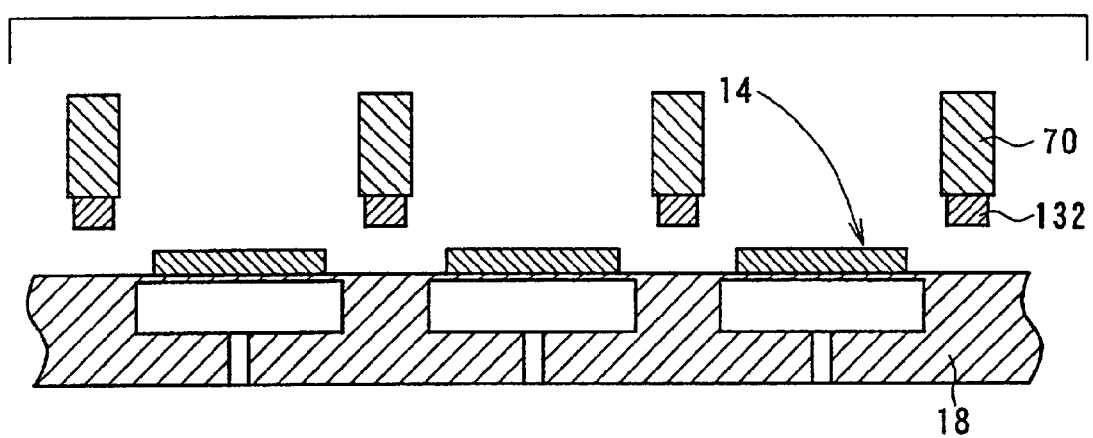
FIG. 29 illustrates a film lamination method.

The film lamination method is shown in FIG. 29. In this method, a film (film formed with a material to construct the crosspiece: dry film or the like) is previously subjected to cutting or stamping to prepare the crosspiece 70, and then the crosspiece 70 is laminated on the actuator substrate 18, for example, by the aid of an adhesive 132. When the crosspiece is laminated, for example, the vacuum packaging method or the laminate press method is used.

In the ceramic sintering method, for example, a portion, which is used to form a first layer crosspiece 70, is formed on the actuator substrate 18, for example, by means of the film formation method, followed by sintering to integrate the actuator substrate 18 and the first layer crosspiece 70 into one unit.

Figure 26B:
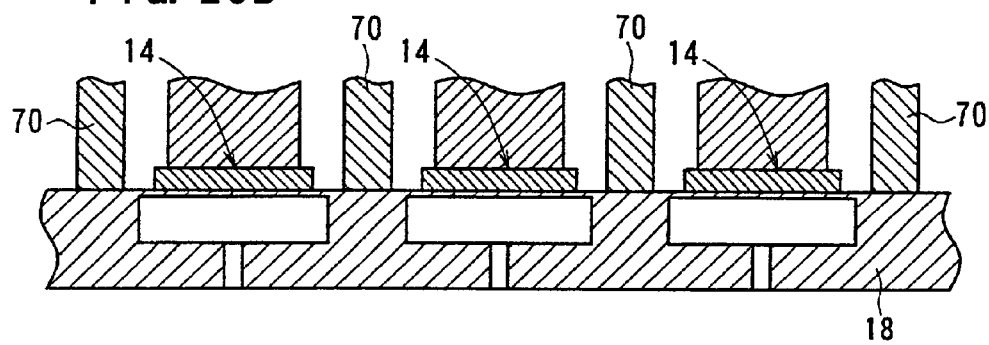

The first production method will be explained again. As shown in FIG. 26B, the respective pixel structures 102 are formed on the respective actuator elements 14 of the actuator substrate 18, for example, by means of the film formation method. The various methods as shown in FIGS. 27A to 29 are adoptable as the film formation method.

Figure 26C:
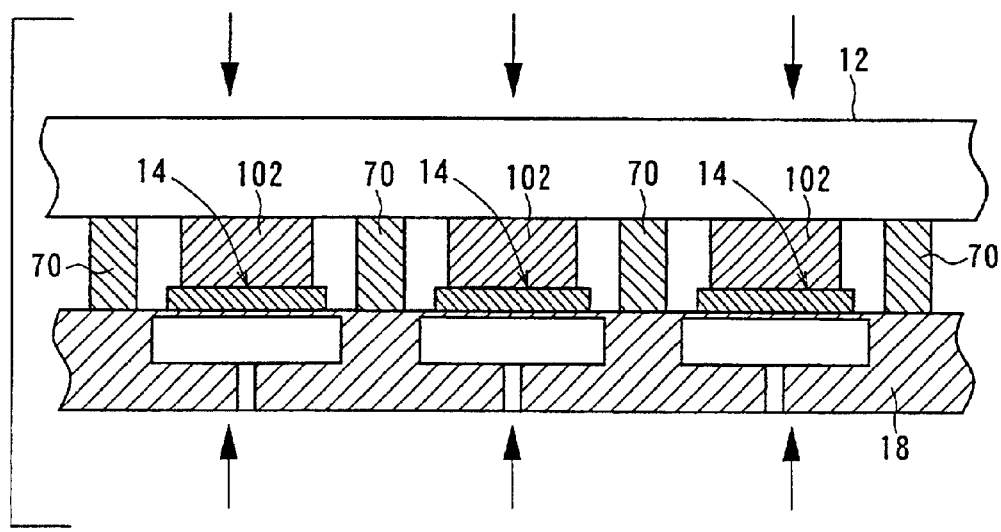

As shown in FIG. 26C, before the crosspiece 70 and the pixel structure 102 on the actuator substrate 18 are hardened, the optical waveguide plate 12 is pressed against the crosspiece 70 and the pixel structure 102 on the actuator substrate 18. The optical waveguide plate 12 and the actuator substrate 18 are pressurized in the directions to make approach to one another. After that, the crosspiece 70 and the pixel structure 102 are hardened in this state to complete the device.

In the first production method, the actuator substrate 18 and the optical waveguide plate 12 are pressurized in the state in which at least the pixel structure 102 is not hardened. Therefore, the optical waveguide plate 12 presses the crosspiece 70 and the pixel structure 102 toward the actuator substrate 18 during the pressurizing process. The previously formed crosspiece 70 serves as a spacer, to define the thickness of the pixel structure 102. As a result, when at least the pixel structure 102 is hardened, the upper surface of the crosspiece 70 and the upper surface of the pixel structure 102 form a substantially identical surface.

In this embodiment, a material, with which the pixel structure 102 is contracted upon the hardening of the pixel structure 102, is used as the constitutive material for the pixel structure 102. By doing so, it is possible to form a constant gap "g" between the pixel structure 102 and the optical waveguide plate 12 during the hardening of the crosspiece 70 and the pixel structure 102.

Another method is available to form the gap "g". For example, when the optical waveguide plate 12 is laminated and pressurized, then the pixel structure 102 may be heated and expanded, or the actuator element 14 may be displaced to allow the pixel structure 102 to make contact with the optical waveguide plate 12. The constant gap "g" is formed between the pixel structure 102 and the optical waveguide plate 12 by the contraction of the pixel structure 102 or by the displacement reset (restoration) of the actuator element. 14.

Alternatively, it is possible to use the form in which the pixel structure 102 contacts with the optical waveguide plate 12 in the natural state. In this case, for example, as shown in FIG. 7, application may be made for the arrangement in which the pixel structure 102 makes displacement in the direction to make separation from the optical waveguide plate 12, concerning the displacement action of the actuator element 14.

The pressurizing method for the actuator substrate 18 and the optical waveguide plate 12 includes various loading methods such as the loading based on the weight, the vacuum packaging method, the CIP method (hydrostatic pressure loading method), the loading based on the flip chip bonding, the constant value control, and the low pressure press method.

Figure 30:
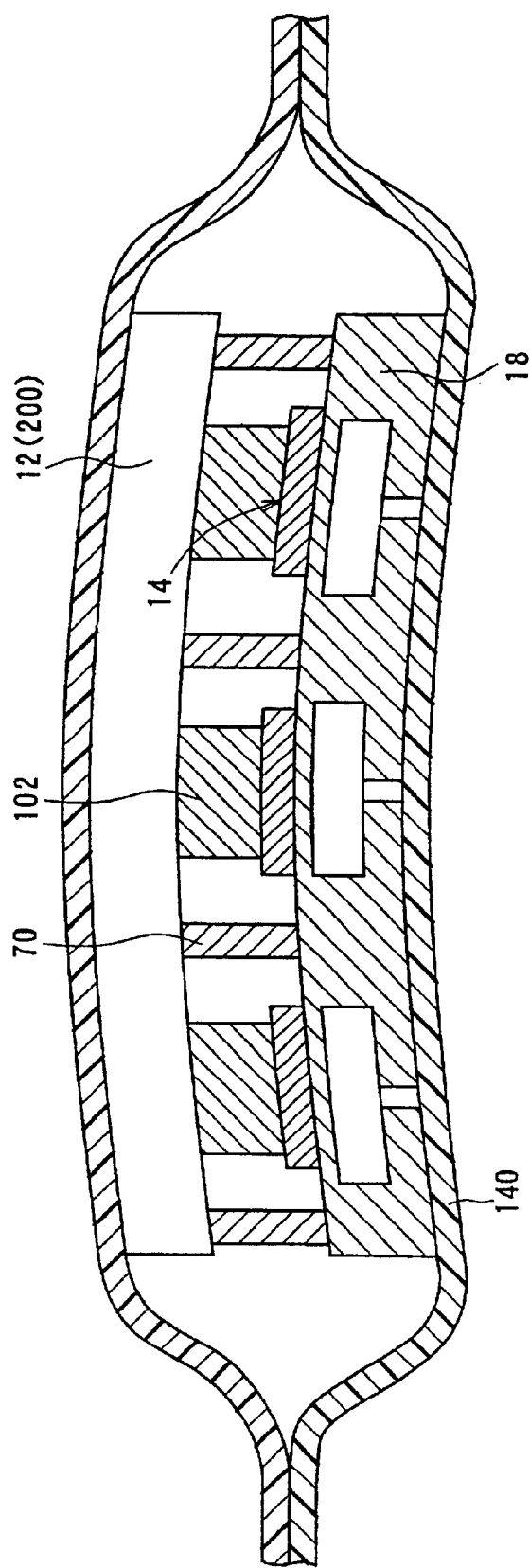
FIG. 30 illustrates a vacuum packaging method.

Among them, the vacuum packaging method is shown in FIG. 30. In this method, the optical waveguide plate 12 is pressed against the actuator substrate 18, and they are placed in a vacuum packaging bag 140 to apply the vacuum to the bag 140. Thus, the actuator substrate 18 and the optical waveguide plate 12 are pressurized to one another. In this method, in order to suppress the generation of bubbles, it is preferable that an antifoaming agent is added to the adhesive and the pixel structure, and an antifoaming treatment is applied before the hardening process.

In the vacuum packaging method shown in FIG. 30 and in the CIP method, the actuator substrate 18 and the optical waveguide plate 12 can be uniformly pressurized even when the actuator substrate 18 involves any warpage or waviness. Accordingly, the optical waveguide plate 12 and the actuator substrate 18 are adapted to one another. Therefore, it is possible to form a constant gap "g" between all of the pixel structures 102 and the optical waveguide plate 12. It is noted that the vacuum packaging method may be combined with the CIP method.

The low pressure press method is shown in FIG. 31. In this method, the optical waveguide plate 12 is pressed against the actuator substrate 18, and they are placed between an upper die 142 and the lower die 144 to press them at a low pressure. In this method, the actuator substrate 18 is applied with a small stress. Therefore, the actuator element 14 can be prevented from damage or the like.

The method, which uses the loading based on the flip chip bonding, is preferably used, because it is possible to effect the position control, the pressurizing control, and the heating.

Next, the second production method will be explained with reference to FIGS. 32A to 32D. In the second production method, the pixel structure 102 and the crosspiece 70 are formed on the optical waveguide plate 12, and the actuator substrate 18 is laminated and pressurized.

Figure 32A:
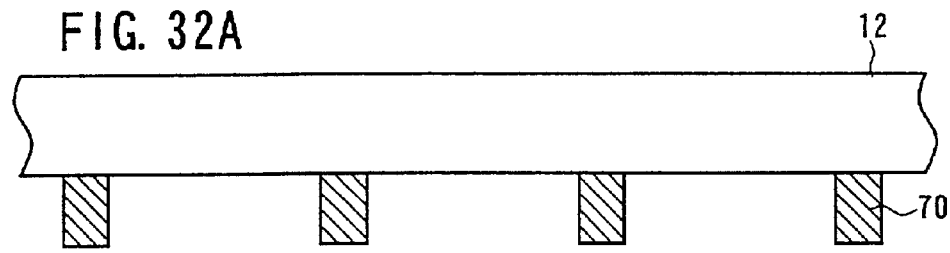
FIGS. 32A to 32D show production steps illustrating a second production method.
Figure 32B:
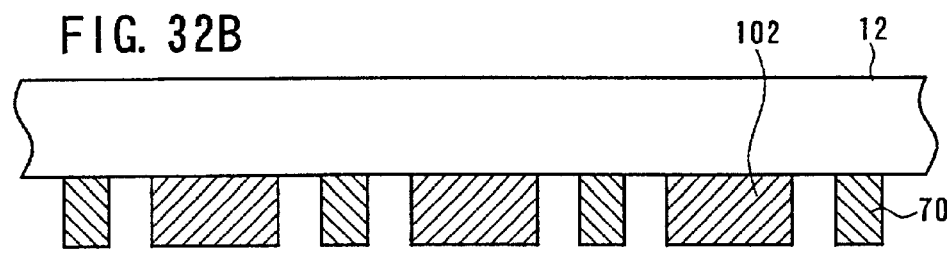

At first, as shown in FIG. 32A, the plurality of crosspieces 70 are formed, for example, by means of the film formation method at the portions other than the portions corresponding to the large number of pixels, of the optical waveguide plate 12. After that, as shown in FIG. 32B, the pixel structures 102 are formed, for example, by means of the film formation method at the portions corresponding to the large number of pixels, of the optical waveguide plate 12.

Figure 32C:
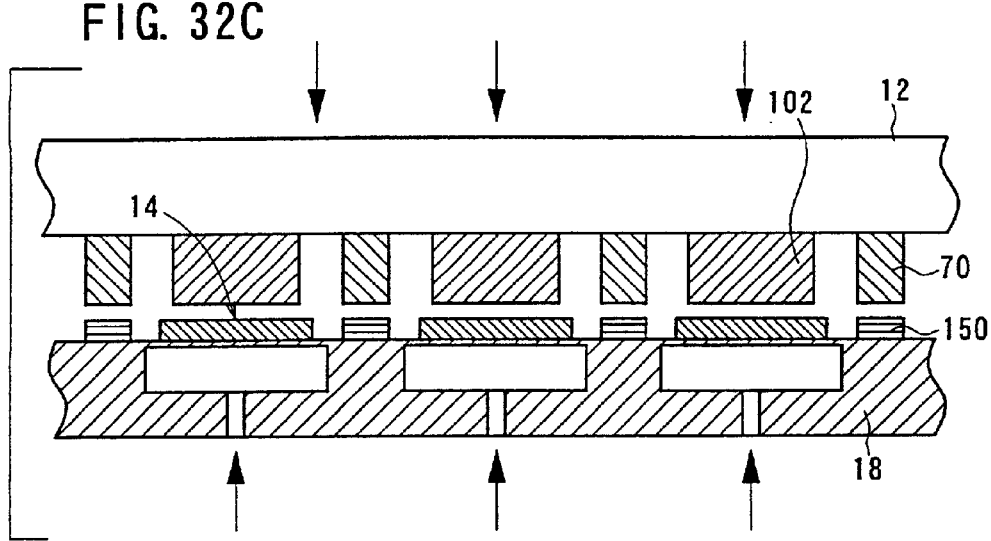

As shown in FIG. 32C, an adhesive 150 is applied to the upper surfaces of the actuator elements 14 and the positions corresponding to the crosspieces 70, of the first principal surface of the actuator substrate 18 previously formed with the actuator elements 14 at the portions corresponding to the pixels.

Figure 32D:
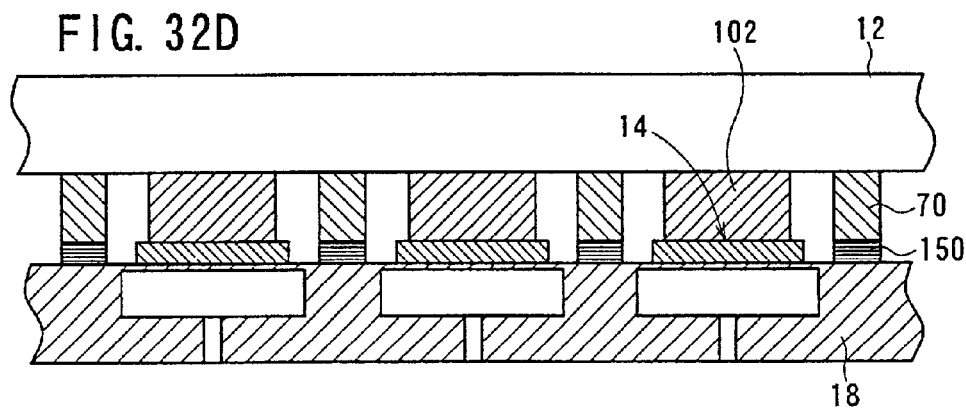

After that, before the crosspieces 70 and the pixel structures 102 on the optical waveguide plate 12 are hardened, the first principal surface side of the actuator substrate 18 is pressed against the crosspieces 70 and the pixel structures 102 on the optical waveguide plate 12. The optical waveguide plate 12 and the actuator substrate 18 are pressurized in the directions to make approach to one another. Subsequently, as shown in FIG. 32D, the crosspieces 70, the pixel structures 102, and the adhesive 150 are hardened in this state to complete the device.

According to the second production method, the pixel structure 102 is directly formed on the optical waveguide plate 12. Therefore, this method is advantageous in that the area of the pixel (contact area with respect to the optical waveguide plate 12) is easily defined. It is easy to obtain a uniform brightness for all of the pixels.

Also in this embodiment, in the case of the form in which the pixel structure 102 contacts with the optical waveguide plate 12 when the actuator element 14 is in the natural state, as shown in FIG. 7, application may be made for the arrangement in which the pixel structure 102 makes displacement in the direction to make separation from the optical waveguide plate 12, concerning the displacement action of the actuator element 14.

When the optical waveguide plate 12 is laminated and pressurized, then the pixel structure 102 may be heated and expanded, or the actuator element 14 may be displaced to allow the pixel structure 102 to make contact with the optical waveguide plate 12. By doing so, it is possible to form a constant gap "g" between the pixel structure 102 and the optical waveguide plate 12 during the hardening process for the crosspiece 70 and the pixel structure 102.

Next, the third production method will be explained with reference to FIGS. 33A to 33C. In this third production method, the plate member 200 is once laminated on the actuator substrate 18 formed with the pixel structure 102 and the crosspiece 70 to obtain a substantially identical surface for the respective upper surfaces of the pixel structure 102 and the crosspiece 70. After that, the plate member 200 is removed, and the optical waveguide plate 12 is laminated.

Figure 33A:
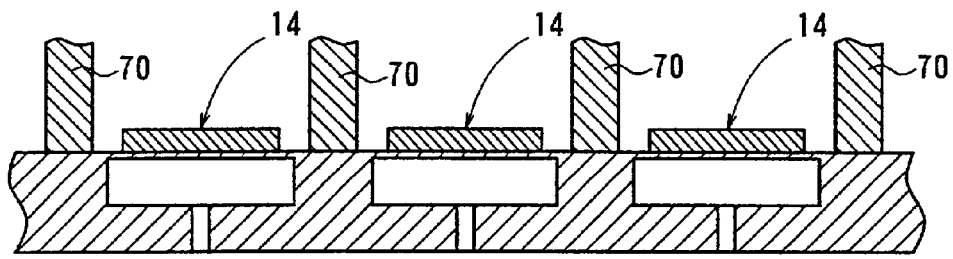
FIGS. 33A to 33C show production steps illustrating a third production method.

At first, as shown in FIG. 33A, the crosspiece 70 is formed, for example, by means of the film formation method at the portion formed with no actuator element 14, of the first principal surface of the actuator substrate 18.

Figure 33B:
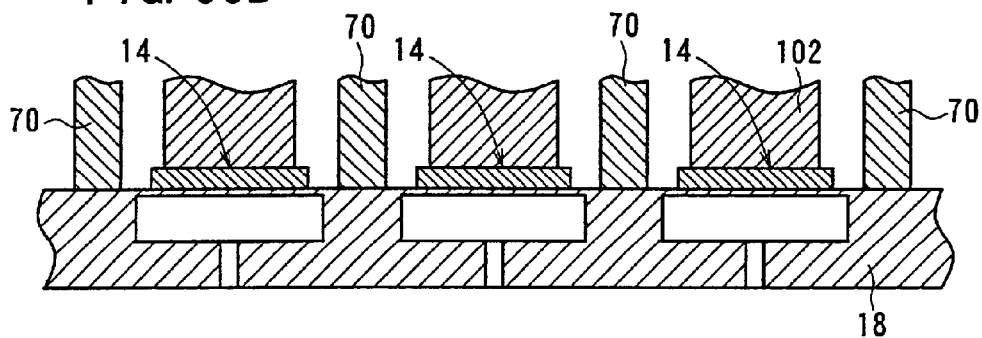

After that, as shown in FIG. 33B, the pixel structure 102 is formed, for example, by means of the film formation method on each of the actuator elements 14 of the actuator substrate 18.

Figure 33C:
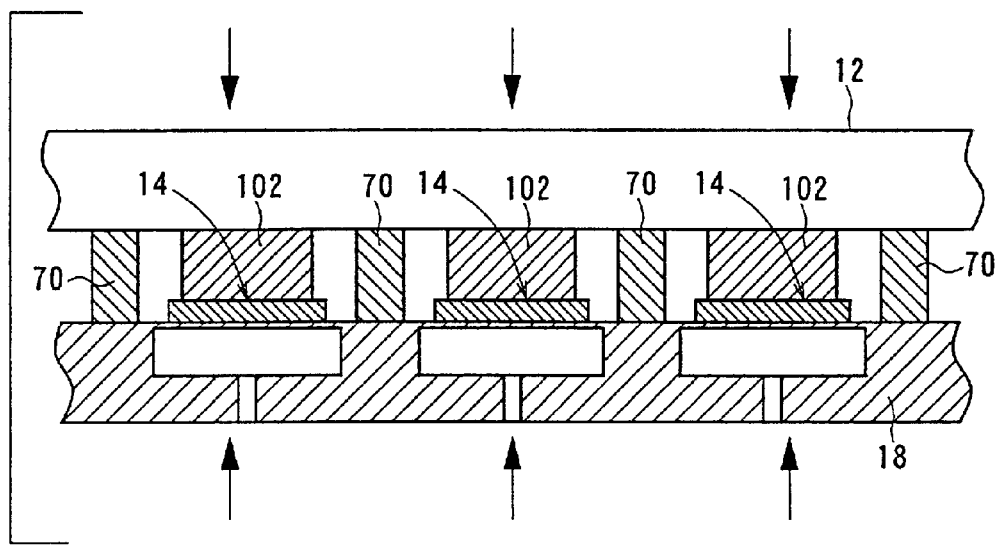

Subsequently, as shown in FIG. 33C, before the crosspiece 70 and the pixel structure 102 on the actuator substrate 18 are hardened, the plate member 200 is pressed against the crosspiece 70 and the pixel structure 102 on the actuator substrate 18. The plate member 200 and the actuator substrate 18 are pressurized in the directions to make approach to one another. After that, the crosspiece 70 and the pixel structure 102 are hardened in this state.

Those usable as the plate member 200 include, for example, glass, ceramics, and metal. Among them, glass is used especially preferably, because it is easy to obtain a plate member having high surface smoothness and appropriate rigidity.

The surface smoothness of the plate member is useful to improve the brightness of the pixel. Accordingly, those in which Ra<0.1 μm is given are preferably used. Especially, those in which Ra<0.01 μm is given are more preferably used.

The rigidity of the plate member is designed such that the pressurizing step causes no plastic deformation, and the elastic deformation effects adaptation to any warpage of the actuator substrate. For example, when glass is used for the plate member, and the vacuum packaging method is applied as the pressurizing method, then the thickness of the plate member is preferably about 0.5-fold to 10-fold as compared with the thickness of the actuator substrate. Especially preferably, the thickness of the plate member is 1-fold to 5-fold.

On the other hand, when the low pressure press method is used as the pressurizing method, it is preferable that the plate member is thick in the view of the rigidity and the easiness of handling, because the small amount of deformation of the plate member is preferred.

As described above, those usable as the pressurizing method for the plate member 200 and the actuator substrate 18 include the various loading methods such as the loading based on the weight, the vacuum packaging method, the CIP method (hydrostatic pressure loading method), the loading based on the flip chip bonding, the constant value control, and the low pressure press method.

When the plate member 200 is laminated on the actuator substrate 18 followed by the pressurizing process, the crosspiece 70, which has been formed on the actuator substrate 18, serves as a spacer to define the distance between the actuator substrate 18 and the plate member 200. The crosspiece 70 and the pixel structure 102 are hardened after the pressurizing or in the pressurized state. Therefore, the defined distance corresponds to the distance between the actuator substrate 18 and the optical waveguide plate 12.

In this embodiment, a material, with which the pixel structure 102 is contracted during the hardening of the pixel structure 102, is used as the constitutive material for the pixel structure 102. By doing so, it is possible to form a constant gap "g" between the pixel structure 102 and the plate member 200 during the hardening for the crosspiece 70 and the pixel structure 102. This fact is equivalent to the fact that the constant gap "g" is formed between the pixel structure 102 and the optical waveguide plate 12.

When the material, with which the pixel structure 102 is contracted during the hardening of the pixel structure 102, is not used, the gap "g" may be formed as follows between the pixel structure 102 and the plate member 200 during the hardening of the crosspiece 70 and the pixel structure 102. That is, for example, when the plate member 200 is laminated and pressurized, then the pixel structure 102 may be heated and expanded, or the actuator element 14 may be displaced to allow the pixel structure 102 to make contact with the plate member 200. The constant gap "g" is formed between the pixel structure 102 and the plate member 200 owing to the contraction of the pixel structure 102 or the displacement reset (restoration) of the actuator element 14, during the hardening of the crosspiece 70 and the pixel structure 102 effected thereafter.

Alternatively, when the pixel structure 102 contacts with the optical waveguide plate 12 in the natural state, for example, as shown in FIG. 7, application may be made for the arrangement in which the pixel structure 102 makes displacement in the direction to make separation from the optical waveguide plate 12, concerning the displacement action of the actuator element 14.

When a smooth plate member is used as the plate member 200, a smooth surface, which is equivalent to the surface of the plate member 200, is formed on the surface of the pixel structure 102. The excellent smoothness is useful to improve the brightness upon light emission effected by the pixel.

Figure 34:
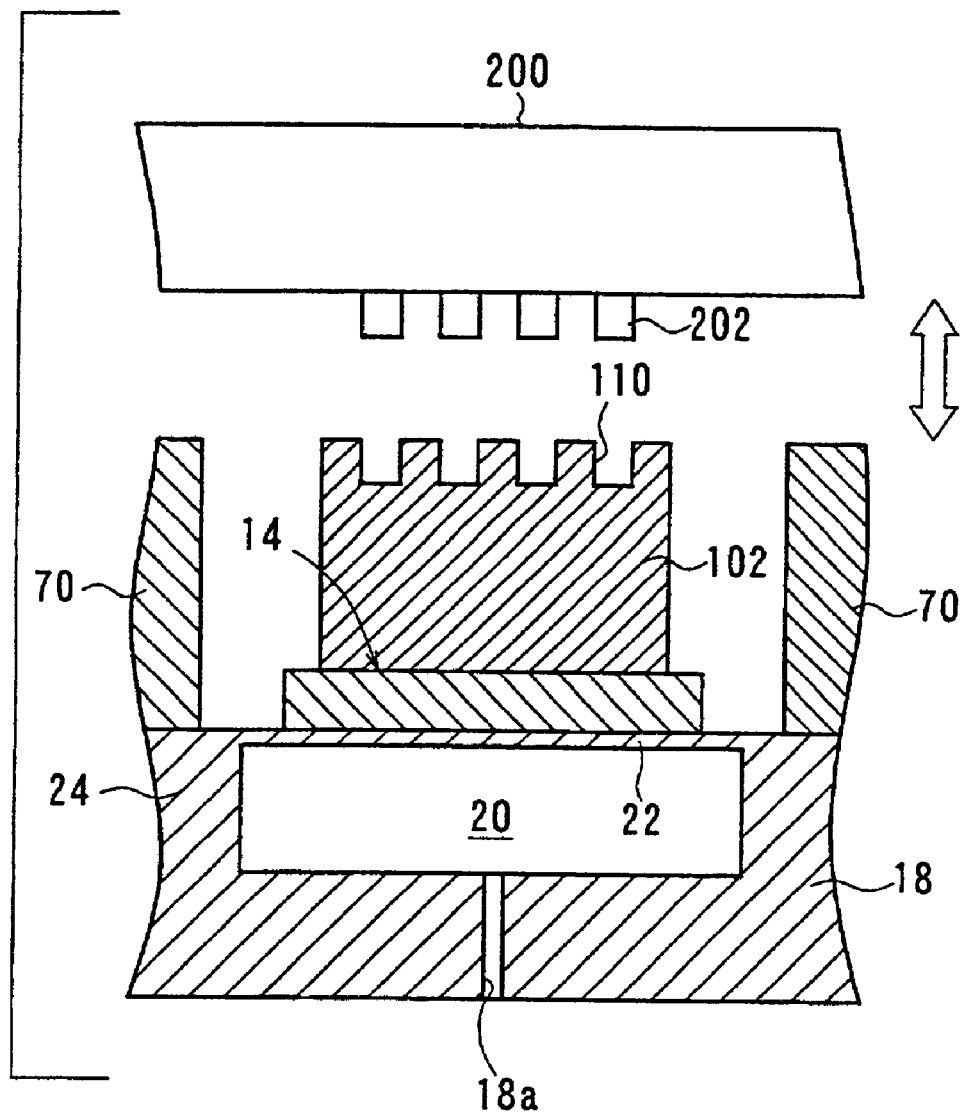
FIG. 34 illustrates a state in which a plate member having projections is used to form a plurality of recesses on the pixel structure.

As shown in FIG. 34, when a plate member, which has a plurality of projections 202 at the corresponding portions 10 with respect to the pixel structure 102, is used as the plate member 200, recesses 110, which correspond to the projections 202, are formed on the surface of the pixel structure 102 during the pressurizing process for the plate member 200 and the actuator substrate 18. Thus, it is possible to produce the display device Dc according to the third embodiment shown in FIG. 21.

Figure 35:
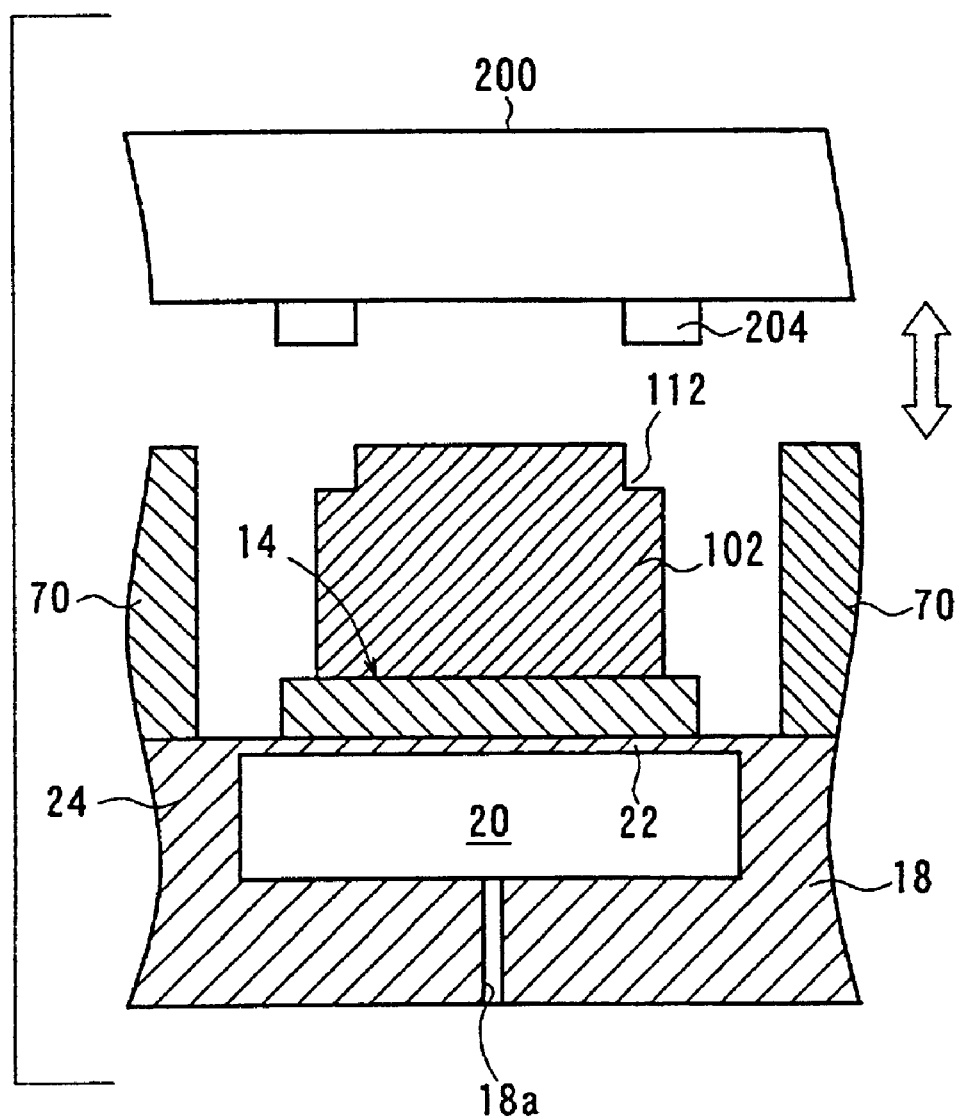
FIG. 35 illustrates a state in which a plate member having a projection is used to form a step on the pixel structure.

As shown in FIG. 35, when a plate member, which has a projection 204 at each of the portions corresponding to the circumferential edge of the pixel structure 102, is used as the plate member 200, the step 112, which corresponds to the projection 204, is formed at the circumferential edge of the pixel structure 102 during the pressurizing process for the plate member 200 and the actuator substrate 18. Thus, it is possible to produce the display device Dd according to the fourth embodiment shown in FIG. 22.

Figure 36:
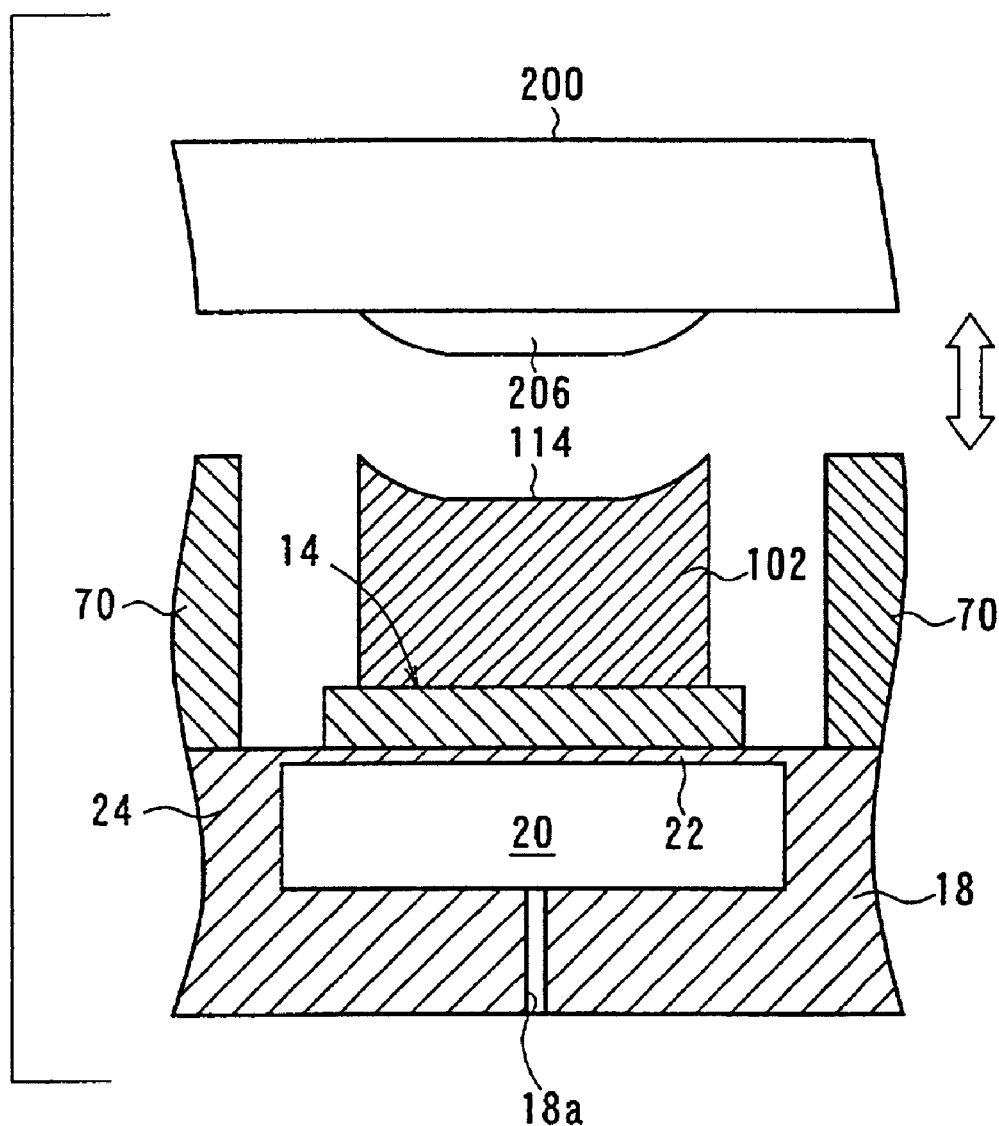
FIG. 36 illustrates a state in which a plate member having a convex configuration is used to form a concave configuration on the pixel structure.

As shown in FIG. 36, when a plate member, which has a convex configuration 206 at each of the portions corresponding to the pixel structure 102, is used as the plate member 200, the concave configuration 114, which corresponds to the convex configuration 206, is formed on the surface of the pixel structure 102 during the pressurizing process for the plate member 200 and the actuator substrate 18. Thus, it is possible to produce the display device De according to the fifth embodiment shown in FIG. 23.

Figure 37:
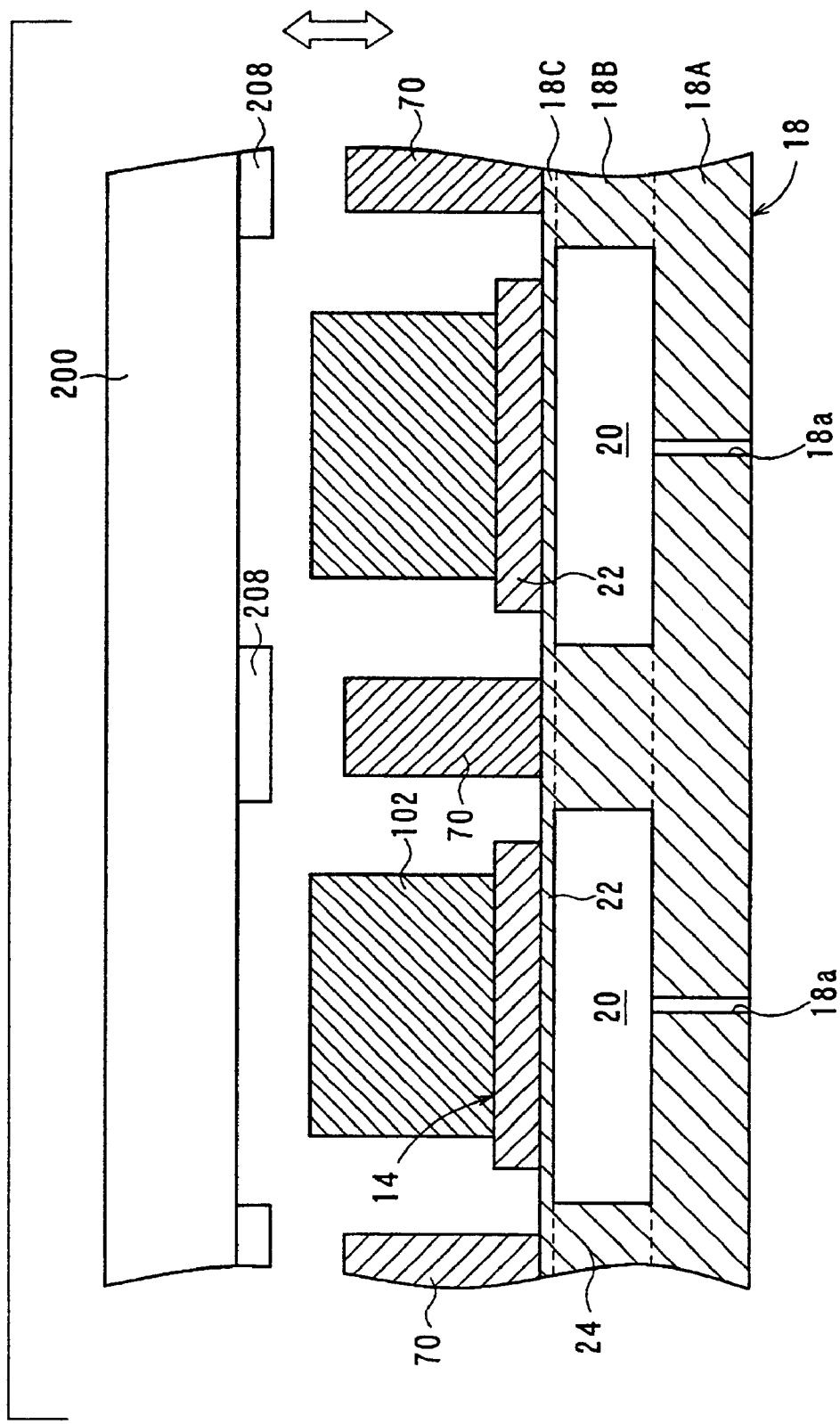
FIG. 37 illustrates a state in which a plate member having projections is used to form the upper end of the pixel structure which is higher than the upper end of the crosspiece.

As shown in FIG. 37, a plate member, which has a plurality of projections 208 at the portions corresponding to the crosspieces 70 respectively, is used as the plate member 200, the upper end of the pixel structure 102 is formed to be higher than the upper end of the crosspiece 70 during the pressurizing process for the plate member 200 and the actuator substrate 18. In this arrangement, the contact of the pixel structure 102 with respect to the optical waveguide plate 12 is made in a more complete manner, for example, in the display device Da shown in FIG. 7 which exhibits the ON state in the natural state. It is a matter of course that this arrangement is also preferably applicable to those having no gap-forming layer 50 concerning the display device Da shown in FIG. 7.

Another effect is also obtained. That is, it is possible to form a thick gap-forming layer 50. Therefore, when the gap-forming layer 50 functions as a light-absorbing layer, this arrangement is effective to improve the image quality such as the contrast. Further, it is possible to widen the range of material selection for the gap-forming layer 50. Of course, this arrangement is also applicable to the display device of the type in which the pixel structure 102 is separated from the optical waveguide plate 12 in the natural state.

On the other hand, when a plate member, which has a plurality of recesses at the portions corresponding to the crosspieces 70 respectively, is utilized as the plate member 200, the upper end of the pixel structure 102 is formed to be lower than the upper end of the crosspiece 70 during the pressurizing process for the plate member 200 and the actuator substrate 18. In this arrangement, a precise gap "g" can be formed even in the case of the form in which the gap-forming layer 50 is not provided.

The projections 202 of the plate member 200 or the like shown in FIGS. 34 to 37 is equivalently applicable to the fourth production method and the followings as described later on.

Figure 38A:
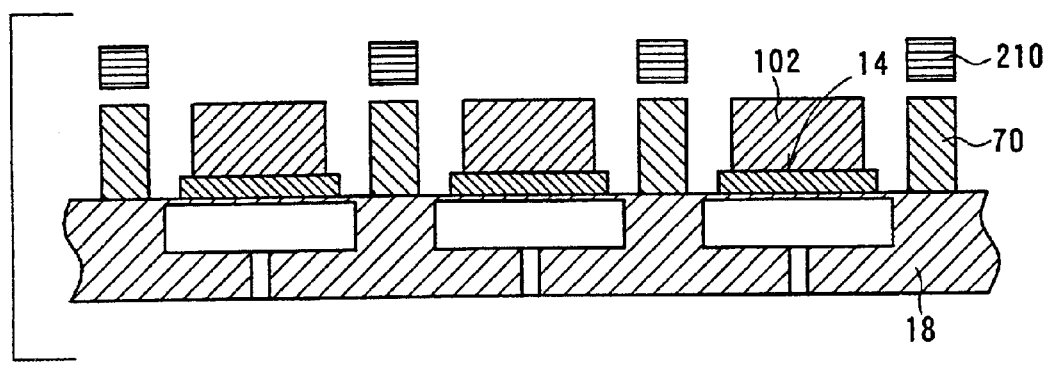
FIGS. 38A to 38B show production steps illustrating an example in which the optical waveguide plate is directly laminated on the upper surfaces of the crosspieces, concerning the third and fourth production methods.

After that, as shown in FIG. 38A, the plate member 200 is removed, and then an adhesive 210 is applied to the upper surface of the crosspiece 70 on the actuator substrate 18, for example, by means of the film formation method.

It is preferable to use an adhesive having high light-absorbing performance, because it is necessary to suppress the light scattering. For example, it is desirable to use an adhesive added with carbon black, black pigment, or black dye.

Figure 38B:
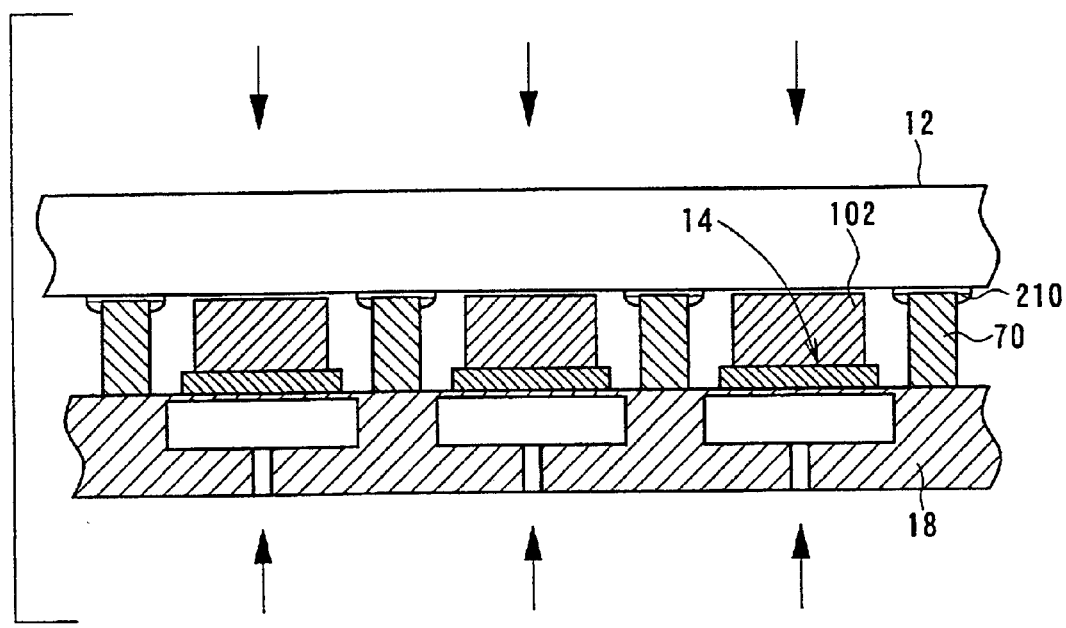

As shown in FIG. 38B, before the adhesive 210 is hardened, the optical waveguide plate 12 is pressed against the crosspiece 70 on the actuator substrate 18. The optical waveguide plate 12 and the actuator substrate 18 are pressurized in the directions to make approach to one another. Subsequently, the adhesive 210 is hardened in this state to complete the device.

As described above, those preferably usable as the pressurizing method for the optical waveguide plate 12 and the actuator substrate 18 include the various loading methods such as the loading based on the weight, the vacuum packaging method, the CIP method (hydrostatic pressure loading method), the loading based on the flip chip bonding, the constant value control, and the low pressure press method.

As described above, it is preferable to use the plate member 200 having the projection 202, 204, 206 on the surface, concerning the method for forming the recess 110 or the step 112 on the surface of the pixel structure 102, or for forming the concave configuration 114 on the surface of the pixel structure 102. For this purpose, it is preferable to use the method in which the metal film or the resist film is formed in accordance with the ordinary thin film formation method on the plate member 200 composed of glass. This method is advantageous in that the pattern and the height of the projection 202, 204, 206 can be freely changed. It is preferable that the height of the projection 202, 204, 206 is about 0.1 to 2 μm.

Concerning the above, another method, which is based on the plane polishing for the surface of the pixel structure 102 or the surface processing based on the laser, can be also used as the method for forming the recess 110 or the step 112 on the surface of the pixel structure 102. The laser processing is not limited to the formation of the recess 110 and the step 112, but it also has an effect of surface improvement by the aid of the heating. Further, it is possible to arbitrarily design the processing pattern. Therefore, the laser processing is used especially preferably.

On the other hand, the method for forming the concave configuration 114 on the surface of the pixel structure 102 is not limited to the methods described above. Besides, there are a method of heating, and a method of previously applying a voltage to the actuator element 14 during the hardening process for the pixel structure 102. There are a method in which the heating is performed during the figuring hardening with the plate member 200, and a method in which the heating is performed after the removal of the plate member 200. These methods can be selected depending on the material quality of the pixel structure 102. A heating temperature of 15° C. to 150° C. is used. Especially, a heating temperature of 20° C. to 80° C. is preferably used.

Next, the fourth production method will be explained with reference to FIGS. 39A to 39D. In the fourth production method, the pixel structure 102 and the crosspiece 70 are formed on the plate member 200, and they are hardened respectively. After that, the actuator substrate 18 is laminated. Subsequently, the plate member 200 is removed, and the optical waveguide plate 12 is laminated.

Figure 39A:
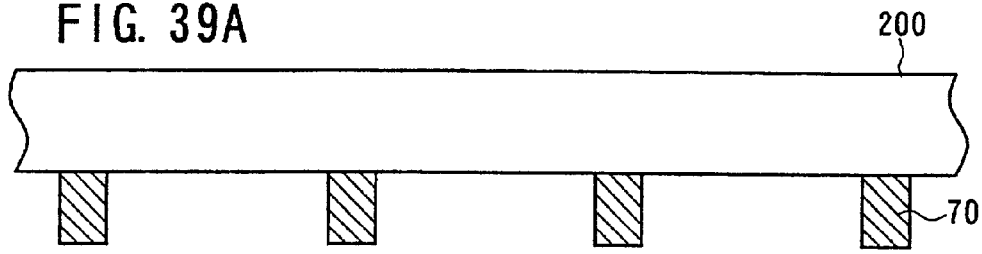
FIGS. 39A to 39D show production steps illustrating the fourth production method.
Figure 39B:
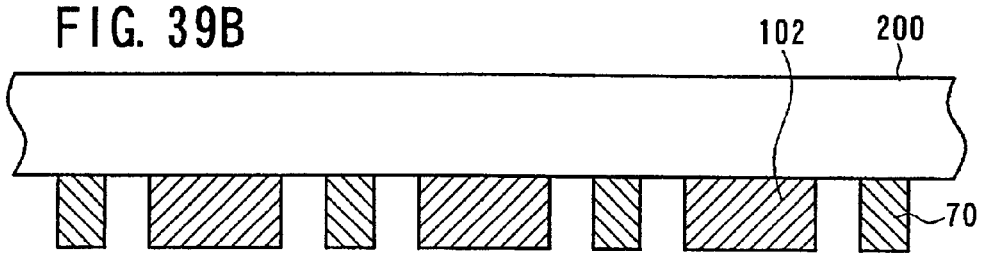

At first, as shown in FIG. 39A, the crosspiece 70 is formed, for example, by means of the film formation method at the portions other than the portions corresponding to the large number of pixels, of the plate member 200, and then the crosspiece 70 is hardened. Subsequently, as shown in FIG. 39B, the pixel structure 102 is formed, for example, by means of the film formation method at the portions corresponding to the large number of pixels, of the plate member 200, and then the pixel structure 102 is hardened.

Figure 39C:
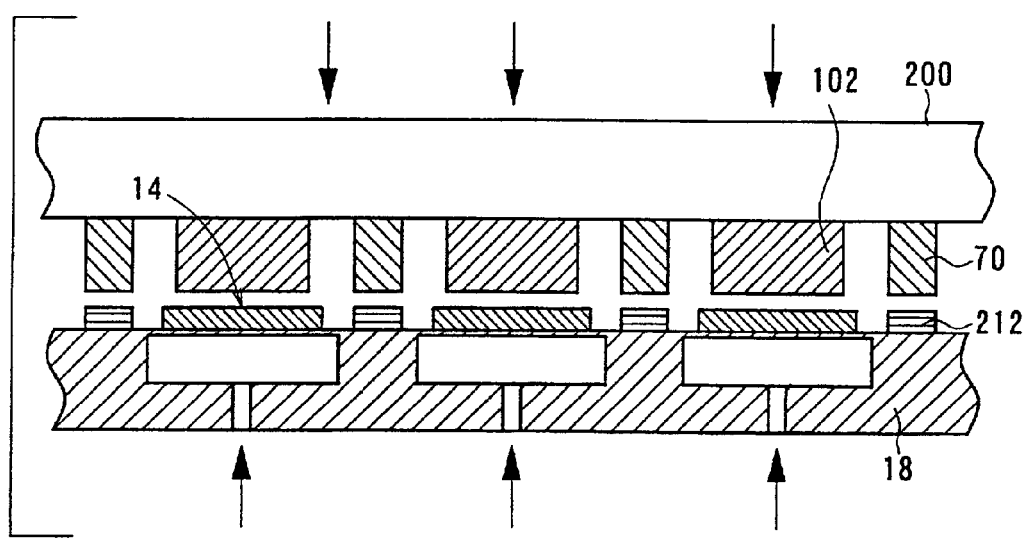

After that, as shown in FIG. 39C, an adhesive 212 is applied to the upper surface of the actuator element 14 and the position corresponding to the crosspiece 70, of the first principal surface of the actuator substrate 18 previously formed with the actuator elements 14 at the corresponding portions.

After that, before the adhesive 212 is hardened, the first principal surface side of the actuator substrate 18 is pressed against the crosspiece 70 and the pixel structure 102 on the plate member 200. The plate member 200 and the actuator substrate 18 are pressurized in the directions to make approach to one another. Subsequently, the adhesive 212 is hardened in this state.

Figure 39D:
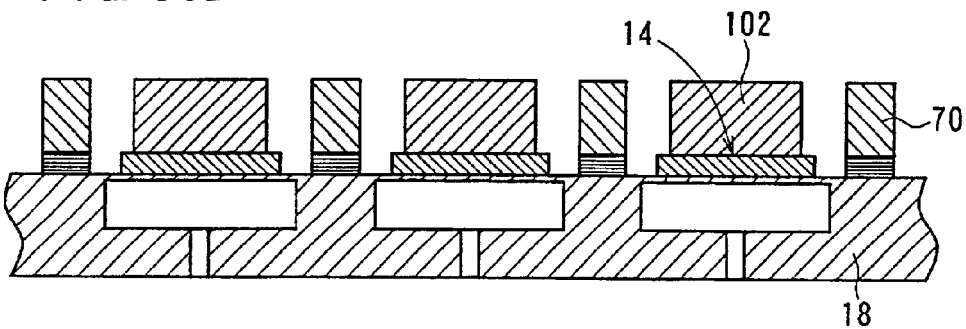

After that, as shown in FIG. 39D, the plate member 200 is removed. At this point of time, the crosspiece 70 and the pixel structure 102, which have been formed on the plate member 200 are transferred to the actuator substrate 18. Therefore, as shown in FIG. 39A, for example, it is preferable that a releasing agent is applied to the plate member 200 before the crosspiece 70 and the pixel structure 102 are formed on the plate member 200, because of the following reason. That is, the pixel structure 102 and the crosspiece 70 can be smoothly transferred to the actuator substrate 18.

After that, as shown in FIG. 38A, the adhesive 210 is applied, for example, by means of the film formation method on the upper surface of the crosspiece 70 on the actuator substrate 18.

As shown in FIG. 38B, before the adhesive 210 is hardened, the optical waveguide plate 12 is pressed against the crosspiece 70 on the actuator substrate 18. The optical waveguide plate 12 and the actuator substrate 18 are pressurized to make approach to one another. After that, the adhesive 210 is hardened in this state to complete the device.

The embodiment shown in FIGS. 38A and 38B is illustrative of the case in which the optical waveguide plate 12 is directly laminated on the upper surface of the crosspiece 70. Alternatively, it is also possible to adopt a method shown in FIGS. 40A and 40B.

Figure 40A:
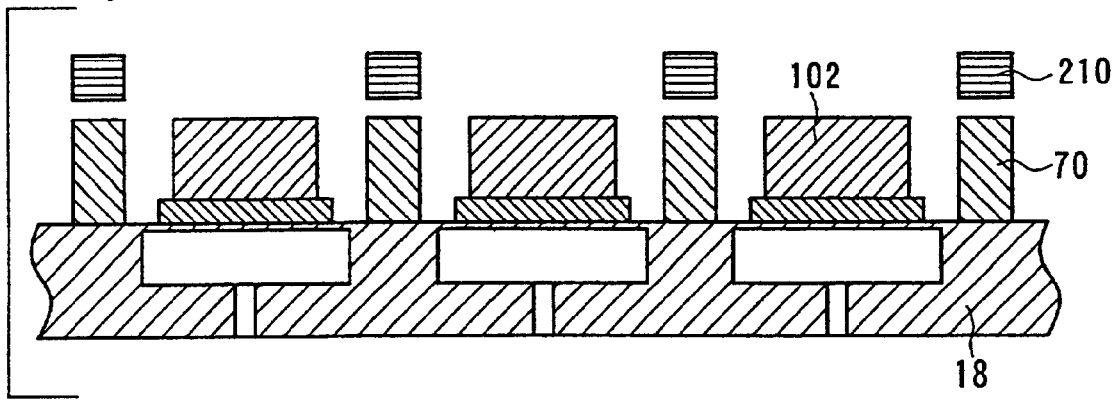
FIGS. 40A to 40B show production steps illustrating an example in which the optical waveguide plate is laminated on the upper surfaces of the crosspieces after forming the gap-forming layer on the optical waveguide plate, concerning the third and fourth production methods.

That is, as shown in FIG. 40A, the adhesive 210 is applied, for example, by means of the film formation method to the upper surface of the crosspiece 70 on the actuator substrate 18.

Figure 40B:
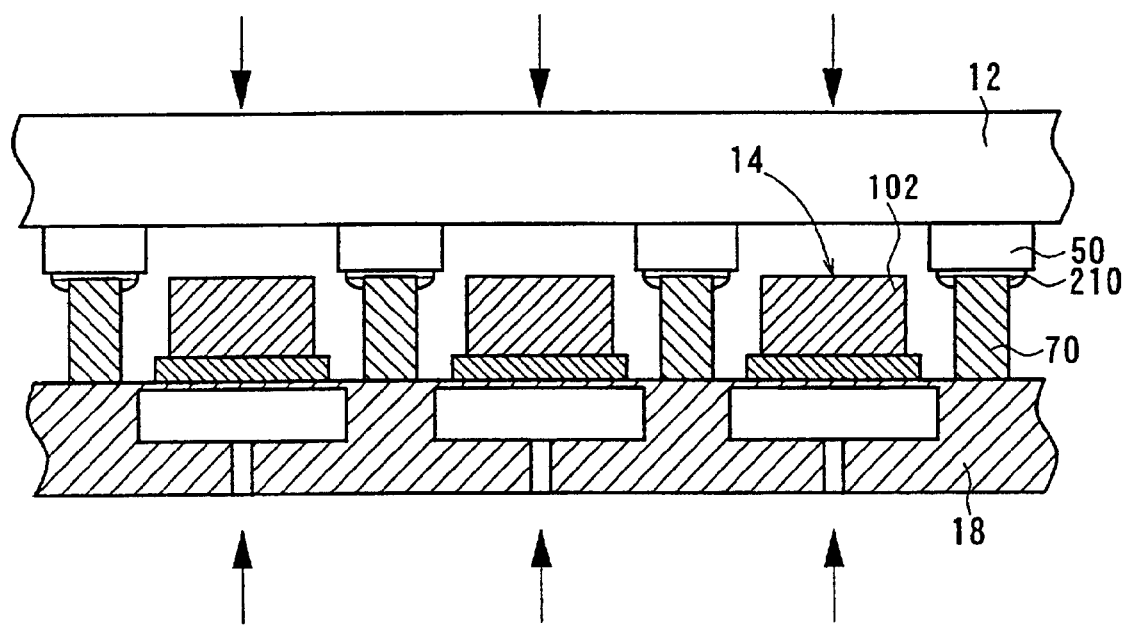

As shown in FIG. 40B, the gap-forming layer 50 is previously formed, for example, by means of the film formation method at the portions corresponding to the crosspiece, of the optical waveguide plate 12. Before the adhesive 210 is hardened, the optical waveguide plate 12 is pressed against the crosspiece 70 on the actuator substrate 18 (the gap-forming layer 50 is pressed against the crosspiece 70). The optical waveguide plate 12 and the actuator substrate 18 are pressurized in the directions to make approach to one another. After that, the adhesive 210 is hardened in this state to complete the device.

As shown in FIGS. 40A and 40B, when the gap-forming layer 50 is provided, it is easier to obtain the uniform gap "g" for all of the pixels between the pixel structure 102 and the optical waveguide plate 12. It is also possible to easily control the size of the gap "g".

Next, the fifth production method will be explained with reference to FIGS. 41A to 41C. In the fifth production method, the pixel structure 102 is formed on the optical waveguide plate 12, and the crosspiece 70 is formed on the actuator substrate 18. After that, the optical waveguide plate 12 and the actuator substrate 18 are laminated and pressurized.

Figure 41A:
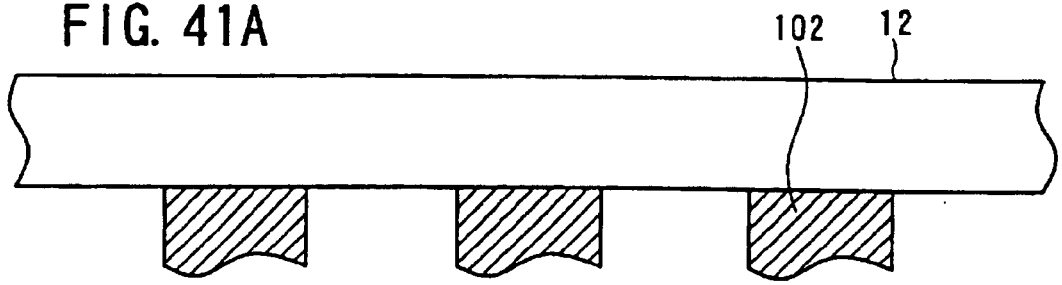
FIGS. 41A to 41C show production steps illustrating a fifth production method.
Figure 41B:
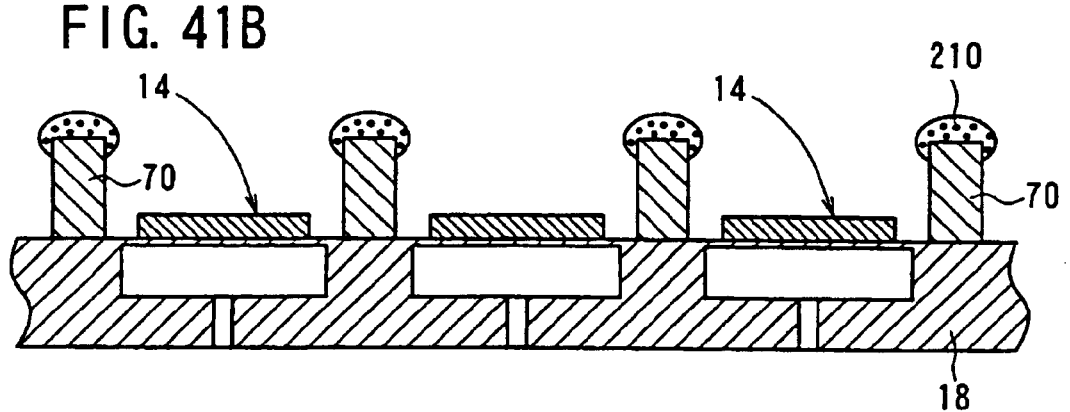

At first, as shown in FIG. 41A, the pixel structures 102 are formed, for example, by means of the film formation method at the portions corresponding to the large number of pixels, of the optical waveguide plate 12. Subsequently, as shown in FIG. 41B, the crosspiece 70 is formed, for example, by means of the film formation method at the portions formed with no actuator element 14, of the first principal surface of the actuator substrate 18. After that, an adhesive 210 is applied, for example, by means of the film formation method to the upper surface of the crosspiece 70 on the actuator substrate 18.

Figure 41C:
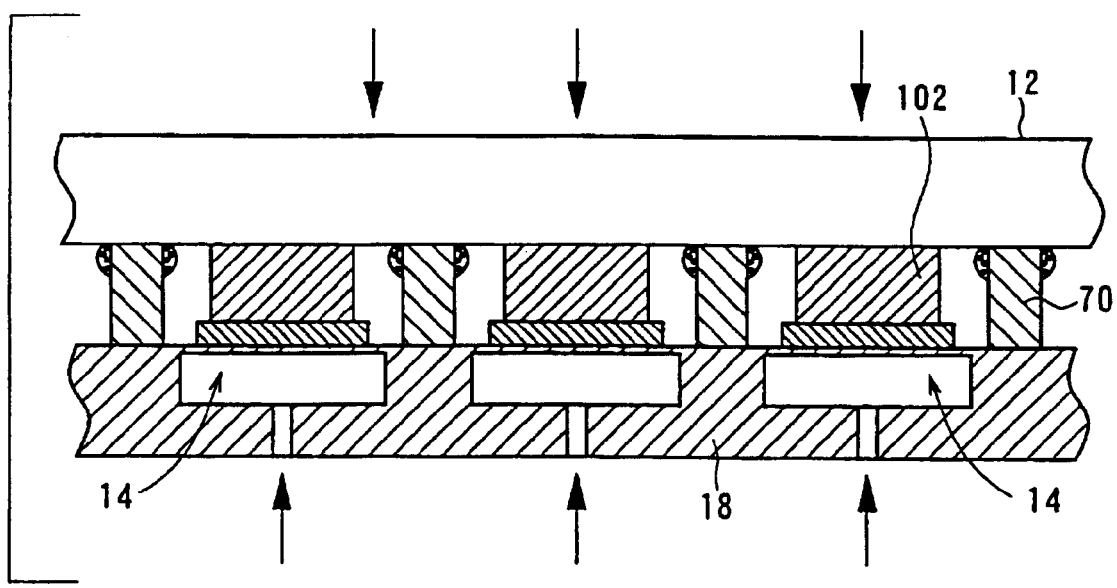

As shown in FIG. 41C, before the adhesive 210 is hardened, the surface of the actuator substrate 18 formed with the crosspiece 70 and the surface of the optical waveguide plate 12 formed with the pixel structure 102 are laminated with each other. The optical waveguide plate 12 and the actuator substrate 18 are pressurized in the directions to make approach to one another. After that, the adhesive 210 is hardened in this state to complete the device.

According to the fifth production method, the formation of the pixel structure 102 and the formation of the crosspiece 70 can be carried out in the mutually independent steps. Therefore, the range of material selection is widened concerning the pixel structure 102 and the crosspiece 70, and it is possible to reduce the production cost and the number of production steps. Further, the pixel structure 102 is formed on the optical waveguide plate 12 which has high flatness. Therefore, it is possible to obtain a uniform size of the pixel structure 102.

Next, the sixth production method will be explained with reference to FIGS. 42A to 42C. In the sixth production method, the crosspiece 70 is formed on the optical waveguide plate 12, and the pixel structure 102 is formed, on the actuator substrate 18. After that, the optical waveguide plate 12 and the actuator substrate 18 are laminated and pressurized.

Figure 42A:
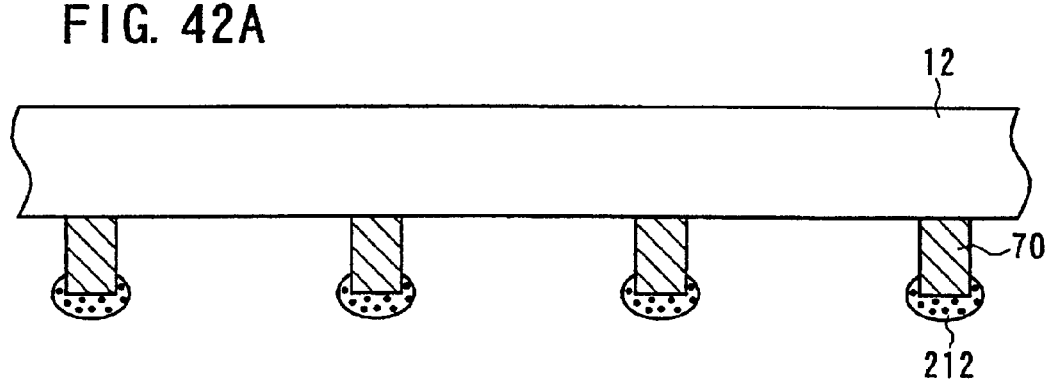
FIGS. 42A to 42C show production steps illustrating a sixth production method.
Figure 42B:
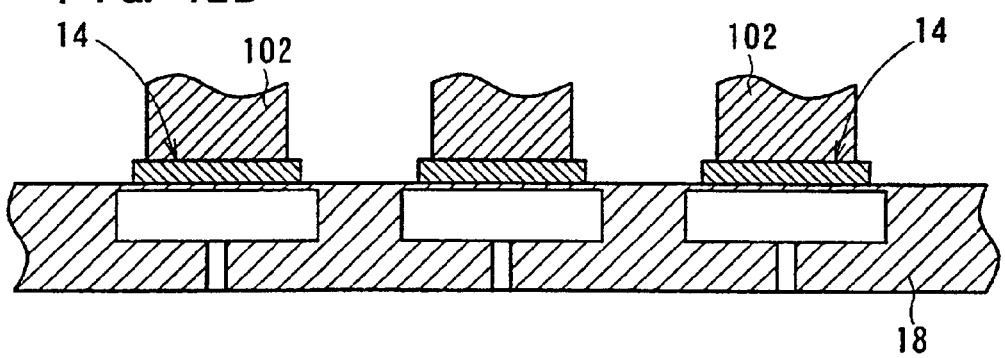

At first, as shown in FIG. 42A, the plurality of crosspieces 70 are formed, for example, by means of the film formation method at the portions other than the portions corresponding to the large number of pixels, of the optical waveguide plate 12. Subsequently, as shown in FIG. 42B, the pixel structures 102 are formed, for example, by means of the film formation method on the actuator elements 14 of the first principal surface of the actuator substrate 18. After that, an adhesive 212 is applied, for example, by means of the film formation method to the upper surfaces of the crosspieces 70 on the optical waveguide plate 12. Alternatively, the adhesive 212 is formed, for example, by means of the film formation method on the portions formed with no actuator element 14, of the first principal surface of the actuator substrate 18.

Figure 42C:
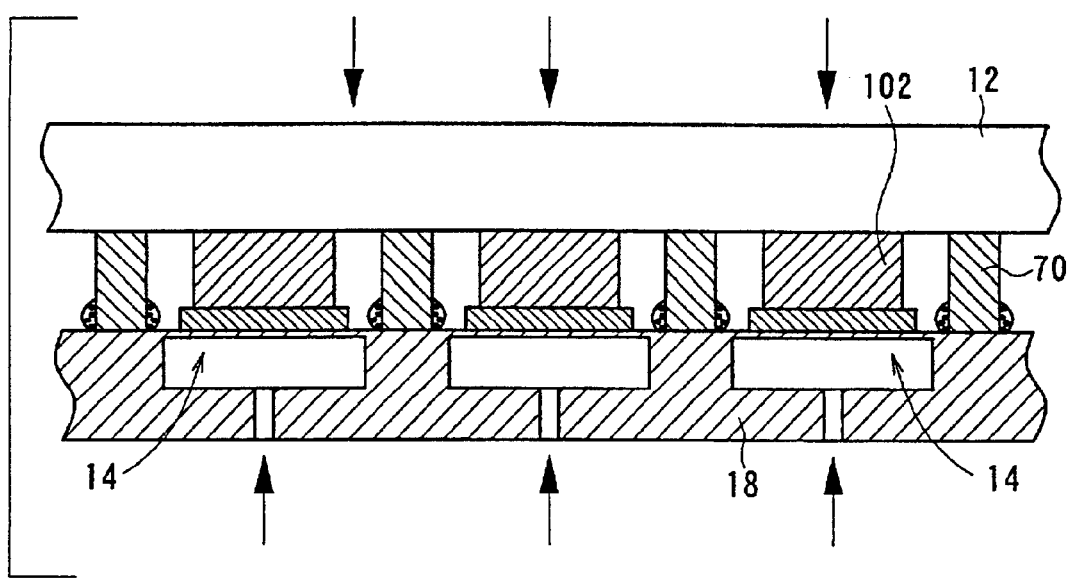

After that, as shown in FIG. 42C, before the adhesive 212 is hardened, the surface of actuator substrate 18 formed with the pixel structure 102 and the surface of the optical waveguide plate 12 formed with the crosspiece 70 are laminated with each other. The optical waveguide plate 12 and the actuator substrate 18 are pressurized in the directions to make approach to one another. After that, the adhesive 212 is hardened in this state to complete the device.

Also in the sixth production method, the formation of the pixel structure 102 and the formation of the crosspiece 70 can be carried out in the mutually independent steps. Therefore, the range of material selection is widened concerning the pixel structure 102 and the crosspiece 70, and it is possible to reduce the production cost and the number of production steps. Further, the crosspiece 70 is formed on the optical waveguide plate 12 which has high flatness. Therefore, it is possible to obtain a strictly uniform size of the crosspiece 70. Furthermore, no obstacle (for example, the crosspiece 70) exists when the pixel structure 102 is formed. Therefore, the pixel structure 102 can be formed accurately.

Next, the seventh production method will be explained with reference to FIGS. 43A and 43B. In the seventh production method, the pixel structure 102 is formed on the actuator substrate 18 which has been previously provided with the crosspiece 70 in the integrated manner. After that, the optical waveguide plate 12 is laminated and pressurized.

Figure 43A:
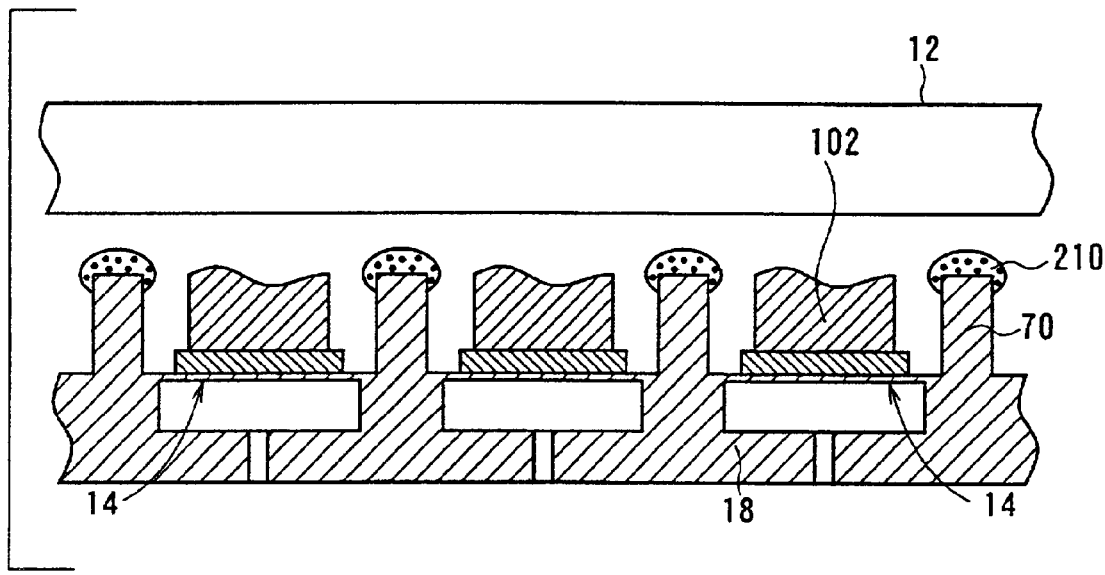
FIGS. 43A and 43B show production steps illustrating a seventh production method.

At first, as shown in FIG. 43A, the pixel structures 102 are formed on the respective actuator elements 14 of the actuator substrate 18 which integrally includes, the plurality of crosspieces 70 at the portions other than the actuator elements 14. Subsequently, an adhesive 210 is formed, for example, by means of the film formation method on the upper surfaces of the crosspieces 70 on the actuator substrate 18.

Figure 43B:
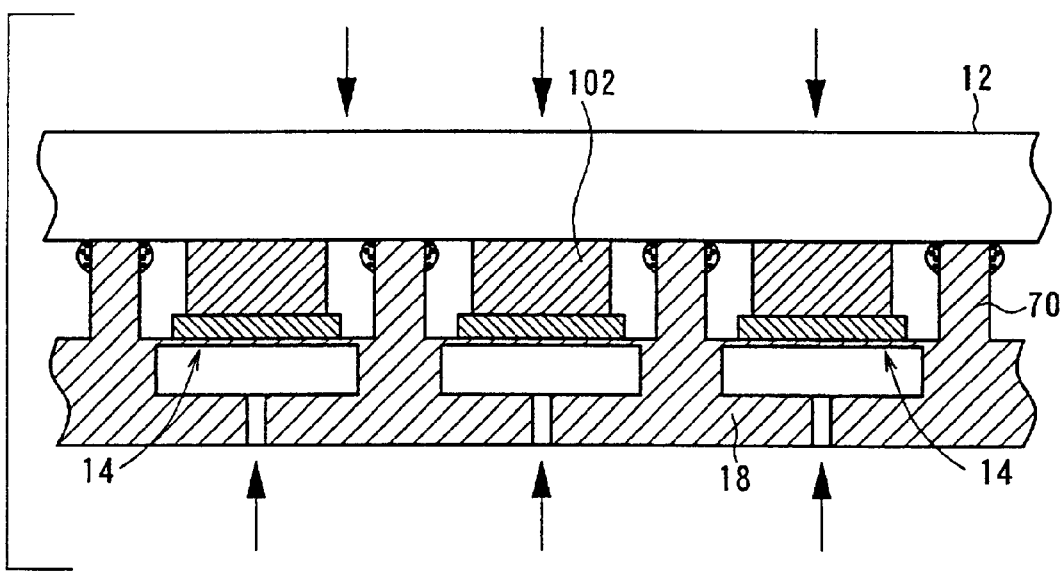

As shown in FIG. 43B, before the crosspieces 70 and the pixel structures 102 on the actuator substrate 18 are hardened, the optical waveguide plate 12 is pressed against the crosspieces 70 and the pixel structures 102 on the actuator substrate 18. The optical waveguide plate 12 and the actuator substrate 18 are pressurized in the directions to make approach to one another. After that, the crosspieces 70 and the pixel structures 102 are hardened in this state to complete the device.

In the seventh production, method, the actuator substrate 18, which previously has the crosspieces 70 in the integrated manner, is used as the actuator substrate 18. Therefore, the mechanical strength of the portion of the crosspiece 70 is high. Accordingly, the rigidity of the actuator substrate 18 is enhanced. As a result, for example, when the actuator substrate 18 is carried or stored, the crosspiece 70 can be used to protect the actuator element 14, especially the vibrating section 22 formed on the actuator substrate 18. The step of hardening the crosspiece 70 can be omitted, as compared with the case in which the crosspiece 70 is formed separately. Thus, it is possible to reduce the number production steps.

Next, the eighth production method will be explained with reference to FIGS. 44A to 45B. In the eighth production method, the crosspiece 70 is formed on the actuator substrate 18, and the pixel structure 102 is formed on the plate member 200. The actuator substrate 18 and the plate member 200 are laminated and pressurized. After that, the plate member 200 is removed, and the optical waveguide plate 12 is laminated and pressurized.

Figure 44A:
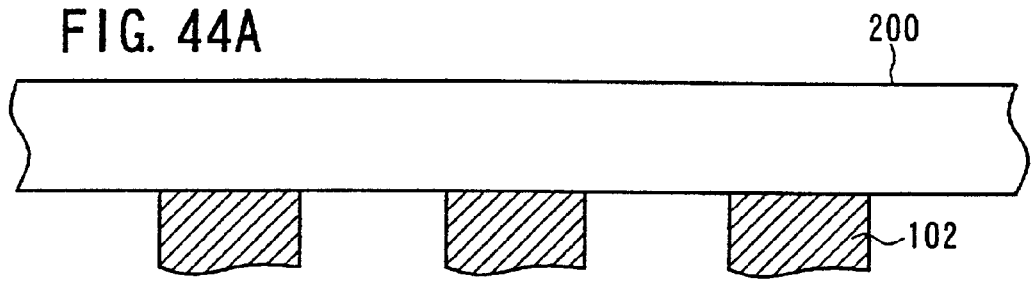
FIGS. 44A to 44C show production steps illustrating an eighth production method (No. 1)
Figure 44B:
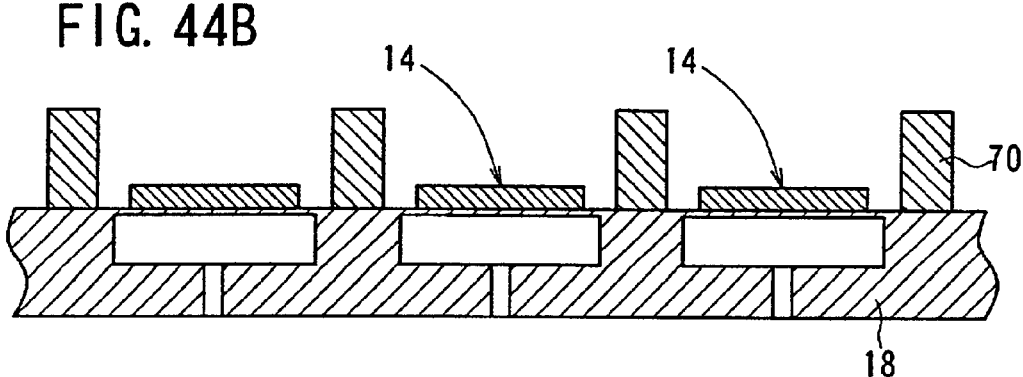

At first, as shown in FIG. 44A, the pixel structures 102 are formed at the portions corresponding to the large number of pixels, of the plate member 200. Subsequently, as shown in FIG. 44B, the plurality of crosspieces 70 are formed at the portions other than the actuator elements 14, of the actuator substrate 18.

Figure 44C:
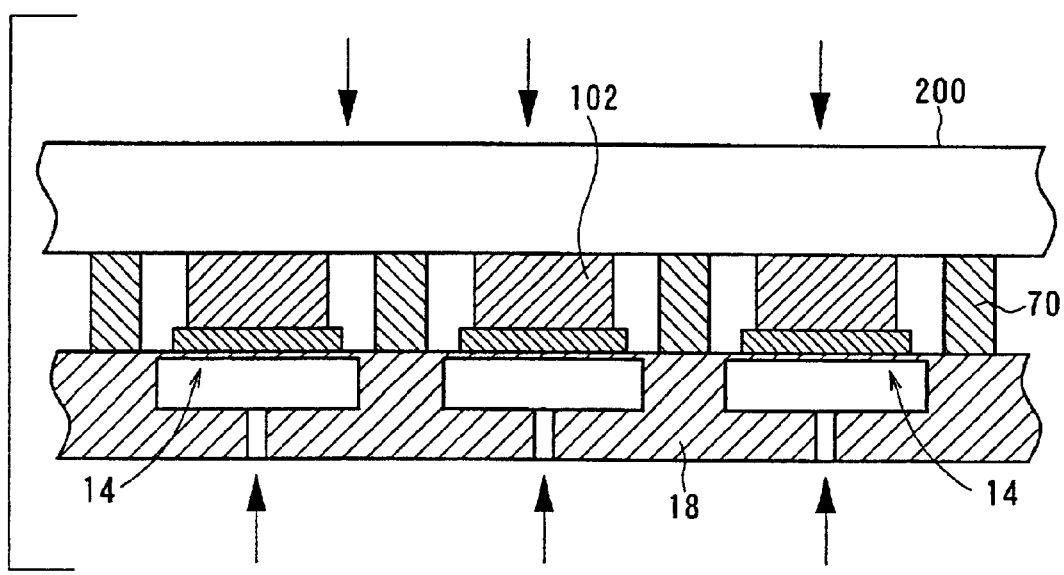

Subsequently, as shown in FIG. 44C, before the crosspieces 70 and the pixel structures 102 on the actuator substrate 18 are hardened, the surface of the actuator substrate 18 formed with the crosspieces 70 and the surface of the plate member 200 formed with the pixel structures 102 are laminated with each other. The plate member 200 and the actuator substrate 18 are pressurized in the directions to make approach to one another. After that, the crosspieces 70 and the pixel structures 102 are hardened in this state.

Figure 45A:
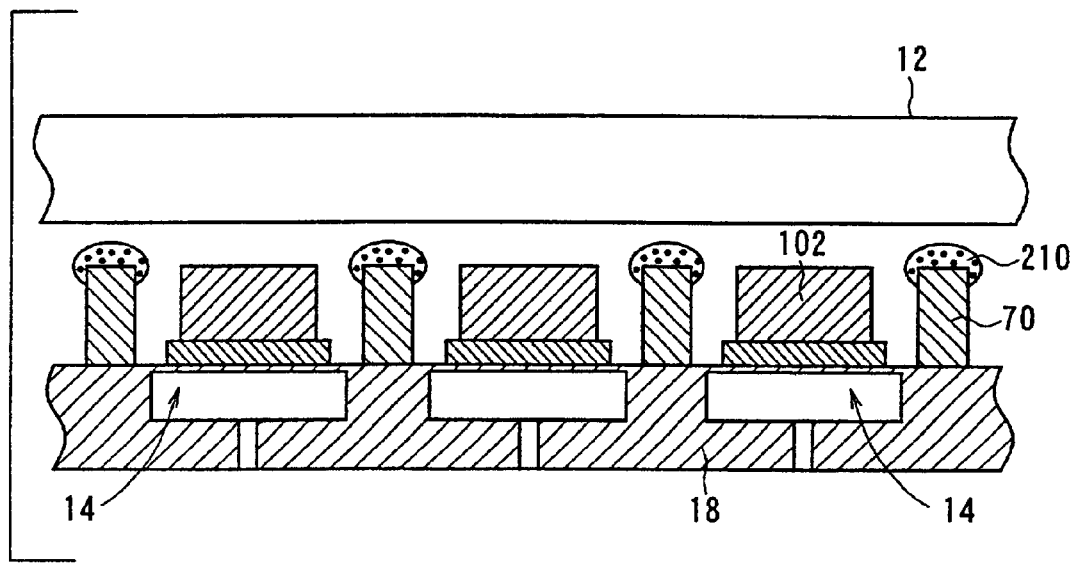
FIGS. 45A and 45B show production steps illustrating the eighth production method (No. 2)

After that, as shown in FIG. 45A, the plate member 200 is removed, and the pixel structures 102 are transferred to the actuator substrate 18. Subsequently, an adhesive 210 is applied, for example, by means of the film formation method to the upper surfaces of the crosspieces 70 on the actuator substrate 18.

Figure 45B:
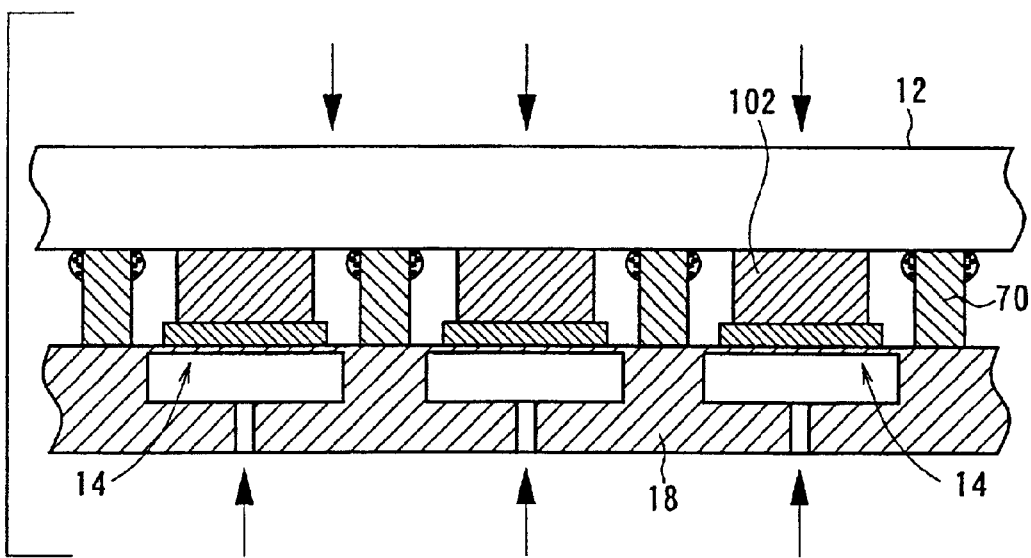

As shown in FIG. 45B, before the adhesive 210 is hardened, the optical waveguide plate 12 is pressed against the crosspieces 70 on the actuator substrate 18. The optical waveguide plate 12 and the actuator substrate 18 are pressurized in the directions to make approach to one another. After that, the adhesive 210 is hardened in this state to complete the device.

In this embodiment, the formation of the pixel structure 102 and the formation of the crosspiece 70 can be carried out in the mutually independent steps. Therefore, the range of material selection is widened concerning the pixel structure 102 and the crosspiece 70, and it is possible to reduce the production cost and the number of production steps. Further, the pixel structure 102 is formed on the plate member 200 which has high flatness. Therefore, it is possible to obtain a uniform size of the pixel structure 102.

Next, the ninth production method will be explained with reference to FIGS. 46A to 47B. In the ninth production method, the pixel structure 102 is formed on the actuator substrate 18, and the crosspiece 70 is formed on the plate member 20. The actuator substrate 18 and the plate member 200 are laminated and pressurized. After that, the plate member 200 is removed, and the optical waveguide plate 12 is laminated and pressurized.

Figure 46A:
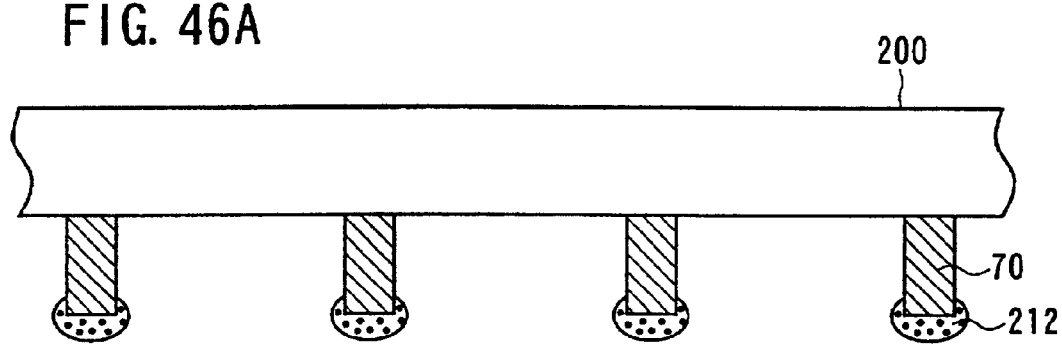
FIGS. 46A to 46C show production steps illustrating a ninth production method (No. 1)
Figure 46B:
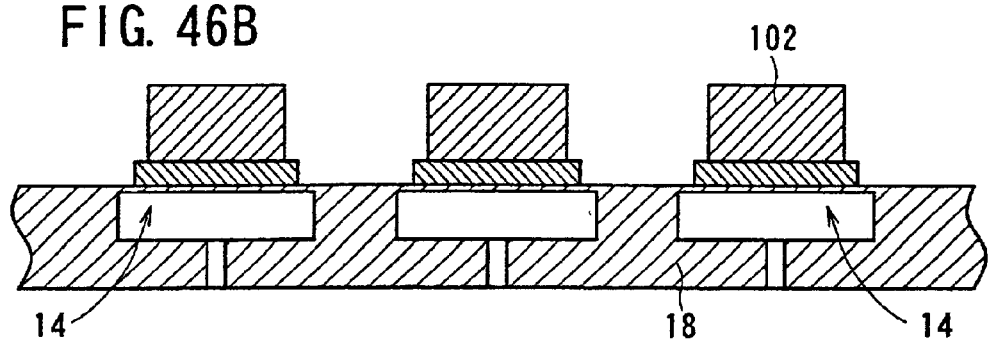

At first, as shown in FIG. 46A, the crosspieces 70 are formed at the portions other than the portions corresponding to the large number of pixels, of the plate member 200. Subsequently, as shown in FIG. 46B, the pixel structures 102 are formed on the respective actuator elements 14 of the actuator substrate 18. After that, an adhesive 212 is formed, for example, by means of the film formation method on the lower surfaces of the crosspieces 70 formed on the plate member 200. The adhesive 212 may be applied to the portions other than the actuator elements 14 of the actuator substrate 18, not to the upper surfaces of the crosspieces 70.

Figure 46C:
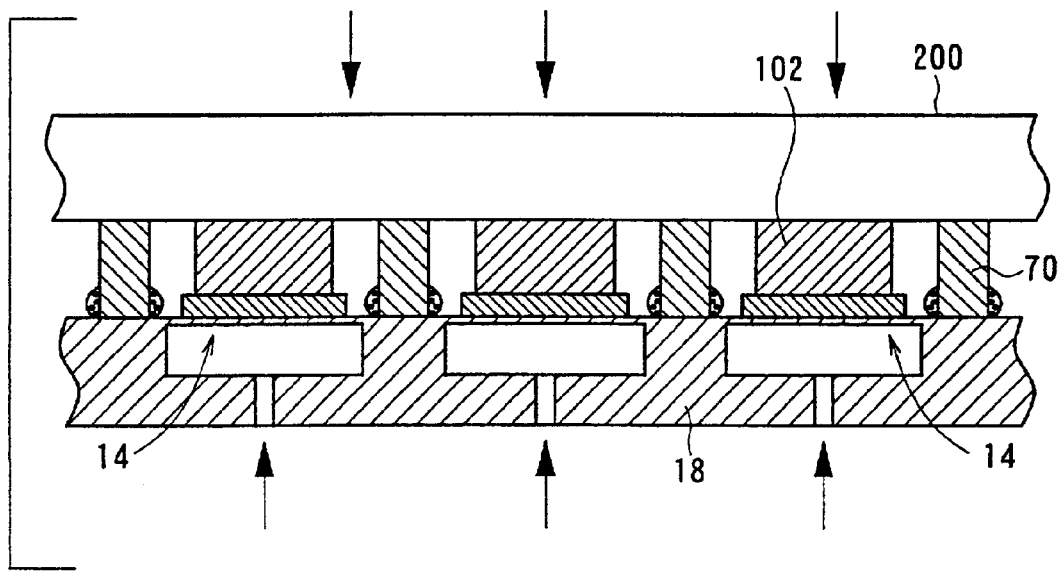

Subsequently, as shown in FIG. 46C, before the pixel structures 102 on the actuator substrate 18 are hardened, the surface of the actuator substrate 18 formed with the pixel structures 102 and the surface of the plate member 200 formed with the crosspieces 70 are laminated with each other. The plate member 200 and the actuator substrate 18 are pressurized in the directions to make approach to one another. After that, the pixel structures 102 are hardened in this state.

Figure 47A:
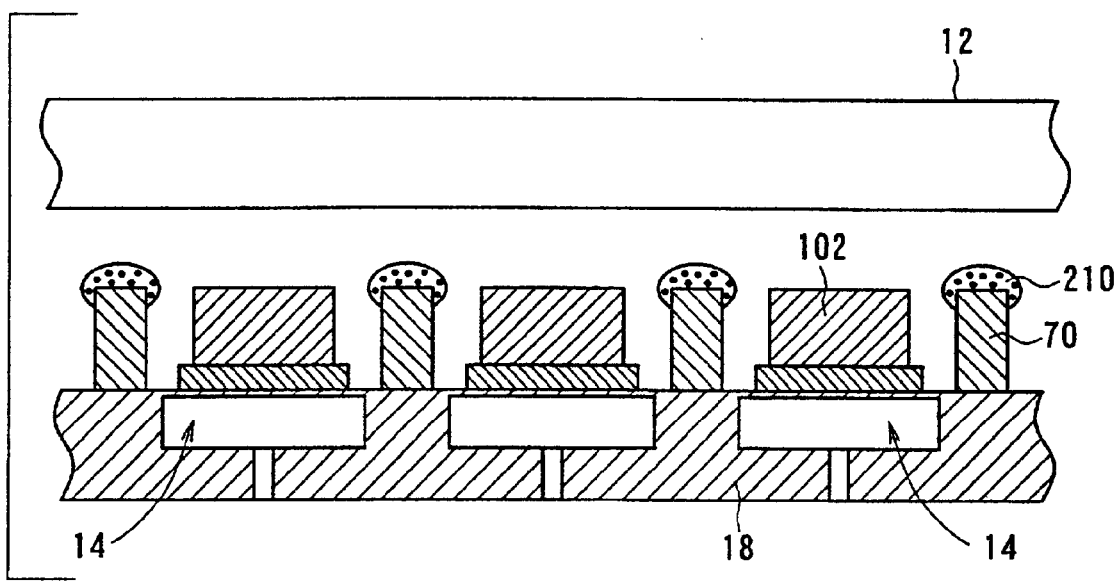
FIGS. 47A and 47B show production steps illustrating the ninth production method (No. 2)

After that, as shown in FIG. 47A, the plate member 200 is removed, and the crosspieces 70 are transferred to the actuator substrate 18. Subsequently, an adhesive 210 is applied, for example, by means of the film formation method to the upper surfaces of the crosspieces 70 on the actuator substrate 18.

Figure 47B:
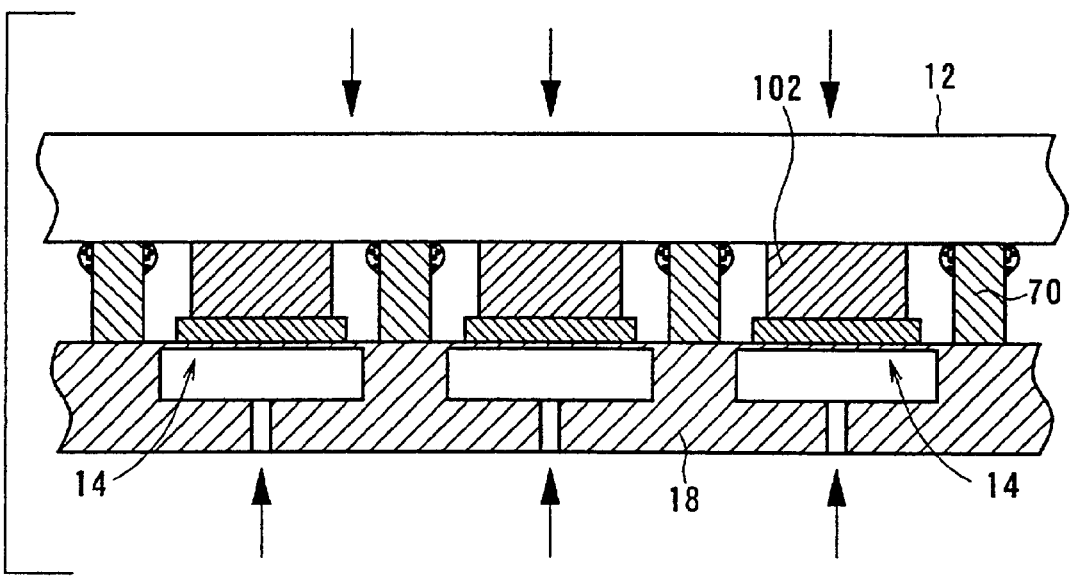

As shown in FIG. 47B, before the adhesive 210 is hardened, the optical waveguide plate 12 is pressed against the crosspieces 70 on the actuator substrate 18. The optical waveguide plate 12 and the actuator substrate 18 are pressurized in the directions to make approach to one another. After that, the adhesive 210 is hardened in this state to complete the device.

Also in this embodiment, the formation of the pixel structure 102 and the formation of the crosspiece 70 can be carried out in the mutually independent steps. Therefore, the range of material selection is widened concerning the pixel structure 102 and the crosspiece 70, and it is possible to reduce the production cost and the number of production steps. Further, the crosspiece 70 is formed on the plate member 200 which has high flatness. Therefore, it is possible to obtain a strictly uniform size of the crosspiece 70. Furthermore, no obstacle (for example, the crosspiece 70) exists when the pixel structure 102 is formed. Therefore, the pixel structure 102 can be formed accurately.

Especially, the ninth production method is preferably used to form the crosspiece 70 having the stripe-shaped opening 220 as shown in FIG. 13, and the line-shaped crosspiece 70 as shown in FIG. 14. That is, the film is punched and processed to form the stripe-shaped opening 220, or the film is finely cut into the line-shaped configuration.

Figure 48:
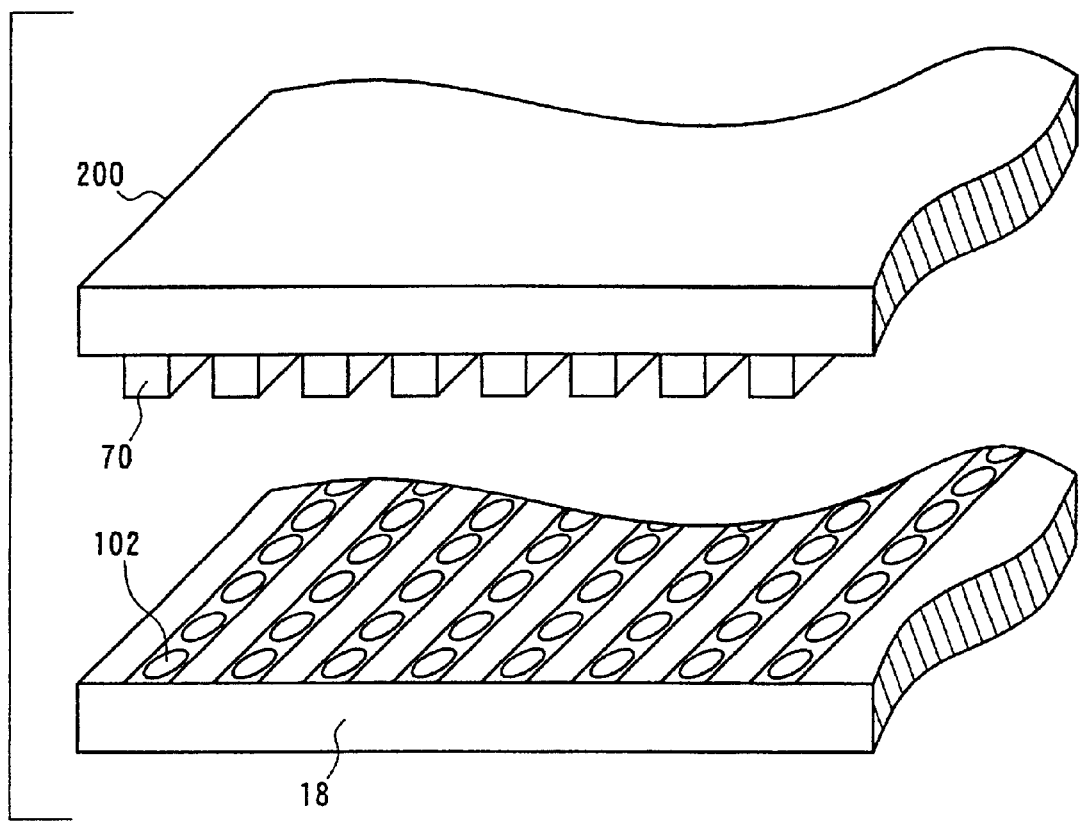
FIG. 48 illustrates a state in which the crosspieces composed of the film are laminated on the plate member by utilizing the surface tension of the liquid (for example, water)

Subsequently, as shown in FIG. 48, the crosspiece 70 composed of the film is laminated on the plate member 200 by utilizing the surface tension of the liquid (for example, water). After that, the process leads to the step shown in FIG. 46A. In this case, the crosspiece 70 is merely affixed to the plate member 200 by the aid of only the surface tension of the liquid. Therefore, it is easy to remove the plate member 200 thereafter.

Next, the tenth production method will be explained with reference to FIGS. 49A to 50B. In the tenth production method, the pixel structure 102 is formed on the actuator substrate 18. After that, the actuator substrate 18 is laminated with the jig 234 including the large number of size-defining members 232 provided on the plate member 230, and they are pressurized. Thus, the size of the pixel structure 102 is defined. Subsequently, the jig 234 is removed, and the crosspiece 70 is formed on the actuator substrate 18. After that, the optical waveguide plate 12 is laminated and pressurized.

Figure 49A:
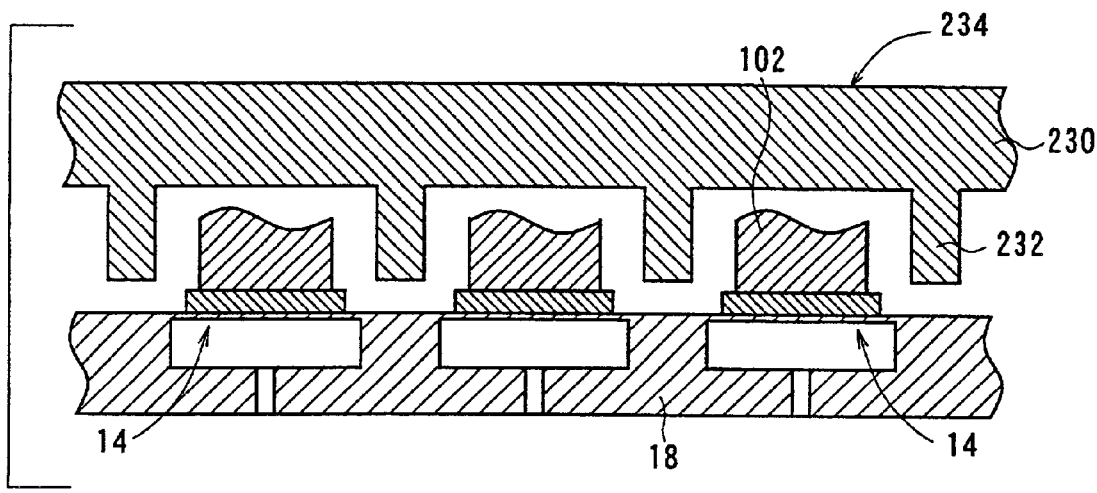
FIGS. 49A to 49C show production steps illustrating a tenth production method (No. 1)

At first, as shown in FIG. 49A, the pixel structures 102 are formed on the respective actuator elements 14 of the actuator substrate 18.

Figure 49B:
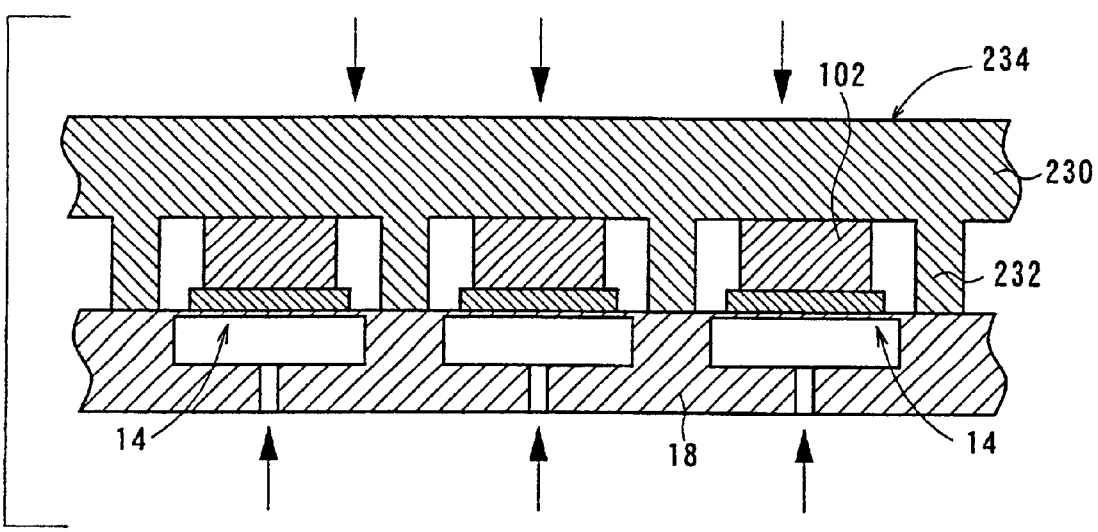

After that, as shown in FIG. 49B, the jig 234 is prepared, which includes, on one surface of the plate member 230, the large number of size-defining members 232 having approximately the same height as that of the crosspieces 70 to be formed on the actuator substrate 18. The surface of the jig 234 formed with the size-defining members 232 and the surface of the actuator substrate 18 formed with the pixel structures 102 are laminated with each other. The jig 234 and the actuator substrate 18 are pressurized in the directions to make approach to one another. After that, the pixel structures 102 are hardened in this state.

Figure 49C:
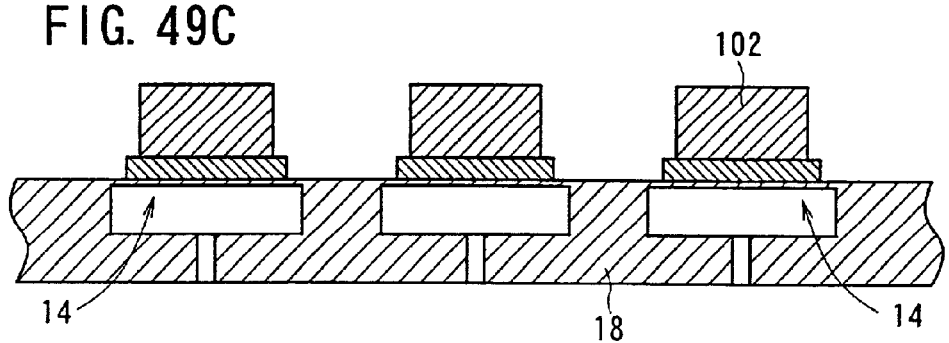
Figure 50A:
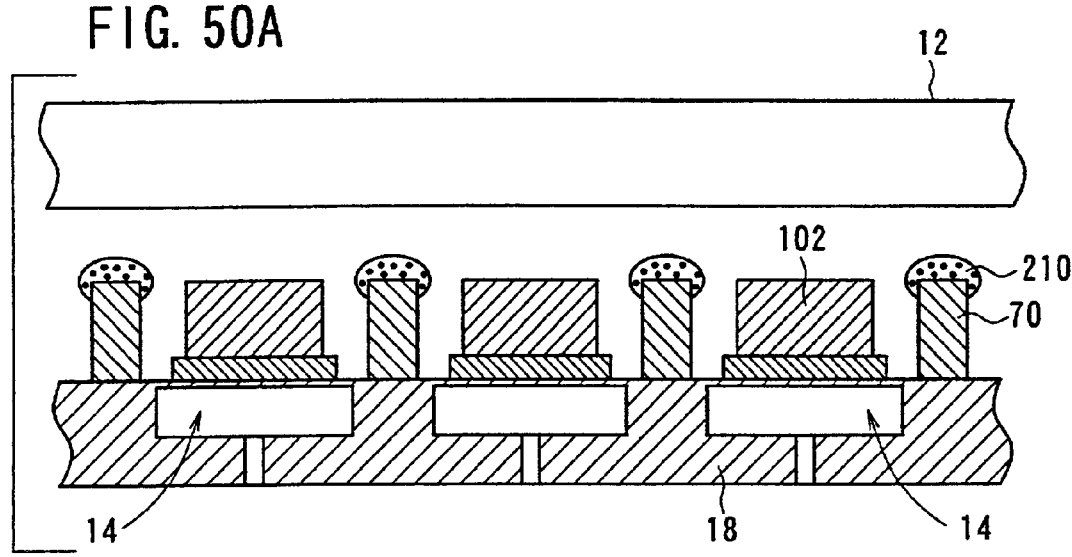
FIGS. 50A and 50B show production steps illustrating the tenth production method (No. 2)

Subsequently, as shown in FIG. 49C, the jig 234 is removed. After that, as shown in FIG. 50A, the plurality of crosspieces 70 are formed at the portions other than the actuator elements 14, of the actuator substrate 18. Subsequently, an adhesive 210 is applied, for example, by means of the film formation method to the upper surfaces of the crosspieces 70 on the actuator substrate 18.

Figure 50B:
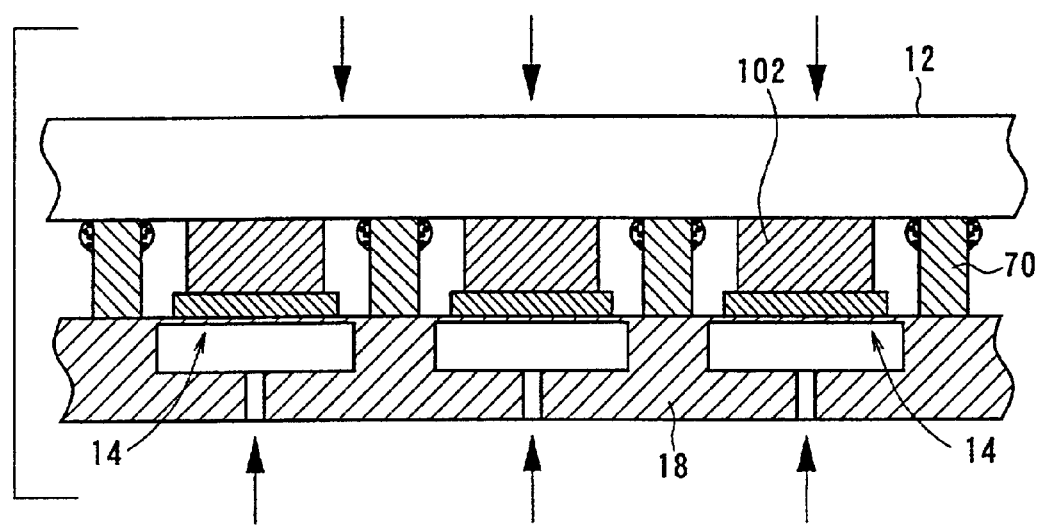

As shown in FIG. 50B, before the adhesive 210 is hardened, the optical waveguide plate 12 is pressed against the crosspieces 70 on the actuator substrate 18. The optical waveguide plate 12 and the actuator substrate 18 are pressurized in the directions to make approach to one another. Subsequently, the adhesive 210 is hardened in this state to complete the device.

In the tenth production method, for example, when the jig 234 is formed by using a member having rigidity such as metal, it is possible to reduce the waviness of the actuator substrate 18 formed with the pixel structures 102, by laminating and pressurizing the jig 234 and the actuator substrate 18. It is possible to form the crosspiece 70 highly accurately in the step of forming the crosspiece 70 performed thereafter.

Next, the eleventh production method will be explained with reference to FIGS. 51A to 52B. In the eleventh production method, the pixel structures 102 are formed on the actuator substrate 18, and then the actuator substrate 18 and the jig 234 including, on the plate member 230, the large number of size-defining members 232 are laminated and pressurized with each other. Thus, the size of the pixel structure 102 is defined. After the jig 234 is removed, the crosspieces 70 are formed on the optical waveguide plate 12. The optical waveguide plate 12 and the actuator substrate 18 are laminated with each other.

Figure 51A:
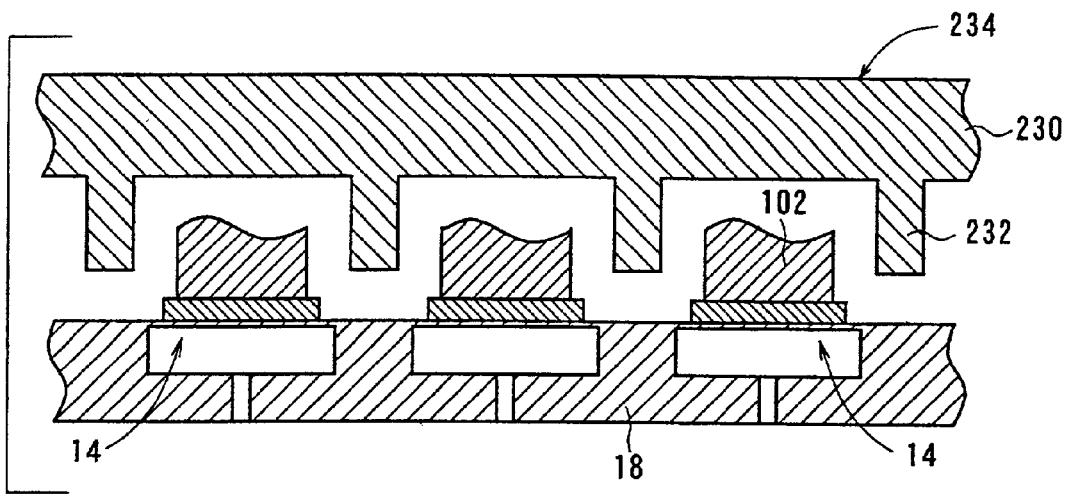
FIGS. 51A to 51C show production steps illustrating an eleventh production method (No. 1)

At first, as shown in FIG. 51A, the pixel structures 102 are formed on the respective actuator elements 14 of the actuator substrate 18.

Figure 51B:
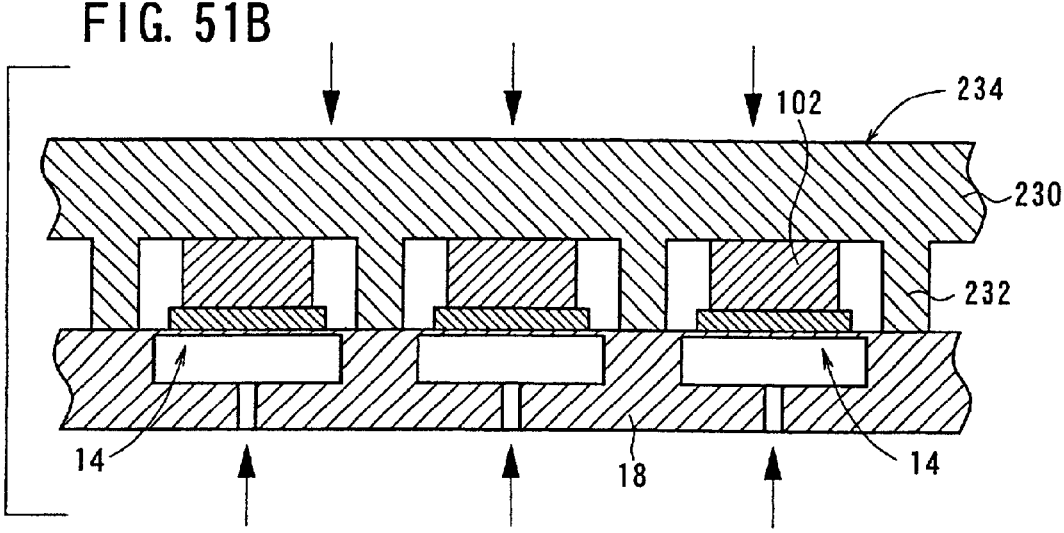

After that, as shown in FIG. 51B, the jig 234 is prepared, which includes the large number of size-defining members 232 having approximately the same height as that of the crosspieces 70 to be formed on the actuator substrate 18, the size-defining members 232 being formed on one surface of the plate member 230. The surface of the jig 234 formed with the size-defining members 232 and the surface of the actuator substrate 18 formed with the pixel structures 102 are laminated with each other. The jig 234 and the actuator substrate 18 are pressurized in the directions to make approach to one another. After that, the pixel structures 102 are hardened in this state.

Figure 51C:
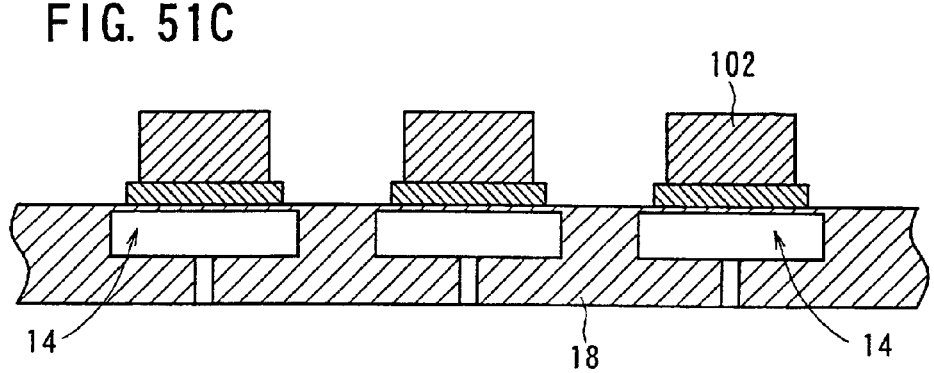
Figure 52A:
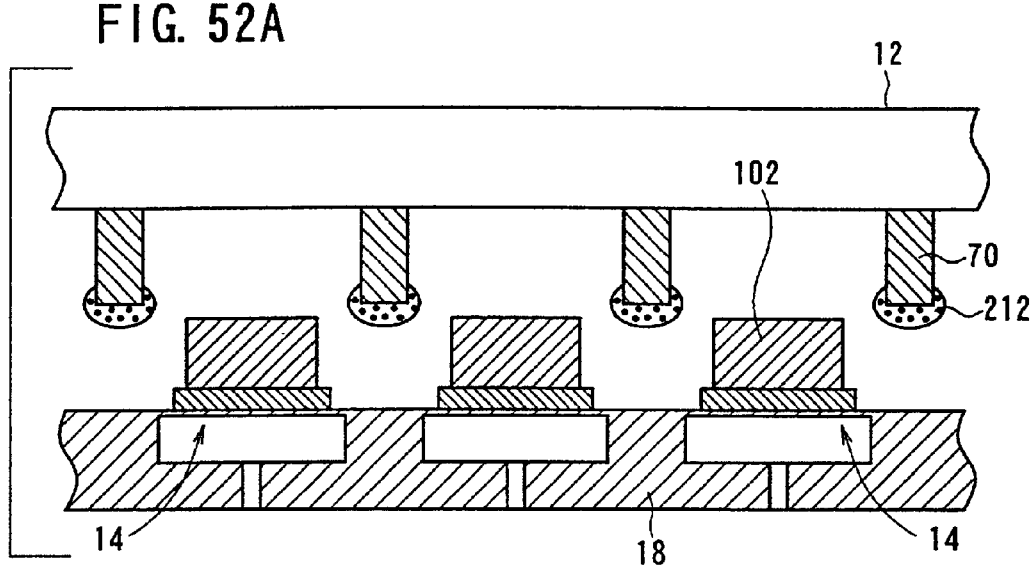
FIGS. 52A and 52B show production steps illustrating the eleventh production method (No. 2)

Subsequently, as shown in FIG. 51C, the jig 234 is removed, and then the crosspieces 70 are formed at the portions other than the portions corresponding to the large number of pixels, of the optical waveguide plate 12 as shown in FIG. 52A. After that, an adhesive 212 is applied, for example, by means of the film formation method to the lower surfaces of the crosspieces 70 on the plate member 70.

Figure 52B:
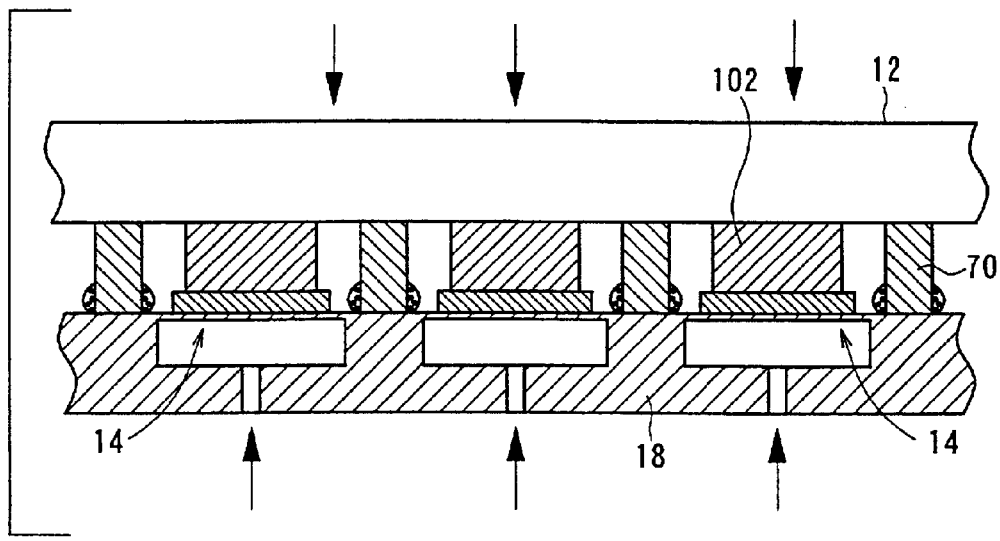

As shown in FIG. 52B, before the adhesive 212 is hardened, the surface of the actuator substrate 18 formed with the pixel structures 102 and the surface of the optical waveguide plate 12 formed with the crosspieces 70 are laminated with each other. The optical waveguide plate 12 and the actuator substrate 18 are pressurized in the directions to make approach to one another. After that, the adhesive 212 is hardened in this state to complete the device.

Also in the eleventh production method, for example, when the jig 234 is formed by using a member having rigidity such as metal, it is possible to reduce the waviness of the actuator substrate 18 formed with the pixel structures 102, by laminating and pressurizing the jig 234 and the actuator substrate 18. It is possible to carry out the lamination with the optical waveguide plate 12 highly accurately performed thereafter.

The gap-forming layer 50 may be provided on the optical waveguide plate 12. In this arrangement, the gap amount can be easily adjusted by controlling the difference between the height, of the crosspiece 70 and the height of the size-defining member 232.

Next, the twelfth production method will be explained with reference to FIGS. 53A to 54B. In the twelfth production method, the pixel structure 102 is formed on the actuator substrate 18, and the crosspiece 70 is formed on the jig 234 including, on the plate member 230, the large number of size-defining members 232. The actuator substrate 18 and the jig 234 are laminated and pressurized so that the size of the crosspiece 70 and the pixel structure 102 is defined. After that, the jig 234 is removed. The crosspiece 70 is transferred to the actuator substrate 18, and then the optical waveguide plate 12 is laminated.

Figure 53A:
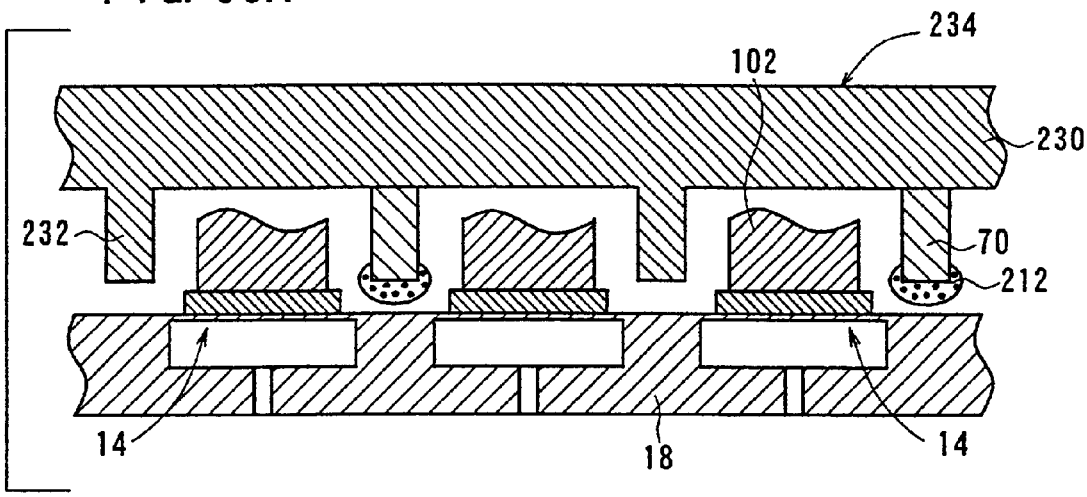
FIGS. 53A to 53C show production steps illustrating a twelfth production method (No. 1)

At first, as shown in FIG. 53A, the plurality of crosspieces 70 are formed at the portions formed with no size-defining member 232, of the surface of the jig 324 formed with the size-defining members 232, the portions being other than the portions corresponding to the large number of pixels. After that, an adhesive 212 is applied, for example, by means of the film formation method to the lower surfaces of the crosspieces 70 formed on the jig 234.

The pixel structures 102 are formed on the respective actuator elements 14 of the actuator substrate 18.

Figure 53B:
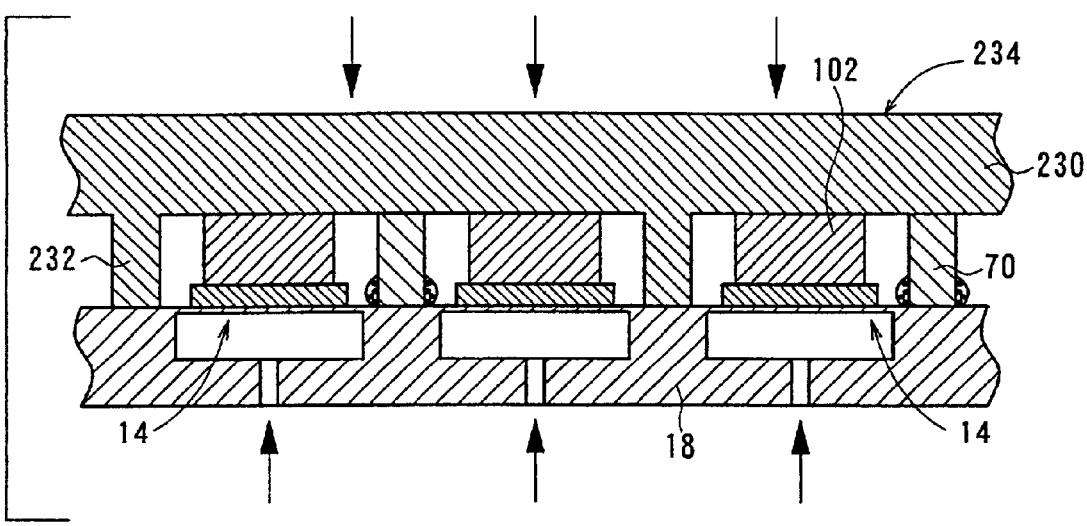

Subsequently, as shown in FIG. 53B, before the pixel structures 102 on the actuator substrate 18 are hardened, the surface of the actuator substrate 18 formed with the pixel structures 102 and the surface of the jig 234 formed with the crosspieces are laminated with each other. The jig 234 and the actuator substrate 18 are pressurized in the directions to make approach to one another, and then the pixel structures 102 are hardened in this state.

Figure 53C:
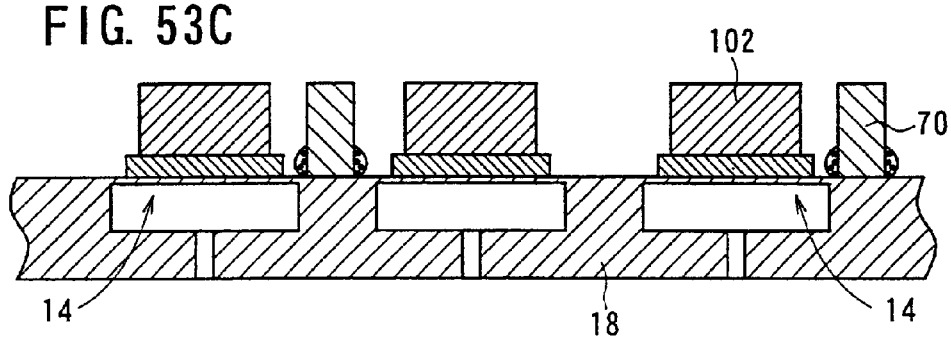
Figure 54A:
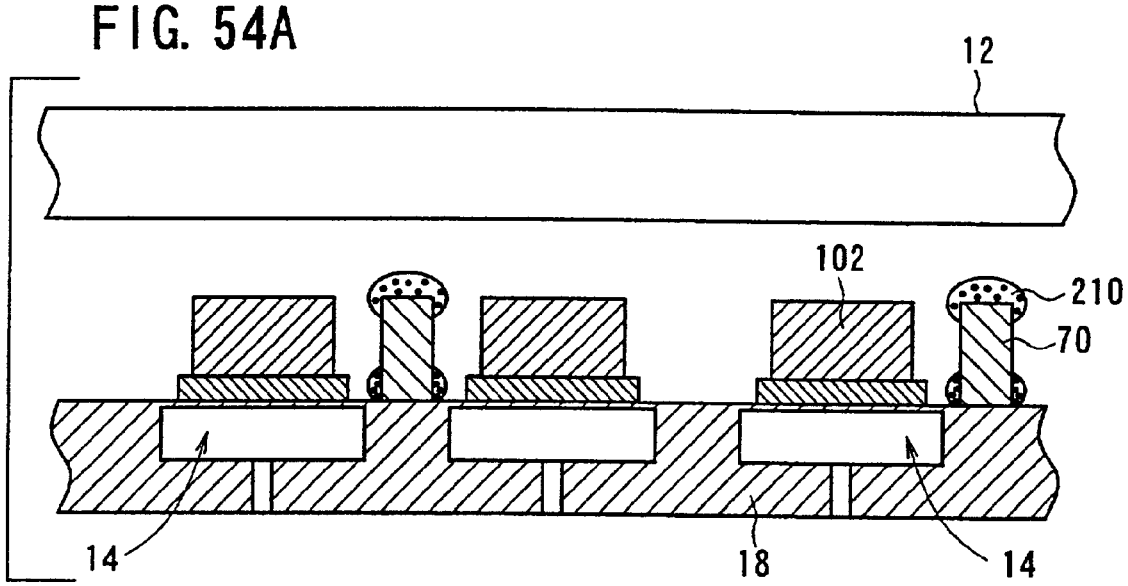
FIGS. 54A and 54B show production steps illustrating the twelfth production method (No. 2)

After that, as shown in FIG. 53C, the jig 234 is removed, and the crosspieces 70 are transferred to the actuator substrate. Subsequently, as shown in FIG. 54A, the adhesive 210 is applied, for example, by means of the film formation method to the upper surfaces of the crosspieces 70 on the actuator substrate 18.

Figure 54B:
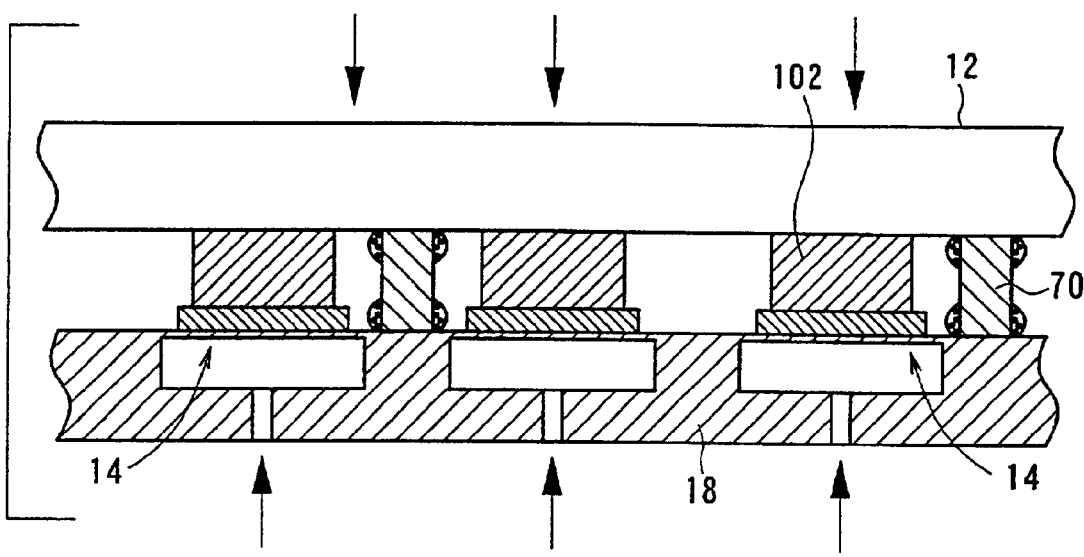

As shown in FIG. 54B, before the adhesive 210 is hardened, the optical waveguide plate 12 is pressed against the crosspieces 70 on the actuator substrate 18. The optical waveguide plate 12 and the actuator substrate 18 are pressurized in the directions to make approach to one another. After that, the adhesive 210 is hardened in this state to complete the device.

Also in this embodiment, for example, when the jig 234 is formed by using a member having rigidity such as metal, it is possible to reduce the waviness of the actuator substrate 18 formed with the pixel, structures 102, by laminating and pressurizing the jig 234 and the actuator substrate 18. It is possible to form the crosspiece 70 and the pixel structure 102 highly accurately.

Next, the thirteenth production method will be explained with reference to FIGS. 55A to 56B. In the thirteenth embodiment, the pixel structure 102 and the crosspiece 70 are formed on the actuator substrate 18. The actuator substrate 18 and the jig 234 provided with the large number of size-defining members 232 on the plate member 230 are laminated and pressurized. Thus, the size of the crosspiece 70 and the pixel structure 102 is defined. After that, the jig 234 is removed, and the optical waveguide plate 12 is laminated.

Figure 55A:
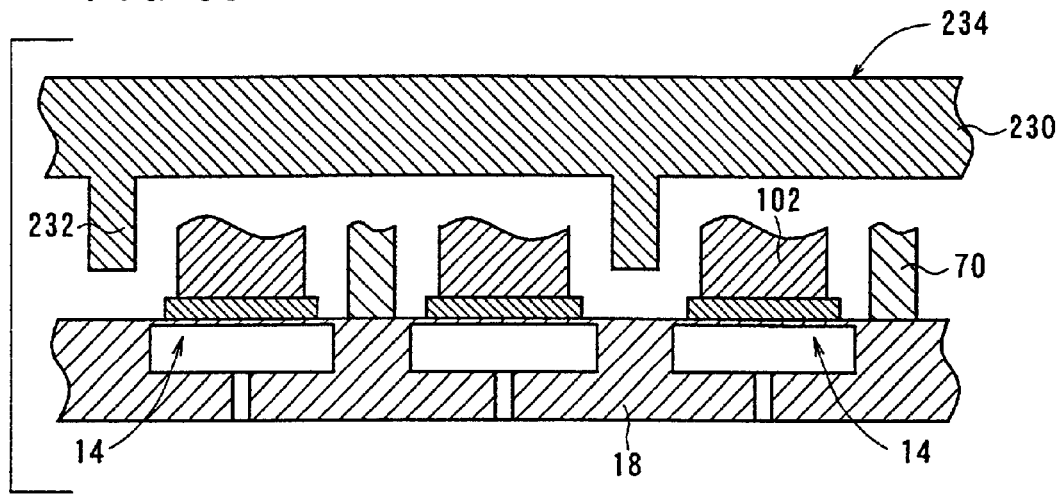
FIGS. 55A to 55C show production steps illustrating a thirteenth production method (No. 1)

At first, as shown in FIG. 55A, the crosspieces 70 are formed, for example, by means of the film formation method at the portions formed with no actuator element 14, of the first principal surface of the actuator substrate 18. The pixel structures 102 are formed, for example, by means of the film formation method on the respective actuator elements 14 of the actuator substrate 18.

Figure 55B:
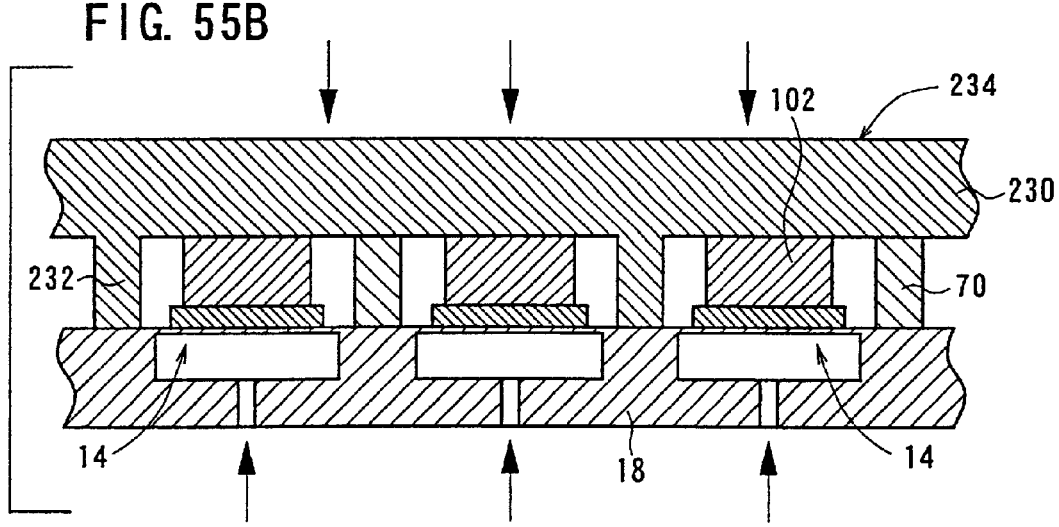

After that, as shown in FIG. 55B, before the crosspieces 70 and the pixel structures 102 on the actuator substrate 18 are hardened, the jig 234 is pressed against the crosspieces 70 and the pixel structures 102 on the actuator substrate 18. The jig and the actuator substrate 18 are pressurized in the directions to make approach to one another. After that, the crosspieces 70 and the pixel structures 102 are hardened in this state.

Figure 55C:
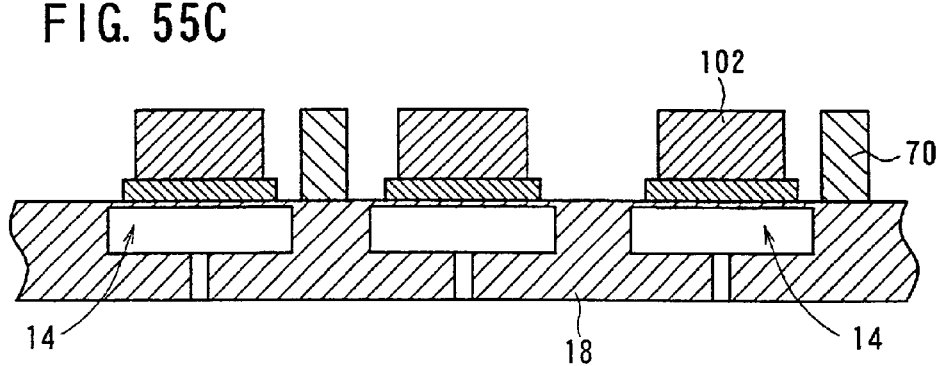
Figure 56A:
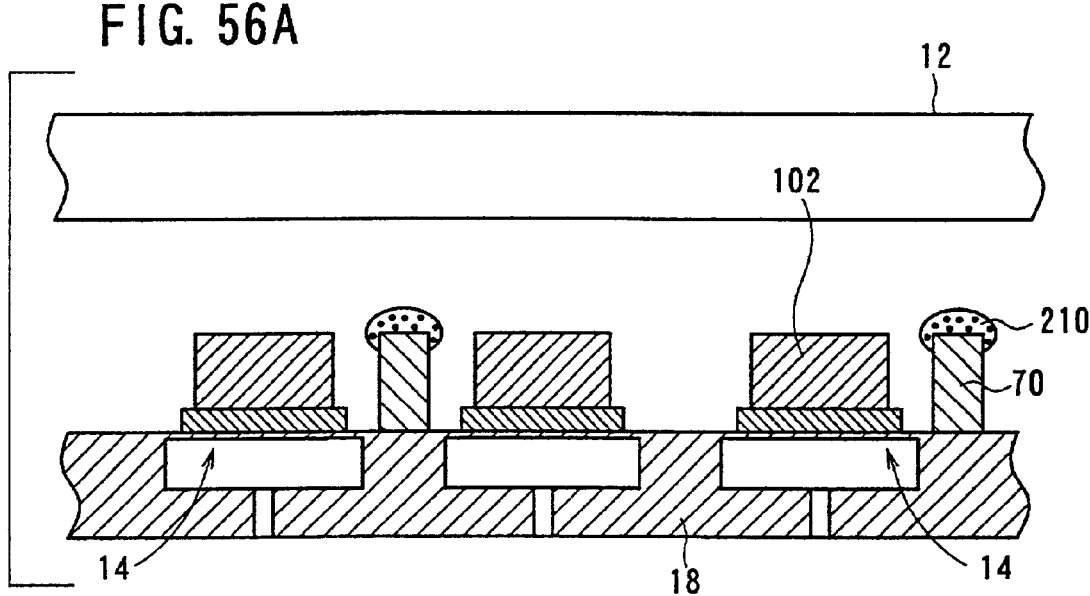
FIGS. 56A and 56B show production steps illustrating the thirteenth production method (No. 2)

Subsequently, as shown in FIG. 55C, the jig 234 is removed. After that, as shown in FIG. 56A, an adhesive 210 is applied, for example, by means of the film formation method to the upper surfaces of the crosspieces 70 on the actuator substrate 18.

Figure 56B:
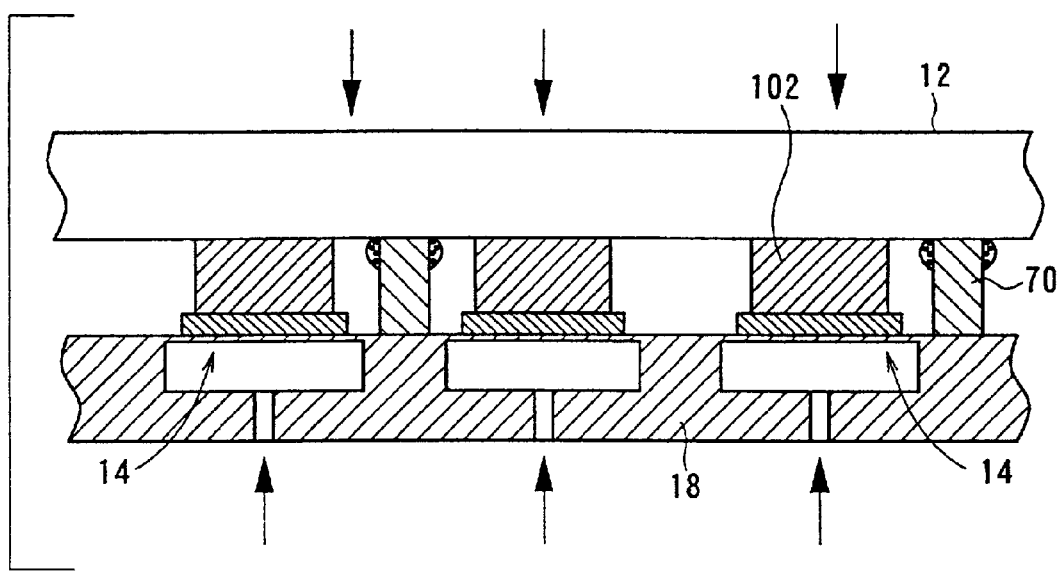

As shown in FIG. 56B, before the adhesive 210 is hardened, the optical waveguide plate 12 is pressed against the crosspieces 70 on the actuator substrate 18. The optical waveguide plate 12 and the actuator substrate 18 are pressurized in the directions to make approach to one another. After that, the adhesive 210 is hardened in this state to complete the device.

Also in this embodiment, for example, when the jig 234 is formed by using a member having rigidity such as metal, it is possible to reduce the waviness of the actuator substrate 18 formed with the pixel structures 102 and the crosspieces 70, by laminating and pressurizing the jig 234 and the actuator substrate 18. It is possible to form the crosspiece 70 and the pixel structure 102 highly accurately.

Next, the fourteenth production method will be explained with reference to FIGS. 57A to 58B. In the fourteenth production method, the crosspieces 70 are formed on the actuator substrate 18. The pixel structures 102 are formed on the jig including, on the plate member 230, the large number of size-defining members 232. The actuator substrate 18 and the jig 234 are laminated and pressurized. Thus, the size of, the crosspiece 70 and the pixel structure 102 is defined. After that, the jig 234 is removed, and the pixel structure 102 are transferred to the actuator substrate 18. Subsequently, the optical waveguide plate 12 is laminated.

Figure 57A:
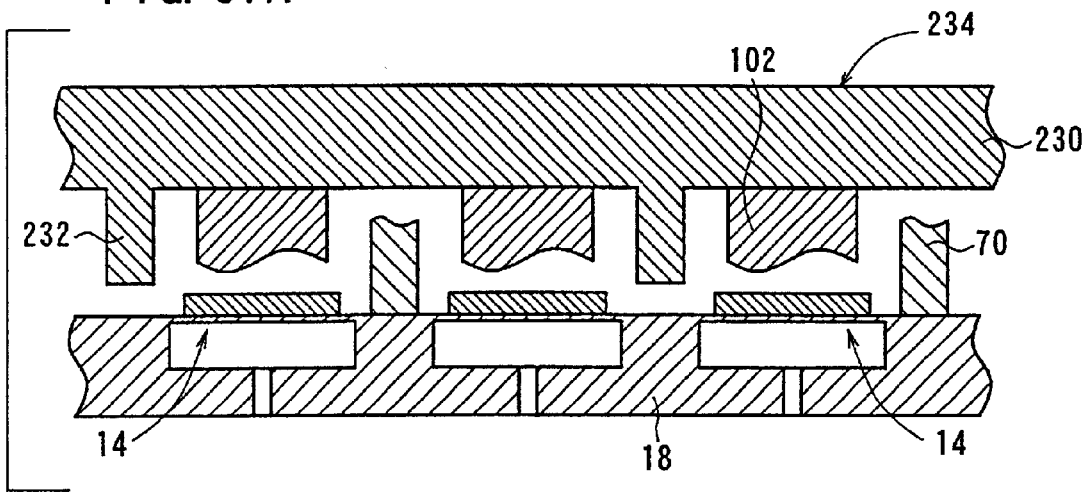
FIGS. 57A to 57C show production steps illustrating a fourteenth production method (No. 1)

At first, as shown in FIG. 57A, the pixel structures 102 are formed at the portions corresponding to the large number of pixels, the portions being formed with no size-defining member 232, of the surface of the jig 234 formed with the size-defining members 232. The plurality of crosspieces 70 are formed at the portions other than the actuator elements 14 of the actuator substrate 18.

Figure 57B:
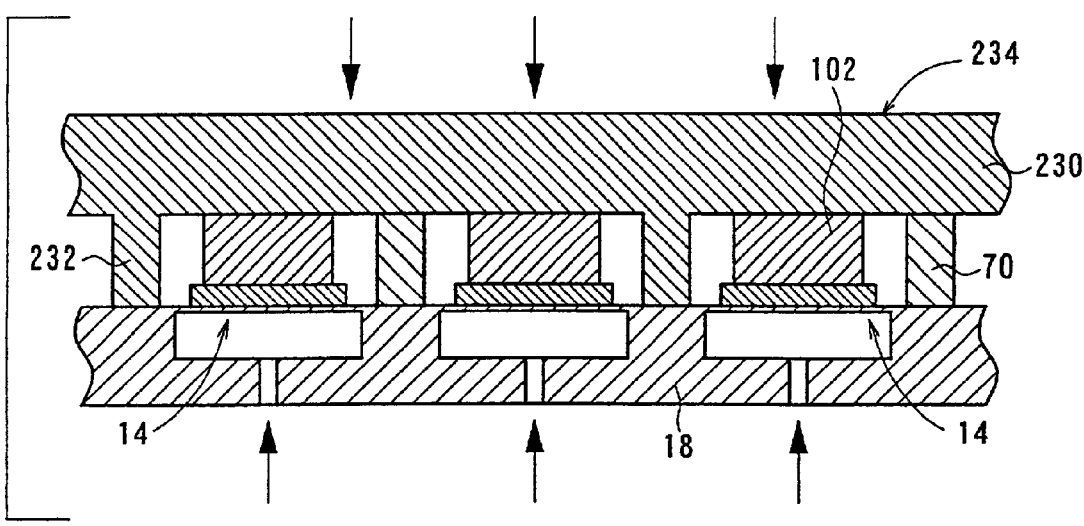

After that, as shown in FIG. 57B, before the crosspieces 70 formed on the actuator substrate 18 and the pixel structures 102 formed on the jig 234 are hardened, the surface of the jig 234 formed with the pixel structures 102 and the surface of the actuator substrate 18 formed with the crosspieces 70 are laminated with each other. The jig 234 and the actuator substrate 18 are pressurized in the directions to make approach to one another. Subsequently, the crosspieces 70 and the pixel structures 102 are hardened in this state.

Figure 57C:
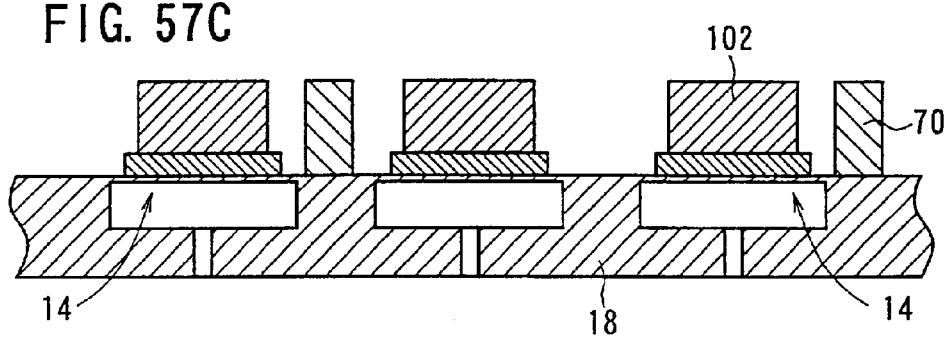
Figure 58A:
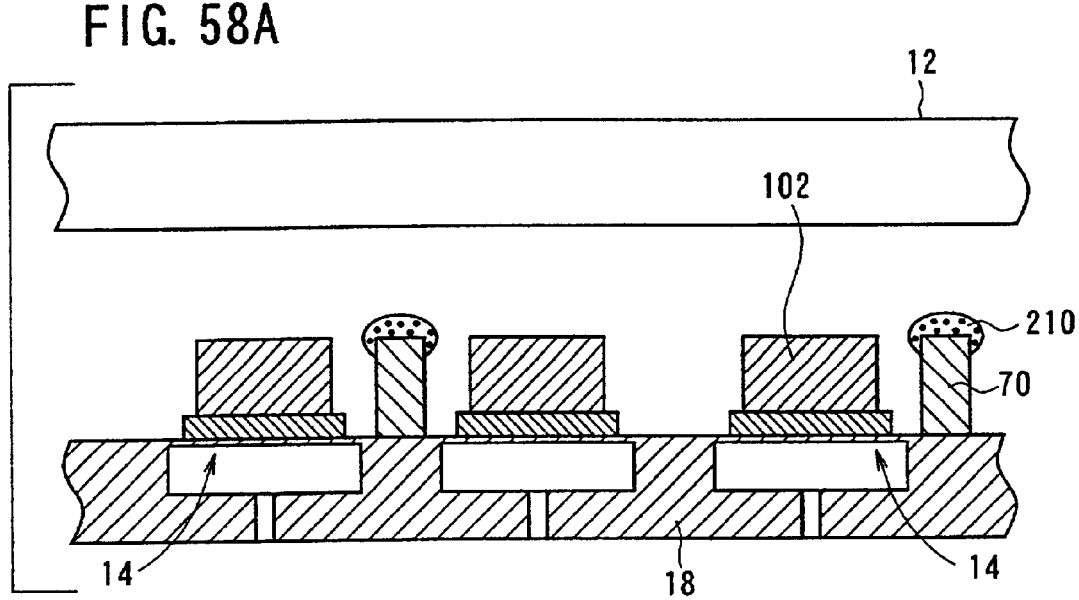
FIGS. 58A and 58B show production steps illustrating the fourteenth production method (No. 2)

After that, as shown in FIG. 57C, the jig 234 is removed, and the pixel structures 102 are transferred to the actuator substrate 18. Subsequently, as shown in FIG. 58A, an adhesive 210 is applied, for example, by means of the film formation method to the upper surfaces of the crosspieces 70 on the actuator substrate 18.

Figure 58B:
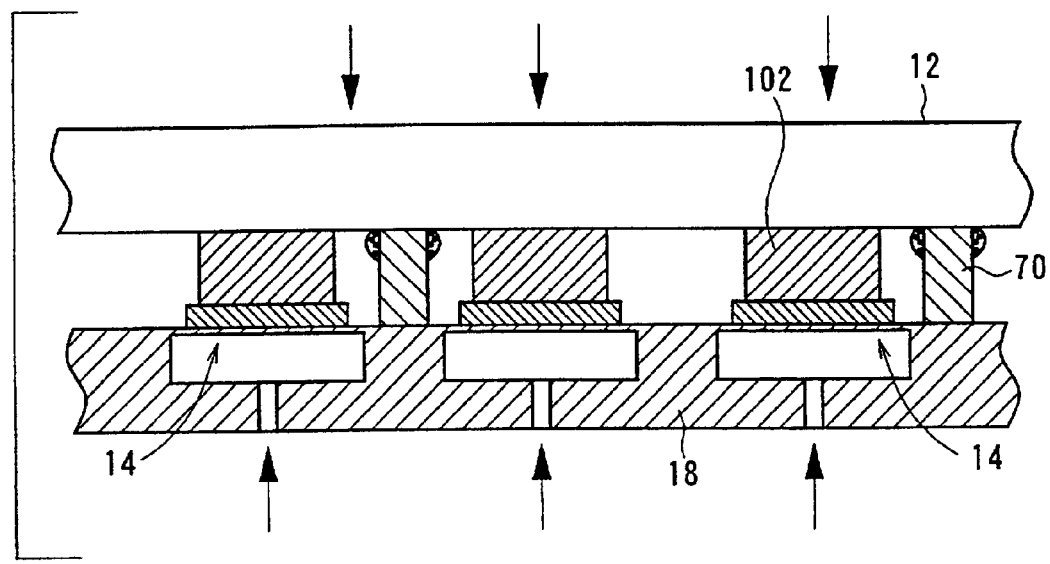

As shown in FIG. 58B, before the adhesive 210 is hardened, the optical waveguide plate 12 is pressed against the crosspieces 70 on the actuator substrate 18. The optical waveguide plate 12 and the actuator substrate 18 are pressurized in the directions to make approach to one another. After that, the adhesive 210 is hardened in this state to complete the device.

Also in this embodiment, for example, when the jig 234 is formed by using a member having rigidity such as metal, it is possible to reduce the waviness of the actuator substrate 18 formed with the pixel structures 102, by laminating and pressurizing the jig 234 and the actuator substrate 18. It is possible to form the crosspiece 70 and the pixel structure 102 highly accurately.

Next, the fifteenth production method will be explained with reference to FIGS. 59A to 60B. In the fifteenth production method, the crosspieces 70 and the pixel structures 102 are formed on the jig 234 including, on the plate member 230, the large number of size-defining members 232. The jig 234 and the actuator substrate 18 are laminated and pressurized with each other. Thus, the size of the crosspiece 70 and the pixel structure 102 is defined. After that, the jig 234 is removed, and the crosspieces 70 and the pixel structures 102 are transferred to the actuator substrate 18. Subsequently, the optical waveguide plate 12 is laminated.

Figure 59A:
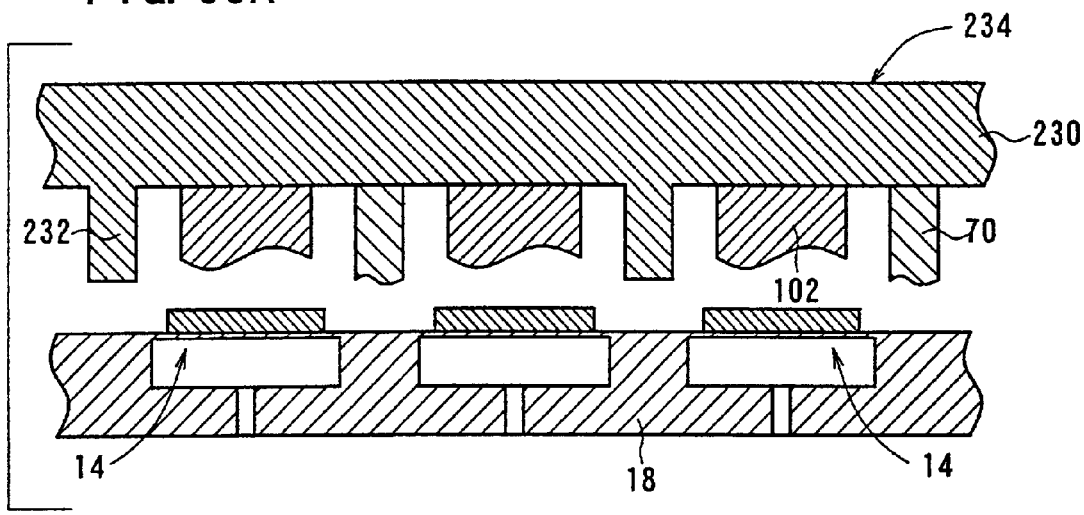
FIGS. 59A to 59C show production steps illustrating a fifteenth production method (No. 1)

At first, as shown in FIG. 59A, the plurality of crosspieces 70 are formed at the portions formed with no size-defining member 232 of the surface the jig 234 formed with the size-defining members 232, the portions being other than the portions corresponding to the large number of pixels. The pixel structures 102 are formed at the portions formed with no size-defining member 232, of the surface of the jig 234 formed with the size-defining members 232, the portions corresponding to the large number of pixels.

Figure 59B:
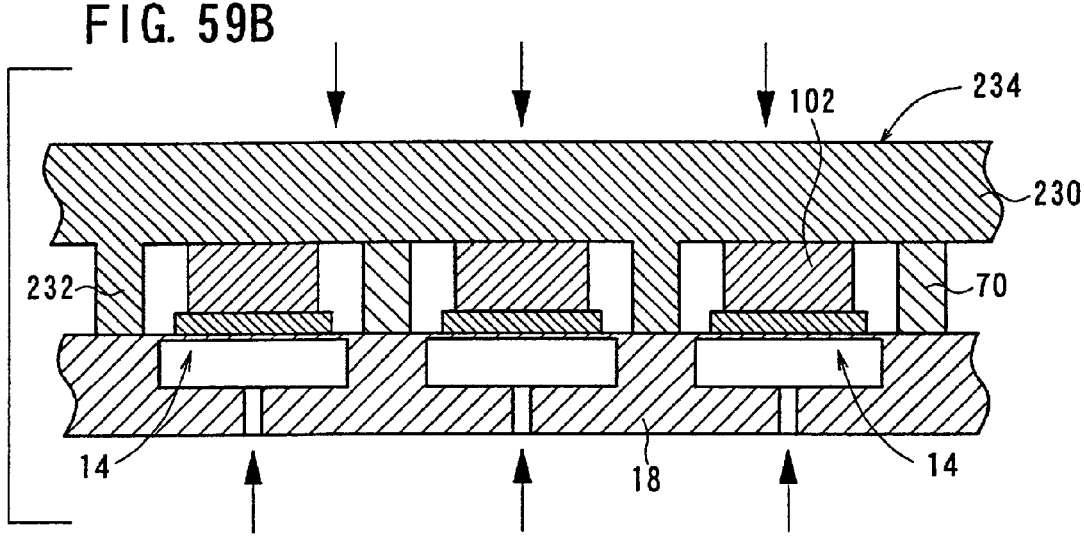

After that, as shown in FIG. 59B, before the crosspieces 70 and the pixel structures 102 formed on the jig 234 are hardened, the jig 234 and the actuator substrate 18 are laminated with each other. The jig 234 and the actuator substrate 18 are pressurized in the directions to make approach to one another. After that, the crosspieces 70 and the pixel structures 102 are hardened in this state.

Figure 59C:
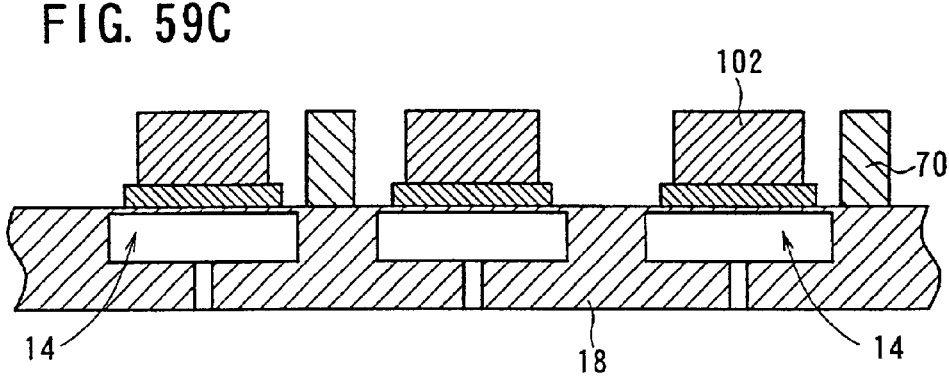
Figure 60A:
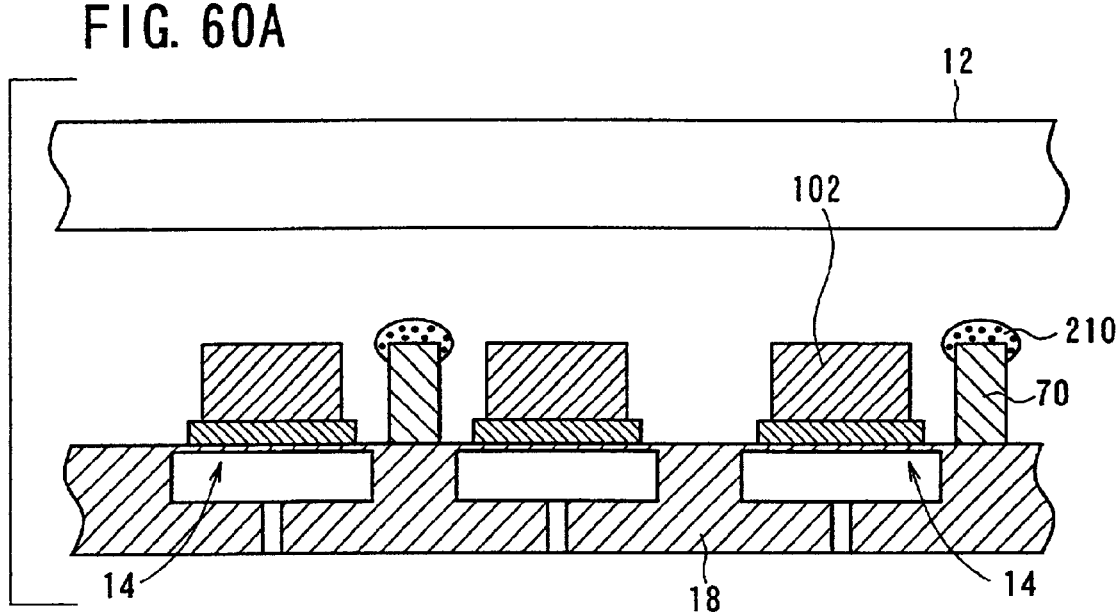
FIGS. 60A and 60B show production steps illustrating the fifteenth production method (No. 2)

Subsequently, as shown in FIG. 59C, the jig 234 is removed, and the crosspieces and the pixel structures 102 are transferred to the actuator substrate 18. After that, as shown in FIG. 60A, an adhesive 210 is applied, for example, by means of the film formation method to the upper surfaces of the actuator substrate 18.

Figure 60B:
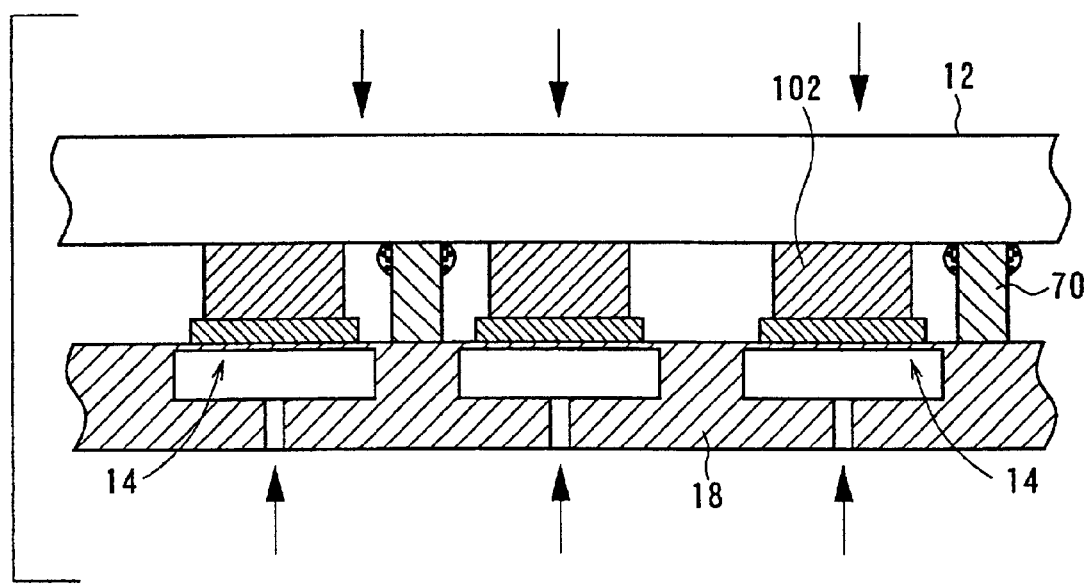

As shown in FIG. 60B, before the adhesive 210 is hardened, the optical waveguide plate 12 is pressed against the crosspieces 70 on the actuator substrate 18. The optical waveguide plate 12, and the actuator substrate 18 are pressurized in the directions to make approach to one another. After that, the adhesive 210 is hardened in this state to complete the device.

Also in this embodiment, for example, when the jig 234 is formed by using a member having rigidity such as metal, it is possible to reduce the waviness of the actuator substrate 18 by laminating and pressurizing the jig 234 and the actuator substrate 18. It is possible to transfer and form the crosspiece 70 and the pixel structure 102 highly accurately on the actuator substrate 18.

Next, the sixteenth production method will be explained with reference to FIGS. 61A to 62B. In the sixteenth production method, the pixel structures 102 are formed on the actuator substrate 18 which includes the crosspieces 70 in the integrated manner. After that, the plate member 200 is laminated on the actuator substrate 18. Subsequently, the plate member 200 is removed, and the optical waveguide plate 12 is laminated.

Figure 61A:
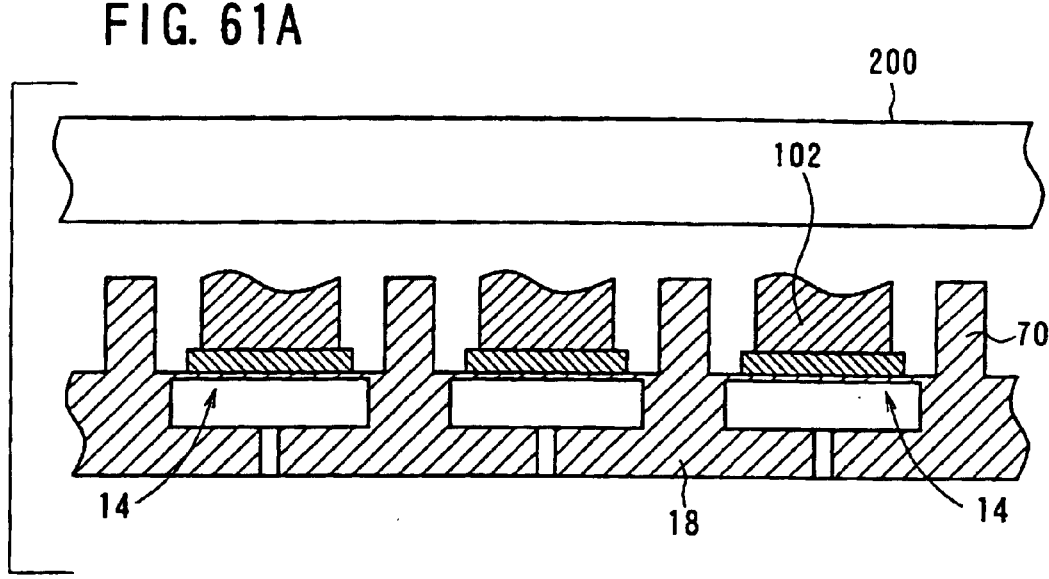
FIGS. 61A to a 61B show production steps illustrating a sixteenth production method (No. 1)

At first, as shown in FIG. 61A, the pixel structures 102 are formed on the respective actuator elements 14 of the actuator substrate 18 which integrally includes the plurality of crosspieces 70 at the portions other than the actuator elements 14.

Figure 61B:
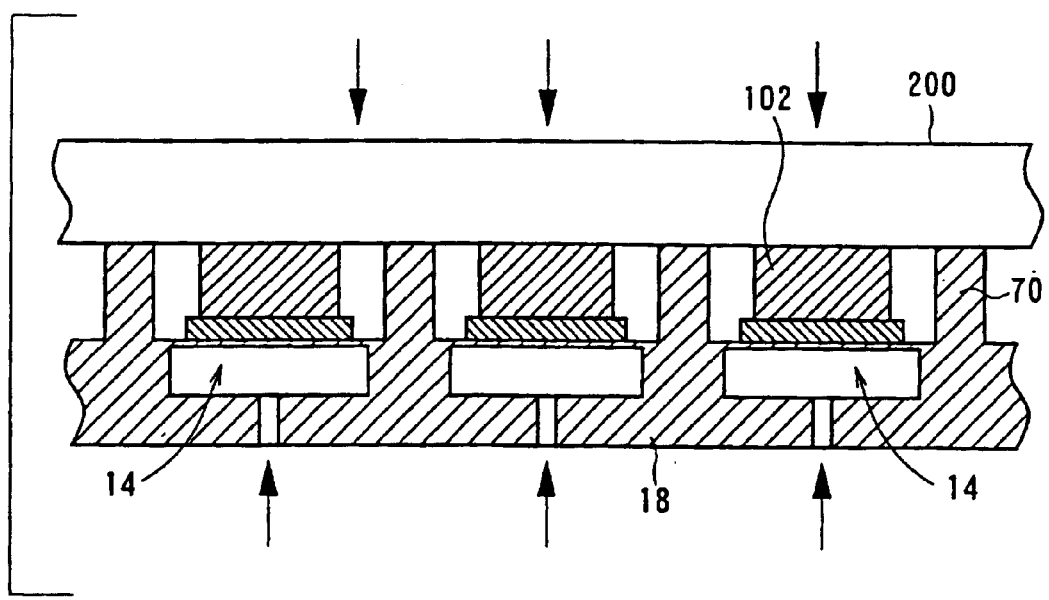

After that, as shown in FIG. 61B, before the pixel structures 102 on the actuator substrate 18 are hardened, the plate member 200 is pressed against the crosspieces 70 and the pixel structures 102 on the actuator substrate 18. The plate member 200 and the actuator substrate 18 are pressurized in the directions to make approach to one another. After that, the pixel structures 102 are hardened in this state.

Figure 62A:
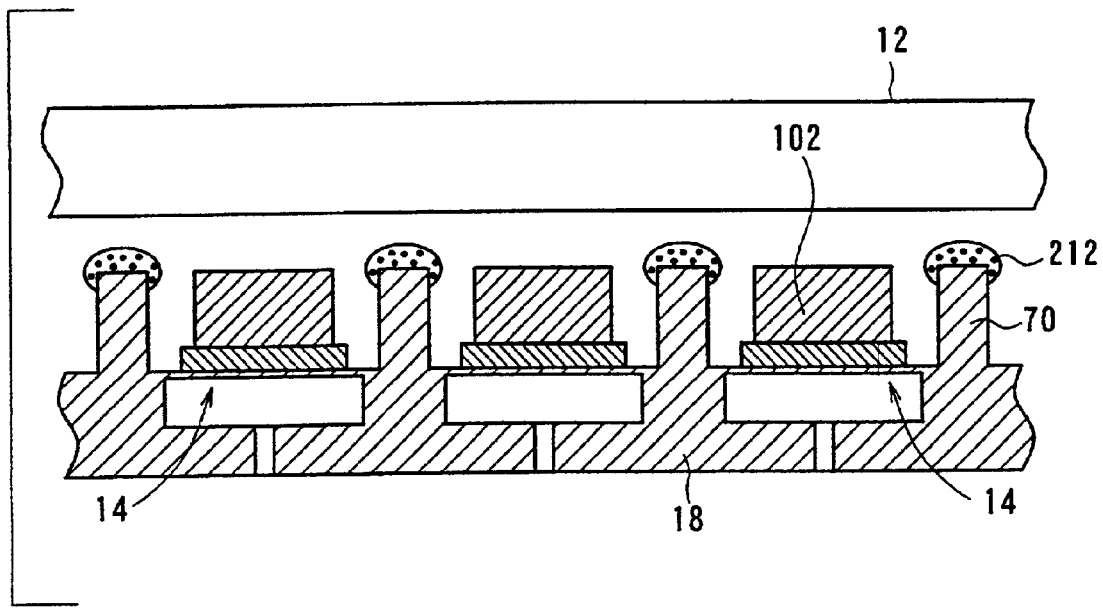
FIGS. 62A and 62B show production steps illustrating the sixteenth production method (No. 2)

Subsequently, as shown in FIG. 62A, after the plate member 200 is removed, an adhesive 210 is applied, for example, by means of the film formation method to the upper surfaces of the crosspieces 70 on the actuator substrate 18.

Figure 62B:
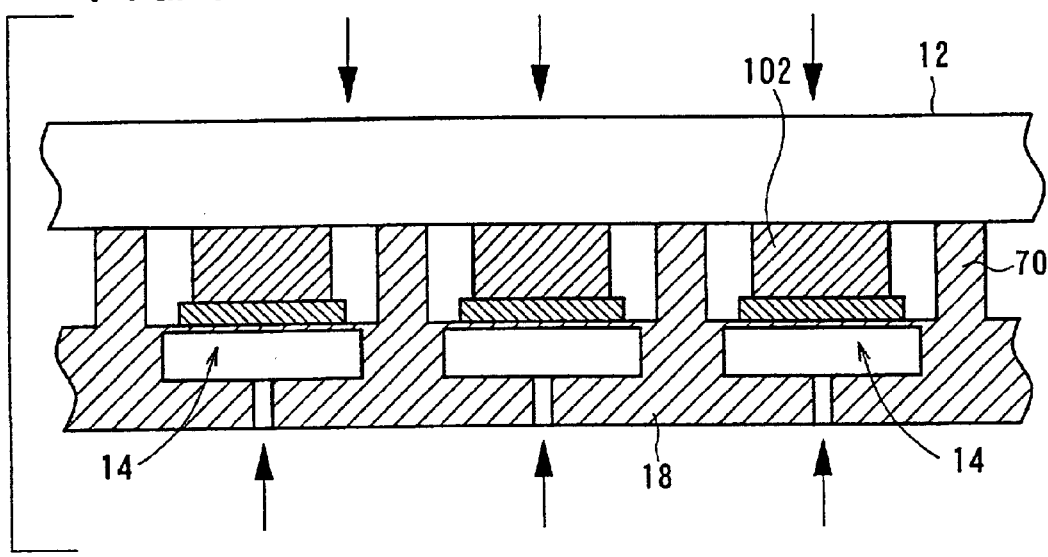
Figure 63:
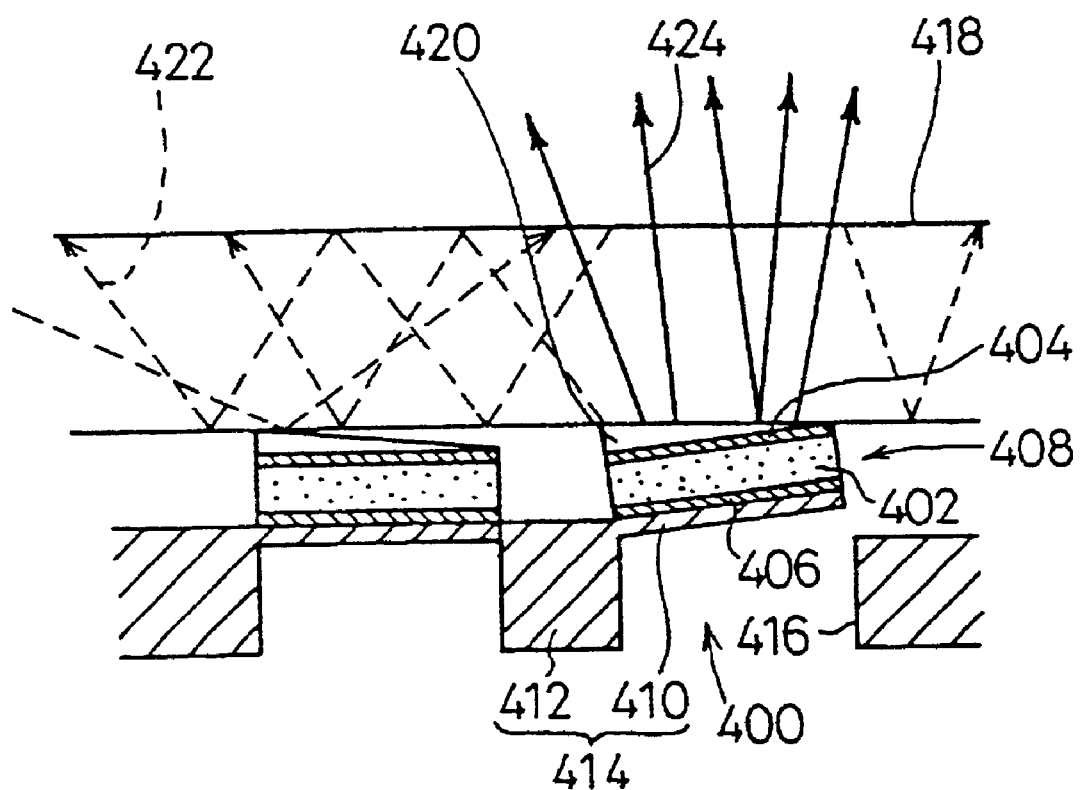
FIG. 63 shows an arrangement of the display device concerning the illustrative example suggested by the present applicant.

As shown in FIG. 62B, before the adhesive is hardened, the optical waveguide plate 12 is pressed against the crosspieces 70 on the actuator substrate 18. The optical waveguide plate 12 and the actuator substrate 18 are pressurized in the directions to make approach to one another. After that, the adhesive 210 is hardened in this state to complete the device.

In this embodiment, the actuator substrate 18, which previously has the crosspieces 70 in the integrated manner, is used as the actuator substrate 18. Therefore, for example, when the actuator substrate 18 is carried or stored, the crosspieces 70 can be used to protect the actuator elements 14 formed on the actuator substrate 18. Further, the step of hardening the crosspiece 70 can be omitted, as compared with the case in which the crosspiece 70 is separately formed. Accordingly, it is possible to reduce the number of production steps.

In the respective embodiments described above, it is also possible that the crosspiece 70 has the multiple layered structure. In this arrangement, the crosspiece 70 having the multiple layered structure can be formed by using the film formation method. In addition thereto, for example, the crosspiece having the multiple layered structure can be also formed in accordance with a method in which, for example, the ceramic sintering method and the film formation method are combined with each other. The crosspiece 70 having the multiple layered structure is advantageous to adjust the amount of gap.

Further, for example, when the adhesive is applied onto the crosspiece 70, for example, an adhesive having light-absorbing property is used. By doing so, the adhesive may be allowed to play the role of the gap-forming layer 50. When the adhesive is applied onto the pixel structure 102 or the actuator element 14, for example, an adhesive having light-reflective property is used. By doing so, the adhesive may be allowed to function as a part of the pixel structure 102.

It is a matter of course that the display device and the method for producing the same according to the present invention are not limited to the embodiments described above, which may be embodied in other various forms without deviating from the gist or essential characteristic of the present invention.

INDUSTRIAL APPLICABILITY

As explained above, according to the display device and the method for producing the same concerning the present invention, it is possible to obtain the following effects.

(1) The clearance (gap) between the optical waveguide plate and the pixel structure can be easily formed, and it can be formed uniformly for all of the pixels.

(2) The size of the gap can be easily controlled.

(3) The adhesion of the pixel structure to the optical waveguide plate can be avoided, and it is possible to effectively realize the high response speed.

(4) The contact surface of the pixel structure (contact surface with respect to the optical waveguide plate) can be formed to be smooth so that the light is efficiently introduced into the pixel structure when the predetermined pixel structure contacts with the optical waveguide plate.

(5) It is possible to ensure the response speed of the pixel.

(6) it is possible to obtain the uniform brightness for all of the pixels.

(7) it is possible to improve the brightness of the pixel.

What is claimed is:

1. A display device comprising:
   an optical waveguide plate for introducing light thereinto;
   an actuator substitute provided opposingly to one plate surface of said optical waveguide plate, said actuator substrate comprising a plurality of discrete actuator elements fixed thereto, said actuator elements corresponding to a large number of pixels;
   a pixel structure formed on each of said actuator elements of said actuator substrate; and
   a crosspiece formed at a portion other than said pixel structure between said optical waveguide plate and said actuator substrate.

2. The display device according to claim 1, wherein said actuator element includes a shape-retaining layer, an operating section having at least a pair of electrodes formed on said shape-retaining layer, a vibrating section for supporting said operating section, and a fixed section for supporting said vibrating section in a vibrating manner.

3. The display device according to claim 1, wherein said crosspiece is secured to said optical waveguide plate.

4. The display device according to claim 1, wherein a gap-forming layer is provided between said optical waveguide plate and said crosspiece.

5. The display device according to claim 1, wherein said crosspiece is formed at portions around four corners of each said pixel structure.

6. The display device according to claim 1, wherein said crosspiece has a window for surrounding at least one pixel structure.

7. The display device according to claim 1, wherein said crosspiece includes a stripe-shaped opening which extends along a direction of an array of said pixel structures and which surrounds said array of said pixel structures.

8. The display device according to claim 1, wherein said crosspiece is formed to have a line-shaped configuration which extends along a direction of an array of said pixel structures.

9. The display device according to claim 1, wherein said crosspiece is farmed integrally with said actuator substrate.

10. The display device according to claim 1, wherein said crosspiece is constructed by a wire member which extends along a direction of an array of said pixel structures.

11. The display device according to claim 1, wherein a recess is formed on a surface of said pixel structure.

12. The display device according to claim 1, wherein a step is formed on a surface of said pixel structure.

13. The display device according to claim 1, wherein a surface of said pixel structure has a concave configuration.

14. A method for producing a display device, comprising:
a crosspiece-forming step of forming a plurality of crosspieces at portions other than actuator elements, of an actuator substrate arranged with said actuator elements corresponding to a large number of pixels;
a pixel-forming step of forming pixel structures on said respective actuator elements on said actuator substrate; and
a pressurizing step of laminating and pressurizing an optical waveguide plate in a state in which at least said pixel structure are not hardened, and then hardening at least said pixel structures.

15. A method for producing a display device, comprising:
a crosspiece-forming step of forming a plurality of crosspieces at portions other than portions corresponding to a large number of actuator elements, of an optical waveguide plate;
a pixel-forming step of fanning pixel structures at portions corresponding to a large number of pixels, of said optical waveguide plate; and
a pressurizing step of laminating an actuator substrate arranged with actuator elements of a number corresponding to said large number of pixels, on said crosspieces and said pixel structures, and pressurizing said optical waveguide plate and said actuator substrate directions to make approach to one another.

16. A method for producing a display device, comprising:
a crosspiece-forming step of forming a plurality of crosspieces at portions other than actuator elements, of an actuator substrate arranged with said actuator elements corresponding to a large number of pixels;
a pixel-forming step of forming pixel structures at portions corresponding to said large number of pixels, of an optical waveguide plate; and
a pressurizing step of laminating a surface of said actuator substrate formed with said crosspieces and a sure of said optical waveguide plate formed with said pixel structures with each other, and pressuring said optical waveguide plate and said actuator substrate in directions to make approach to one another.

17. A method for producing a display device, comprising:
a crosspiece-forming step of forming a plurality of crosspieces at portions other than portions corresponding to a large number of actuator elements, of an optical waveguide plate;
a pixel-forming step of forming pixel structures on respective actuator elements of an actuator substrate arranged with said actuator elements of a number corresponding to said large number of pixels; and
a pressurizing step of laminating a surface of said actuator substrate formed with said pixel structures and a surface of said optical waveguide plate formed with said crosspieces with each other, and pressurizing said optical waveguide plate and said actuator substrate in directions to make approach to one another.

18. A method for producing a display device, comprising:
a pixel-forming step of forming pixel structure on respective actuator elements of an actuator substrate arranged with said actuator elements of a number corresponding to a large number of pixels and integrally having a plurality of crosspieces at portions other than said actuator elements; and
a pressurizing step of laminating and pressurizing an optical waveguide plate in a state in which at least said pixel structures are not hardened, and then hardening at least said pixel structures.

19. A method for producing a display device, comprising:
a crosspiece-forming step of forming a plurality of crosspieces at portions other than actuator elements, of an actuator substrate arranged with said actuator elements of a number corresponding to a large number of pixels;
a pixel-forming step of forming pixel structures on said respective actuator elements of said actuator substrate;
a first laminating step of laminating a plate member in a state in which at least said pixel structures are not hardened;
a pressurizing step of pressurizing said actuator substrate and said plate member in directions to make approach to one another, and then hardening at least said pixel structures; and
a second laminating step of removing said plate member, and then laminating an optical waveguide plate at least on said crosspieces.

20. A method for producing a display device, comprising:
a crosspiece-forming step of forming a plurality of crosspieces at portions other than portions corresponding to a large number of pixels, of a plate member;
a pixel-forming step of forming pixel structures at said portions corresponding to said large number of pixels, of said plate member;
a first laminating step of laminating an actuator substrate arranged with actuator elements of a number corresponding to said large number of pixels on said crosspieces and said pixel structures;
a pressurizing step of pressurizing said plate member and said actuator substrate in directions to make approach to one another; and
a second laminating step of removing said plate member to transfer said crosspieces and said pixel structures to said actuator substrate, and then laminating an optical waveguide plate on at least said crosspieces.

21. A method for producing a display device, comprising:
a crosspiece-forming step of forming a plurality of crosspieces at portions other than actuator elements, of an actuator substrate arranged with said elements of a number corresponding to a large number of pixels;
a pixel-forming step of forming pixel structures at portions corresponding to said large number of pixels, of a plate member;
a first laminating step of laminating a surface of said actuator substrate formed with said crosspieces and surface of said plate member formed with said pixel structures with each other;
a pressurizing step of pressurizing said plate member and said actuator substrate in directions to make approach to one another; and
a second laminating step of removing said plate member to transfer said pixel structures to said actuator substrate, and then laminating an optical waveguide plate on at least said crosspieces.

22. A method for producing a display device, comprising:
a pixel-forming step of forming pixel structures on respective actuator elements of an actuator substrate arranged with said actuator elements of a number corresponding to a large number of pixels;
a crosspiece-forming step of forming a plurality of crosspieces at portions other than portions corresponding to said large number of pixels, of a plate member;

a first laminating step of laminating a surface of said actuator substrate formed with said pixel structures and a surface of said plate member formed with said crosspieces with each other;

a pressurizing step of pressurizing said plate member and said actuator substrate in directions to make approach to one another; and a second laminating step of removing said plate member to transfer said crosspieces to said actuator substrate, and then laminating an optical waveguide plate on at least said crosspieces.

23. A method for producing a display device, comprising:

a pixel-forming step of forming pixel structures on respective actuator elements of an actuator substrate arranged with said actuator elements of a number corresponding to a large number of pixels and integrally having a plurality of crosspieces at portions other than said actuator element;

a first laminating step of laminating a plate member in a state in which at least said pixel structures are not hardened;

a pressing step of pressurizing said actuator substrate and said plate member in directions to make approach to one another, and then hardening at least said pixel structures; and a second laminating step of removing said plate member, and then laminating an optical waveguide plate on at least said crosspieces.

24. A method for producing a display device, comprising:

a pixel-forming step of forming pixel structures on respective actuator elements of an actuator substrate arranged with said actuator elements of a number corresponding to a large number of pixels;

a first laminating step of using a jig including, on one surface of a plate member, a large number of size defining members formed to have substantially the same height as that of crosspieces to be formed on said actuator substrate to laminate a surface of said jig formed with said size-defining members and a surface of said actuator substrate formed with said pixel structures with each other;

a pressurizing step of pressurizing said jig and said actuator substrate in directions to make approach to one another;

a crosspiece-forming step of removing said jig, and then forming said plurality of crosspieces at portions other than said actuator sections, of said actuator substrate; and a second laminating step of laminating an optical waveguide plate on at least said crosspieces on said actuator substrate.

25. A method for producing a display device, comprising:

a pixel-forming step of forming pixel structures on respective actuator elements of an actuator substrate arranged with said actuator elements of a number corresponding to a large number of pixels;

a first laminating step of using a jig including, on one surface of a plate member, a large number of size-defining members formed to have substantially the same height as that of crosspieces to be formed on said actuator substrate to laminate a surface of said jig formed with said size-defining members and a surface of said actuator substrate formed with said pixel structures with each other;

a pressurizing step of pressurizing said jig and said actuator substrate in directions to make approach to one another;

a crosspiece-forming step of removing said jig, and then forming said plurality of crosspieces at portions other than portions corresponding to said large number of pixels, of an optical waveguide plate; and a second laminating step of laminating a surface of said actuator substrate formed with said pixel structures and a surface of said optical waveguide plate formed with said crosspieces with each other.

26. A method for producing a display device, comprising:

a pixel-forming step of forming pixel structures on respective actuator elements of an actuator substrate arranged with said actuator elements of a number corresponding to a large number of pixels;

a crosspiece-forming step of using a jig including, on one surface of a plate member, a large number of size-defining members formed to have substantially the same height as that of crosspieces to be formed on said actuator substrate to form said plurality of crosspieces at portions formed with no size-defining member, of a surface of said jig formed with said size-defining members, said portions being other than portions corresponding to said large number of pixels; a first laminating step of laminating said surface of said jig formed with said size-defining members and said crosspieces and a surface of said actuator substrate formed with said pixel structures with each other;

a pressurizing step of pressurizing said jig and said actuator substrate in directions to make approach to one another; and a second laminating step of removing said jig to transfer said crosspieces to said actuator substrate, and then laminating an optical waveguide plate on at least said crosspieces on said actuator substrate.

27. A method for producing a display device, comprising:

a crosspiece-forming step of forming a plurality of crosspieces at portions other than actuator elements, of an actuator substrate arranged with said actuator elements of a number corresponding to a large number of pixels;

a pixel-forming step of forming pixel structures on said respective actuator element of said actuator substrate;

a first laminating step of a jig including, on one surface of a plate member, a large number of size-defining members formed to have substantially the same height as that of said crosspieces to be formed on said actuator substrate to laminate a surface of said jig formed with said size-defining members and a surface of said actuator substrate formed with said crosspieces and said pixel structures with each other;

a pressurizing step of pressurizing said jig and said actuator substrate in directions to make approach to one another; and a second laminating step of removing said jig, and then laminating an optical waveguide plate on at least said crosspieces on said actuator substrate.

28. A method for producing a display device, comprising:

a crosspiece-forming step of forming a plurality of crosspieces at portions other than actuator elements, of an actuator substrate arranged with said actuator elements of a number corresponding to a large number of pixels;

a pixel-forming step of using a jig including, on one surface of a plate member, a large number of size-defining members formed to have substantially the same height as that of said crosspieces to be formed on said actuator substrate to form pixel structures at portions corresponding to said large number of pixels, said portions being formed with no size-defining member, of a surface of said jig formed with said size-defining members;

a first laminating step of laminating said surface of said jig formed with said size-defining members and said pixel structures and a surface of said actuator substrate formed with said crosspieces with each other;

a pressurizing step of pressurizing said jig and said actuator substrate in directions to make approach to one another; and a second laminating step of removing said jig to transfer said pixel structures to said actuator substrate, and then laminating an optical waveguide plate on at least said crosspieces on said actuator substrate.

29. A method for producing a display device, comprising:

a crosspiece-forming step of using a jig including, on one surface of a plate member, a large number of size-defining members formed to have substantially the same height as that of crosspieces to be formed on an actuator substrate to form said plurality of crosspieces at portions formed with no size-defining member, of a surface of said jig formed with said size-defining members, said portions being other than portions corresponding to a large number of pixels;

a pixel-forming step of forming pixel structures at portions corresponding to said large number of pixels, said portions being formed with no size-defining member, of said surface of said jig formed with said size-defining members;

a first laminating step of laminating said actuator substrate arranged with actuator elements of a number corresponding to said large number of pixels on said crosspieces and said pixel structures on said jig;

a pressurizing stop of pressurizing said jig and said actuator substrate in directions to make approach to one another; and a second laminating step of removing said jig to transfer said crosspieces and said pixel a to said at actuator substrate, and then laminating an optical waveguide plate on at least said crosspieces.

30. The method for producing said display device according to claim 20, wherein when said crosspieces are formed, said members for constructing said crosspieces are laminated by utilizing surface tension of liquid.

31. The method for producing said display device according to claim 20, wherein said crosspiece-forming step comprises forming said crosspieces at said portions of said plate member, and then hardening said crosspieces.

32. The method for producing said display device according to claim 14, wherein said pressurizing step comprises hardening at least said pixel structures while pressurizing said actuator substrate and said member to be pressurized together with said actuator substrate.

33. The method for producing said display device according to claim 14, wherein said optical waveguide plate includes a gap-forming layer at a portion corresponding to said crosspiece.

34. The method for producing said display device according to claim 14, wherein a gap-forming layer is previously formed on said crosspiece before laminating said optical waveguide plate.

35. The method for producing said display device according to claim 14, wherein when said actuator substrate and said member to be pressurized together with said actuator substrate are pressurized, a preliminary treatment is performed for gap formation, and a predetermined gap is formed between said pixel structure and said optical waveguide plate during said hardening of at least said pixel structures performed thereafter.

36. The method for producing said display device according to claim 14, wherein a vacuum packaging method is used to pressurize said actuator substrate and said member to be pressurized together with said actuator substrate.

37. The method for producing said display device according to claim 14, wherein a low pressure press method is used to pressurize said actuator substrate and said member to be pressurized together with said actuator substrate.

38. The method for producing said display device according to claim 19, wherein:

said plate member, which is used to be laminated on said actuator substrate in said first laminating step, has a projection at a portion corresponding to each of said pixel structures; and a recess corresponding to said projection is formed on said surface of said pixel structure upon said pressurization performed in said pressurizing step after said first laminating step.

39. The method for producing said display device according to claim 19, wherein:

said plate member, which is used to be laminated on said actuator substrate in said first laminating step, has a projection at a portion corresponding to each of said pixel structures; and a step corresponding to said projection is formed on said surface of said pixel structure upon said pressurization performed in said pressurizing step after said first laminating step.

40. The method for producing said display device according to claim 19, wherein:

said plate member, which is used to be laminated on said actuator substrate in said first laminating step, has a convex configuration formed at a portion corresponding to each of said pixel structures; and a concave configuration corresponding to said convex configuration is formed on said surface of said pixel structure upon said pressurization performed in said pressurizing step after said first laminating step.

* * * * *